United States Patent
Cage et al.

(10) Patent No.: US 11,616,816 B2
(45) Date of Patent: Mar. 28, 2023

(54) DISTRIBUTED LEDGER BASED DOCUMENT IMAGE EXTRACTING AND PROCESSING WITHIN AN ENTERPRISE SYSTEM

(71) Applicant: SpeedChain, Inc., Atlanta, GA (US)

(72) Inventors: Daniel Cage, Atlanta, GA (US); Vincent Umberto Dell'Anno, San Diego, CA (US); Andrew Kjell Musselman, Seattle, WA (US); Andrew Patrick Crytser, Atlanta, GA (US); Padmakar Kankipati, Marietta, GA (US); Norman R. Silverman, Dallas, TX (US)

(73) Assignee: SpeedChain, Inc., Atlanta, GA (US)

( * ) Notice: Subject to any disclaimer, the term of this patent is extended or adjusted under 35 U.S.C. 154(b) by 0 days.

(21) Appl. No.: 17/732,316

(22) Filed: Apr. 28, 2022

(65) Prior Publication Data
US 2022/0255969 A1    Aug. 11, 2022

Related U.S. Application Data

(63) Continuation-in-part of application No. 17/365,585, filed on Jul. 1, 2021, which is a continuation-in-part
(Continued)

(51) Int. Cl.
*H04L 9/40* (2022.01)
*G06F 16/23* (2019.01)

(52) U.S. Cl.
CPC .......... *H04L 63/20* (2013.01); *G06F 16/2379* (2019.01); *H04L 63/102* (2013.01)

(58) Field of Classification Search
CPC ..... H04L 63/20; H04L 63/102; H04L 9/3239; H04L 9/50; H04L 63/0807;
(Continued)

(56) References Cited

U.S. PATENT DOCUMENTS

| | | | | |
|---|---|---|---|---|
| 7,340,421 B1* | 3/2008 | Marcial | ................... | G06Q 40/12 705/30 |
| 7,860,221 B2* | 12/2010 | Adkinson | ............ | H04Q 3/0029 379/9.02 |

(Continued)

FOREIGN PATENT DOCUMENTS

WO    2018085558 A2    5/2018

OTHER PUBLICATIONS

Cage et al., U.S. Appl. No. 16/414,516, 430 pages.
(Continued)

*Primary Examiner* — David Garcia Cervetti
(74) *Attorney, Agent, or Firm* — Baker & McKenzie LLP

(57) ABSTRACT

A method for use in a hybrid network ecosystem comprising an enterprise network and a reconciliation network, the method comprising generating, by at least one first computing node in the enterprise network or the reconciliation network, a first digital facilitator, wherein the first digital facilitator enables a first device to use a private key to access data associated with a distributed ledger operation. The method also comprises transmitting, via the reconciliation network, the data from the first computing device to a second computing device, wherein the first computing device and the second computing device are connected via the reconciliation network.

16 Claims, 24 Drawing Sheets

Related U.S. Application Data of application No. 16/414,530, filed on May 16, 2019, now Pat. No. 11,057,369, said application No. 17/365,585 is a continuation of application No. 17/187,434, filed on Feb. 26, 2021, which is a continuation-in-part of application No. PCT/US2019/068705, filed on Dec. 27, 2019, which is a continuation-in-part of application No. 16/414,516, filed on May 16, 2019, now Pat. No. 11,228,584, and a continuation-in-part of application No. 16/414,524, filed on May 16, 2019, now Pat. No. 10,958,637, and a continuation-in-part of application No. 16/414,530, filed on May 16, 2019, now Pat. No. 11,057,369, and a continuation-in-part of application No. 16/414,536, filed on May 16, 2019, now Pat. No. 10,999,270.

(60) Provisional application No. 62/786,202, filed on Dec. 28, 2018, provisional application No. 62/888,167, filed on Aug. 16, 2019.

(58) Field of Classification Search
CPC ............ H04L 63/0823; H04L 63/1425; G06F 16/2379; G06F 16/9024
See application file for complete search history.

(56) References Cited

U.S. PATENT DOCUMENTS

| | | | |
|---|---|---|---|
| 7,886,335 B1* | 2/2011 | Chickering | H04L 43/0817 726/1 |
| 8,924,269 B1 | 12/2014 | Seubert | |
| 9,760,871 B1* | 9/2017 | Pourfallah | G06Q 20/405 |
| 10,095,888 B1 | 10/2018 | Lee et al. | |
| 10,102,526 B1* | 10/2018 | Madisetti | G06Q 20/389 |
| 10,127,247 B1* | 11/2018 | Arora | G06F 16/583 |
| 10,135,607 B1* | 11/2018 | Roets | G06F 21/64 |
| 10,248,783 B2* | 4/2019 | Costa Faidella | G06F 21/45 |
| 10,361,853 B2* | 7/2019 | Castagna | H04L 9/30 |
| 10,373,158 B1 | 8/2019 | James et al. | |
| 10,380,685 B1 | 8/2019 | Phillips et al. | |
| 10,402,792 B2* | 9/2019 | Lin | G06Q 20/065 |
| 10,402,793 B2* | 9/2019 | Haldenby | G06F 21/645 |
| 10,554,649 B1* | 2/2020 | Fields | H04L 63/0823 |
| D877,812 S | 3/2020 | Cage et al. | |
| 10,721,060 B1* | 7/2020 | Kaizer | H04L 9/3247 |
| 10,726,374 B1* | 7/2020 | Engineer | G06F 40/30 |
| 10,817,872 B2* | 10/2020 | Lin | H04L 9/008 |
| 10,958,637 B2 | 3/2021 | Cage et al. | |
| 10,999,270 B2 | 5/2021 | Cage et al. | |
| 11,025,409 B1* | 6/2021 | Fields | H04L 9/50 |
| 11,057,369 B2 | 7/2021 | Cage et al. | |
| 11,170,092 B1* | 11/2021 | Liang | H04L 9/0637 |
| 11,228,584 B2 | 1/2022 | Cage et al. | |
| 2008/0120129 A1 | 5/2008 | Seubert et al. | |
| 2009/0245649 A1* | 10/2009 | Nakatsuka | G06V 40/165 358/1.18 |
| 2010/0231993 A1* | 9/2010 | Ito | H04N 1/32149 358/498 |
| 2012/0244930 A1 | 9/2012 | Cage et al. | |
| 2013/0191278 A1* | 7/2013 | O'Leary | G06Q 20/10 705/39 |
| 2013/0196733 A1 | 8/2013 | Cage et al. | |
| 2013/0242324 A1* | 9/2013 | Miyazaki | H04N 1/00244 358/1.13 |
| 2013/0281190 A1 | 10/2013 | Cage et al. | |
| 2013/0325680 A1 | 12/2013 | Satyavolu et al. | |
| 2014/0066194 A1 | 3/2014 | Cage et al. | |
| 2014/0274314 A1 | 9/2014 | Cage et al. | |
| 2014/0372756 A1 | 12/2014 | O'Hare et al. | |
| 2015/0227890 A1 | 8/2015 | Bednarek et al. | |
| 2016/0078566 A1* | 3/2016 | Farrell | G06Q 10/10 705/30 |
| 2016/0086447 A1 | 3/2016 | Cage et al. | |
| 2016/0086453 A1 | 3/2016 | Cage et al. | |
| 2016/0269182 A1* | 9/2016 | Sriram | H04L 9/0869 |
| 2016/0350919 A1* | 12/2016 | Steigauf | G06V 10/82 |
| 2017/0046526 A1* | 2/2017 | Chan | G06F 21/62 |
| 2017/0046651 A1* | 2/2017 | Lin | G06Q 40/128 |
| 2017/0046693 A1* | 2/2017 | Haldenby | G06Q 10/0631 |
| 2017/0046694 A1* | 2/2017 | Chow | G06Q 10/08 |
| 2017/0046806 A1* | 2/2017 | Haldenby | G06Q 20/401 |
| 2017/0076293 A1 | 3/2017 | Cage et al. | |
| 2017/0230353 A1* | 8/2017 | Kurian | G06Q 20/405 |
| 2017/0230375 A1* | 8/2017 | Kurian | G06Q 20/382 |
| 2017/0236094 A1* | 8/2017 | Shah | H04L 9/0637 705/300 |
| 2017/0243193 A1* | 8/2017 | Manian | G06Q 20/3829 |
| 2017/0244721 A1* | 8/2017 | Kurian | H04L 63/08 |
| 2017/0249634 A1 | 8/2017 | Cage et al. | |
| 2017/0270491 A1 | 9/2017 | Cage et al. | |
| 2017/0270745 A1 | 9/2017 | Cage et al. | |
| 2017/0295023 A1* | 10/2017 | Madhavan | G06F 21/40 |
| 2017/0337534 A1* | 11/2017 | Goeringer | G06Q 50/184 |
| 2018/0075693 A1 | 3/2018 | Cage et al. | |
| 2018/0078843 A1* | 3/2018 | Tran | G09B 19/0038 |
| 2018/0101827 A1 | 4/2018 | Cage et al. | |
| 2018/0102018 A1 | 4/2018 | Cage et al. | |
| 2018/0114205 A1* | 4/2018 | Thomas | G06Q 40/02 |
| 2018/0117446 A1* | 5/2018 | Tran | A42B 3/0433 |
| 2018/0123779 A1* | 5/2018 | Zhang | G06Q 20/02 |
| 2018/0130050 A1* | 5/2018 | Taylor | H04L 9/3236 |
| 2018/0130158 A1* | 5/2018 | Atkinson | G06F 21/6209 |
| 2018/0144156 A1* | 5/2018 | Marin | G06F 21/602 |
| 2018/0173203 A1* | 6/2018 | Freer | B29C 64/386 |
| 2018/0204213 A1* | 7/2018 | Zappier | H04L 63/065 |
| 2018/0205555 A1* | 7/2018 | Watanabe | H04L 9/3226 |
| 2018/0211252 A1* | 7/2018 | Lintner | G06F 21/42 |
| 2018/0253599 A1* | 9/2018 | Shepard | G06V 30/416 |
| 2018/0268401 A1* | 9/2018 | Ortiz | G06Q 20/326 |
| 2018/0276625 A1* | 9/2018 | Saye | G06Q 20/3825 |
| 2018/0285996 A1* | 10/2018 | Ma | H04L 9/3297 |
| 2018/0293834 A1 | 10/2018 | Cage et al. | |
| 2018/0314809 A1* | 11/2018 | Mintz | H04L 9/3297 |
| 2018/0330385 A1* | 11/2018 | Johnson | G06Q 30/018 |
| 2019/0026716 A1 | 1/2019 | Anbukkarasu et al. | |
| 2019/0036692 A1* | 1/2019 | Sundaresan | H04L 9/3239 |
| 2019/0043043 A1 | 2/2019 | Saraniecki et al. | |
| 2019/0044714 A1 | 2/2019 | Parker et al. | |
| 2019/0051390 A1 | 2/2019 | Shah | |
| 2019/0058595 A1* | 2/2019 | Hamasni | G06Q 20/401 |
| 2019/0065763 A1* | 2/2019 | Berg | G06F 16/9558 |
| 2019/0066442 A1 | 2/2019 | Cage et al. | |
| 2019/0073666 A1* | 3/2019 | Ortiz | H04L 9/0637 |
| 2019/0080308 A1 | 3/2019 | Sheikh et al. | |
| 2019/0080407 A1* | 3/2019 | Molinari | G06Q 20/06 |
| 2019/0080557 A1 | 3/2019 | Cage et al. | |
| 2019/0081789 A1* | 3/2019 | Madisetti | H04L 9/0637 |
| 2019/0089701 A1* | 3/2019 | Mercury | H04W 4/38 |
| 2019/0123889 A1* | 4/2019 | Schmidt-Karaca | H04L 9/0618 |
| 2019/0138689 A1* | 5/2019 | Dehghan Marvast | G06T 11/008 |
| 2019/0164136 A1 | 5/2019 | Gray | |
| 2019/0180275 A1* | 6/2019 | Safak | H04L 9/0637 |
| 2019/0183366 A1* | 6/2019 | Dehghan Marvast | G06K 9/6217 |
| 2019/0213831 A1 | 7/2019 | Cage et al. | |
| 2019/0220831 A1* | 7/2019 | Rangarajan | H04L 9/3239 |
| 2019/0229892 A1* | 7/2019 | Jevans | H04L 9/3297 |
| 2019/0236598 A1* | 8/2019 | Padmanabhan | G06Q 20/0655 |
| 2019/0238525 A1* | 8/2019 | Padmanabhan | H04L 63/101 |
| 2019/0253258 A1* | 8/2019 | Thekadath | H04L 9/3239 |
| 2019/0259007 A1* | 8/2019 | LaMontagne | G06Q 20/3829 |
| 2019/0294762 A1* | 9/2019 | Prem Bianzino | G06F 16/00 |
| 2019/0294817 A1* | 9/2019 | Hennebert | H04L 9/0861 |
| 2019/0303886 A1* | 10/2019 | Kikinis | H04L 9/0637 |
| 2019/0303892 A1* | 10/2019 | Yantis | G06Q 10/10 |
| 2019/0311271 A1* | 10/2019 | Li | G06K 9/6267 |
| 2019/0340369 A1* | 11/2019 | Hadi | H04L 9/0637 |
| 2019/0340607 A1* | 11/2019 | Lynn | G06Q 20/3678 |
| 2019/0340609 A1* | 11/2019 | Mayadas | H04L 63/123 |
| 2019/0356638 A1* | 11/2019 | Filter | G06Q 20/065 |
| 2019/0370811 A1* | 12/2019 | Zhang | G06Q 20/0658 |

(56) References Cited

U.S. PATENT DOCUMENTS

| | | | |
|---|---|---|---|
| 2019/0372769 A1* | 12/2019 | Fisher | H04L 9/3226 |
| 2019/0391972 A1* | 12/2019 | Bates | G06F 16/51 |
| 2020/0013027 A1* | 1/2020 | Zhu | H04L 9/50 |
| 2020/0027080 A1* | 1/2020 | Holland | H04L 9/50 |
| 2020/0034876 A1* | 1/2020 | Soundararajan | H04L 9/0637 |
| 2020/0043115 A1* | 2/2020 | Nelson | H04L 9/3247 |
| 2020/0067697 A1* | 2/2020 | Puddu | G06Q 20/3827 |
| 2020/0074459 A1* | 3/2020 | Ma | G06Q 20/3829 |
| 2020/0074461 A1* | 3/2020 | DeRosa-Grund | G06Q 30/0255 |
| 2020/0076601 A1* | 3/2020 | Tabrizi | G06Q 20/38215 |
| 2020/0092084 A1* | 3/2020 | Maroney | H04L 67/1008 |
| 2020/0104836 A1* | 4/2020 | Coburn | G06Q 20/36 |
| 2020/0118068 A1* | 4/2020 | Turetsky | G06Q 20/02 |
| 2020/0127812 A1* | 4/2020 | Schuler | H04L 9/3239 |
| 2020/0133955 A1* | 4/2020 | Padmanabhan | G06Q 30/01 |
| 2020/0134719 A1* | 4/2020 | Malik | H04L 9/0637 |
| 2020/0134986 A1* | 4/2020 | Morgan | H04L 9/3239 |
| 2020/0136923 A1 | 4/2020 | Altshuler et al. | |
| 2020/0160973 A1* | 5/2020 | Andersen | G06T 7/0012 |
| 2020/0175076 A1* | 6/2020 | Powers | G06Q 50/01 |
| 2020/0177373 A1* | 6/2020 | Komandur | H04L 9/3247 |
| 2020/0193434 A1* | 6/2020 | Ma | H04L 9/0643 |
| 2020/0210380 A1 | 7/2020 | Cage et al. | |
| 2020/0213110 A1* | 7/2020 | Cage | H04L 63/083 |
| 2020/0213291 A1 | 7/2020 | Cage et al. | |
| 2020/0213292 A1 | 7/2020 | Cage et al. | |
| 2020/0250549 A1* | 8/2020 | Kikinis | H04L 9/3239 |
| 2020/0294034 A1* | 9/2020 | Kikinis | G06Q 20/3674 |
| 2020/0311721 A1* | 10/2020 | Ow | G06Q 20/367 |
| 2020/0334668 A1* | 10/2020 | Nicli | G06Q 20/3676 |
| 2021/0012332 A1* | 1/2021 | Ow | G06Q 20/3678 |
| 2021/0075623 A1* | 3/2021 | Petersen | H04L 9/50 |
| 2021/0097484 A1* | 4/2021 | Ramos | G06K 9/6201 |
| 2021/0152536 A1* | 5/2021 | Padmanabhan | G06F 21/6245 |
| 2021/0182849 A1* | 6/2021 | Davies | H04L 9/3247 |
| 2021/0185091 A1* | 6/2021 | Cage | G06Q 20/3821 |
| 2021/0294920 A1* | 9/2021 | Sachs | H04L 9/3297 |
| 2021/0295321 A1* | 9/2021 | Liu | G06Q 20/38 |
| 2022/0019624 A1* | 1/2022 | Gwozdz | G06F 16/1794 |
| 2022/0122062 A1* | 4/2022 | Mayblum | G06Q 20/381 |
| 2022/0156655 A1* | 5/2022 | Barrientos | G06N 3/0454 |

OTHER PUBLICATIONS

Cage et al., U.S. Appl. No. 16/414,536, 421 pages.
Notice of Allowance dated Feb. 15, 2021 in connection with U.S. Appl. No. 16/414,524, 14 pages.
International Search Report and Written Opinion dated Apr. 29, 2020 in connection with International Application No. PCT/US2019/068705, 13 pages.
Christidis et al. Blockchains and Smart Contracts for the Internet of Things. IEEE. May 2016, 12 pages.
Ogiela et al., Security of Distributed Ledger Solutions Based on Blockchain Technologies, IEEE, 2018, 7 pages.
Gabor Magyar, Blockchain: solving the privacy and research availability tradeoff for EHR data, Nov. 2017, IEEE, 6 pages.
NPL Search (Google Scholar) (Year: 2020), 2 pages.
GCC Examination Report dated Oct. 27, 2020 in connection with GCC Application No. GC 2019-38929, 3 pages.
Cage et al., U.S. Appl. No. 16/414,524, 304 pages.
Office Action dated Jun. 5, 2020 in connection with U.S. Appl. No. 16/414,536, 23 pages.
Office Action dated Oct. 2, 2019 in connection with U.S. Appl. No. 16/414,524, 14 pages.
Cage et al., U.S. Appl. No. 16/414,530, 337 pages.
Office Action dated Sep. 30, 2019 in connection with U.S. Appl. No. 16/414,516, 8 pages.
Office Action dated Feb. 4, 2020 in connection with U.S. Appl. No. 16/414,530, 9 pages.
Office Action dated Apr. 17, 2020 in connection with U.S. Appl. No. 16/414,524, 16 pages.
Office Action dated Mar. 4, 2020 in connection with U.S. Appl. No. 16/414,516, 14 pages.

* cited by examiner

DISTRIBUTED LEDGER BASED DOCUMENT IMAGE EXTRACTING AND PROCESSING WITHIN AN ENTERPRISE SYSTEM

CROSS-REFERENCE TO RELATED APPLICATIONS

This application is a continuation-in-part of and claims priority to U.S. patent application Ser. No. 17/365,585, filed Jul. 1, 2021, which claims priority to U.S. patent application Ser. No. 16/414,530, filed on May 16, 2019, now issued as U.S. Pat. No. 11,057,369, on Jul. 6, 2021, which claims the benefit of U.S. Provisional Patent Application No. 62/786,202, filed Dec. 28, 2018, all of which are incorporated by reference herein in their entirety for all purposes. U.S. patent application Ser. No. 17/365,585 also claims priority to U.S. patent application Ser. No. 17/187,434, filed Feb. 26, 2021, which claims priority to PCT Application No. PCT/US19/068705, filed Dec. 27, 2019, which claims priority to U.S. Provisional Application No. 62/888,167, filed Aug. 16, 2019, U.S. Provisional Application No. 62/786,202, filed Dec. 28, 2018, and U.S. patent application Ser. No. 16/414,516, now issued as U.S. Pat. No. 11,228,584, on Jan. 18, 2022, Ser. No. 16/414,524, now issued as U.S. Pat. No. 10,958,637, on Mar. 23, 2021, Ser. No. 16/414,530, now issued as U.S. Pat. No. 11,057,369, on Jul. 6, 2021, and Ser. No. 16/414,536, now issued as U.S. Pat. No. 10,999,270, on May 4, 2021, all filed May 16, 2019 and all claiming priority to U.S. Provisional Application No. 62/786,202, filed Dec. 28, 2018, all of which are incorporated by reference herein in their entirety for all purposes.

TECHNICAL FIELD

This disclosure generally relates to distributed ledgers or blockchain-based systems.

BACKGROUND

There is a need for a blockchain-based ecosystem developed for transparency, not anonymity, which is the hallmark of most blockchain solutions.

SUMMARY

In some embodiments, a method is provided for use in a hybrid network ecosystem comprising an enterprise network and a reconciliation network, the method comprising: generating, by at least one first computing node in the enterprise network or the reconciliation network, a first digital facilitator, wherein the first digital facilitator provides one or more parameters for accessing or distributing data on a distributed ledger in the enterprise network, wherein a private key is used for performing a computing operation, based on the data, in the enterprise network; and generating, by the at least one first computing node in the enterprise network or the reconciliation network or at least one second computing node in the enterprise network or the reconciliation network, a second digital facilitator, wherein the second digital facilitator provides the one or more parameters for accessing or distributing the data in the reconciliation network.

In some embodiments, the computing operation comprises a distributed ledger-based computing operation.

In some embodiments, the first digital facilitator comprises an issuance digital facilitator.

In some embodiments, the second digital facilitator comprises a reconciliation digital facilitator.

In some embodiments, the one or more parameters comprises time-based parameters, geographical or network location-based parameters, identity-based parameters, or amount-based parameters.

In some embodiments, the method further comprises preventing unauthorized access to the data in the enterprise network or the reconciliation network.

In some embodiments, the unauthorized access is determined based on a private key provided for gaining access to the data.

In some embodiments, the computing operation comprises a digital token-based computing operation.

In some embodiments, the first digital facilitator or the second digital facilitator is used to generate a digital token, wherein the digital token enables the computing operation.

In some embodiments, the computing operation comprises an asset-transferring computing operation.

In some embodiments, the at least one first computing node or the at least one second computing node comprises an artificially intelligent computing node.

In some embodiments, the at least one first computing node or the at least one second computing node executes a machine learning operation.

In some embodiments, the distributed ledger is associated with a blockchain system.

In some embodiments, a method is provided for use in a hybrid network ecosystem comprising an enterprise network and a reconciliation network, the method comprising: generating, by at least one first computing node in the enterprise network or the reconciliation network, a first digital facilitator, wherein the first digital facilitator enables a first device to use a private key to access data associated with a distributed ledger transaction; and transmitting, via the reconciliation network, the data from the first computing device to a second computing device, wherein the first computing device and the second computing device are connected via the reconciliation network.

In some embodiments, the second device is or is not part of the enterprise network.

In some embodiments, the data associated with the distributed ledger transaction is transparent to the second computing device.

In some embodiments, the method further comprises generating, by the at least one first computing node in the enterprise network or the reconciliation network or at least one second computing node in the enterprise network or the reconciliation network, an issuance digital facilitator, wherein reconciliation information associated with the issuance digital facilitator is extracted or received by the first computing device, wherein the reconciliation information associated with the issuance digital facilitator sets parameters for the distributed ledger transaction.

In some embodiments, a method is provided for use in a hybrid network ecosystem comprising an enterprise network and a reconciliation network, the method comprising: generating a private key for a user or device in the enterprise network or the reconciliation network; associating identification information associated with the private key or associated with a custodian of the private key, wherein the identification information enables initiation or execution of one or more distributed ledger-based computing transactions in the enterprise network or the reconciliation network; and generating, by the at least one first computing node in the enterprise network or the reconciliation network or at least one second computing node in the enterprise network or the reconciliation network, an issuance digital facilitator, wherein parametric information associated with the issuance digital facilitator is applied to the one or more distributed ledger-based computing transactions in the enterprise network or the reconciliation network.

In some embodiments, the identification information enables tracking of information associated with the one or more distributed ledger-based computing transactions in the enterprise network or the reconciliation network.

In some embodiments, a method associated with an asset-backed network token for use in a distributed ledger associated with a hybrid network ecosystem comprising an enterprise network and a reconciliation network comprises: generating, by at least one computing node in the reconciliation network, a network token, the network token associated with a physical asset, the physical asset being stored in a physical entity, the network token being transferable in the enterprise network; generating, by the at least one computing node in the reconciliation network, a digital contract associated with the network token or the generation of the network token, the digital contract enabling a transaction between a first computing node in the enterprise network and a second computing node in the enterprise network, the transaction comprising a transfer of the network token between the first computing node and the second computing node; and reconciling, by the at least one computing node in the reconciliation network, and in the distributed ledger, the transfer of the network token between the first computing node in the enterprise network and the second computing node in the enterprise network. In some embodiments, any transaction or computing operation or network token does not need to be backed by an asset. Therefore, any transaction or computing operation or network token described as being asset-backed may not be asset-backed in some embodiments.

In some embodiments, the method further comprises providing a digital wallet to a computing device associated with the first computing node or the second computing node, the digital wallet enabling initiation of the transaction between the first computing node and the second computing node. As used herein, a wallet may refer to any type of digital storage or repository.

In some embodiments, the digital wallet enables generation of a code for use in initiating the transaction between the first computing node and the second computing node.

In some embodiments, the code comprises a QR code. Alternatively, the code may be any other type of code.

In some embodiments, the transaction between the first computing node and the second computing node comprises a wireless transaction.

In some embodiments, the digital wallet provides a dashboard for enabling viewing information associated with the reconciling.

In some embodiments, the digital wallet comprises a mobile wallet.

In some embodiments, the digital contract comprises a smart contract.

In some embodiments, the method further comprises generating at least one instance of the reconciliation.

In some embodiments, the method further comprises storing the at least one instance of the reconciliation in a local database associated with the enterprise network.

In some embodiments, the method further comprises storing the at least one instance of the reconciliation in a local database associated with the reconciliation network.

In some embodiments, the method further comprises transmitting the at least one instance of the reconciliation to one or more nodes located inside or outside of at least one of the enterprise network or the reconciliation network.

In some embodiments, the reconciliation network comprises a token-issuing or token-generating network.

In some embodiments, the at least one computing node in the reconciliation network comprises an intelligent computing node.

In some embodiments, at least one of the first computing node or the second computing node comprises at least one of a mobile computing device or a non-mobile computing device.

In some embodiments, a key associated with at least one of the network token, the generation of the network token, the generation of the digital contract, the transfer of the network token, or the reconciliation of the network token is at least one of recoverable, traceable, storable, or transmittable to at least one entity.

In some embodiments, the key comprises a public key.

In some embodiments, the key comprises a private key.

In some embodiments, information associated with at least one of the network token, the generation of the network token, the generation of the digital contract, the transfer of the network token, or the reconciliation of the network token is at least one of recoverable, traceable, storable, or transmittable to at least one entity.

In some embodiments, another method associated with an asset-backed network token for use in a distributed ledger associated with a hybrid network ecosystem comprising an enterprise network and a reconciliation network comprises: generating, by at least one computing node in the reconciliation network, a network token, the network token associated with a digital asset, the network token being transferable in the enterprise network; generating, by the at least one computing node in the reconciliation network, a digital facilitator associated with the network token or the generation of the network token, the digital facilitator enabling or governing a transaction between a first computing node in the enterprise network and a second computing node in the enterprise network, the transaction comprising a transfer of the network token between the first computing node and the second computing node; and processing, by the at least one computing node in the reconciliation network, and in the distributed ledger, the transfer of the network token between the first computing node in the enterprise network and the second computing node in the enterprise network.

In some embodiments, the digital facilitator comprises a smart contract.

In some embodiments, the digital facilitator comprises computing protocol.

In some embodiments, the digital facilitator comprises computing protocol customized for at least one of the enterprise network or the reconciliation network.

In some embodiments, the digital facilitator comprises digital verification information.

In some embodiments, another method associated with an asset-backed network token for use in a distributed ledger associated with a hybrid network ecosystem comprising an enterprise network and a reconciliation network comprises: generating, by at least one computing node in the reconciliation network, a network token, the network token associated with a physical asset, the physical asset being stored in a physical entity, the network token being transferable in the enterprise network; generating, by the at least one computing node in the reconciliation network, a digital facilitator (or enabler) associated with the network token or the generation of the network token, the digital facilitator enabling a transaction between a first computing node in the enterprise network and a second computing node in the enterprise network, the transaction comprising a transfer of the network token between the first computing node and the second computing node, the transfer of the network token between the first computing node and the second computing node not causing transfer of the physical asset; and processing or reconciling, by the at least one computing node in the reconciliation network, and in the distributed ledger, the transfer of the network token between the first computing node in the enterprise network and the second computing node in the enterprise network.

In some embodiments, another method associated with an asset-backed network token for use in a distributed ledger associated with a hybrid network ecosystem comprising an enterprise network and a reconciliation network comprises: generating, by at least one computing node in the reconciliation network or the enterprise network, a network token, the network token associated with a physical asset, the physical asset being stored in a physical entity, the network token being transferable in at least one of the enterprise network or the reconciliation network; generating, by the at least one computing node in the reconciliation network or the enterprise network, a digital facilitator associated with the network token or the generation of the network token, the digital facilitator enabling a transaction between a first computing node in the enterprise network and a second computing node in at least one of the enterprise network or the reconciliation network, the transaction comprising a transfer of the network token between the first computing node and the second computing node, the transfer of the network token between the first computing node and the second computing node not causing transfer of the physical asset; and processing or reconciling, by the at least one computing node in the reconciliation network or the enterprise network, and across the distributed ledger, the transfer of the network token between the first computing node in the enterprise network and the second computing node in the enterprise network.

In some embodiments, the method further comprises compiling data associated with the distributed ledger.

In some embodiments, the method further comprises compiling data associated with the processing or reconciling step into a smart contract, wherein the smart contract is stored across the distributed ledger.

In some embodiments, the method further comprises coding data associated with the processing or reconciling step into a smart contract, wherein the smart contract is stored across the distributed ledger.

In some embodiments, the method further comprises using an artificial intelligence (AI) engine to process the coded data. In some embodiments, AI can be used to process any data or transactions described herein.

In some embodiments, the method further comprises coding data associated with the processing or reconciling step into a digital facilitator, wherein the smart contract is stored across the digital facilitator.

In some embodiments, a method is provided associated with an asset-backed network token for use in a distributed ledger associated with a hybrid network ecosystem comprising an enterprise network and a reconciliation network, the method comprising: generating, by at least one computing node in the reconciliation network or the enterprise network, a network token, the network token being transferable in at least one of the enterprise network or the reconciliation network; determining a user in a geographical location is an approved user for executing computing transactions in the at least one of the enterprise network or the reconciliation network, the approved user being associated with a digital repository comprising or being associated with the network token; transmitting approval to a computing system in the geographical location, the computing system interacting with the digital repository, the computing system enabling the user to recover a physical asset in exchange for a computing transaction based on the network token, the physical asset being specific to the geographical location; and processing or reconciling, by the at least one computing node in the reconciliation network or the enterprise network, and across the distributed ledger, the approval enabling the user to recover the physical asset in exchange for the computing transaction based on the network token.

In some embodiments, the method further comprises generating, by the at least one computing node in the reconciliation network or the enterprise network, a digital facilitator associated with at least one of the network token, the generation of the network token, or an exchange computing transaction based on the network token, the digital facilitator enabling the user to recover the physical asset in exchange for the computing transaction based on the network token.

In some embodiments, the physical asset is based on a real-time comparison of the network token with a reference physical asset or a reference digital asset.

In some embodiments, the physical asset is based on a real-time comparison of the physical asset with a reference physical asset or a reference digital asset.

In some embodiments, a method is provided for improving processing, in an enterprise system, of information extracted from a document image, the method comprising: receiving, from an origination system, via an application programming interface ("API"), information for performing a computing operation, wherein the information comprises at least a first instruction describing a transaction type and at least one destination system; providing a digital facilitator comprising parameters for performing the computing operation; converting, using one or more computing device processors, the first instruction into a second instruction, wherein the second instruction is executable by the digital facilitator; extracting, using the one or more computing device processors, a document image from the information; storing, using the one or more computing device processors, the document image in an object storage database; sending, using the one or more computing device processors, the document image to a document analyzing system; analyzing, using the one or more computing device processors, and based on one or more machine learning operations, the document image; generating, using the one or more computing device processors, a report based on the analyzing the document image; accessing, using the one or more computing device processors, a distributed ledger; executing, using the one or more computing device processors and the digital facilitator, based on the transaction type, the computing operation on the distributed ledger; sending, using the one or more computing device processors, an execution result from the executing the computing operation on the distributed ledger, the report, and the document image to the destination system; and sending, using the one or more computing device processors, an alert to the origination system indicating that the computing operation has been executed.

In some embodiments, the transaction type is associated with a transfer of a digital asset.

In some embodiments, the destination system is associated with at least two destinations.

In some embodiments, the second instructions are updated based on the analyzing of the document image.

In some embodiments, at least one of the transaction type, the first instructions, or the second instructions are assigned a tracking identifier.

In some embodiments, the tracking identifier is generated and monitored by the digital facilitator.

In some embodiments, the tracking identifier is sent to at least one of the origination system or the destination system.

In some embodiments, the one or more machine learning operations comprises at least one of: a rules engine based operation, an artificial intelligence based operation, and optical character recognition.

In some embodiments, an apparatus is provided, for extracting and processing documents within an enterprise system, the apparatus comprising: one or more computing device processors; one or more memory systems comprising code, executable by the one or more computing device processors, and configured to: receive, from an origination system, via an application programming interface ("API"), information for performing a computing operation, wherein the information comprises at least a first instruction describing a transaction type and at least one destination system; provide a digital facilitator comprising parameters for performing the computing operation; convert the first instruction into a second instruction, wherein the second instruction is executable by the digital facilitator; extract a document image from the information; store the document image in an object storage database; send the document image to a document analyzing system; analyze, based on one or more machine learning operations, the document image; generate a report based on the analyzing the document image; access a distributed ledger; execute, based on the transaction type, the computing operation on the distributed ledger; send an execution result from the executing the computing operation on the distributed ledger, the report, and the document image to the destination system; and send an alert to the origination system that the computing operation has been executed.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

DETAILED DESCRIPTION

Figure 1:
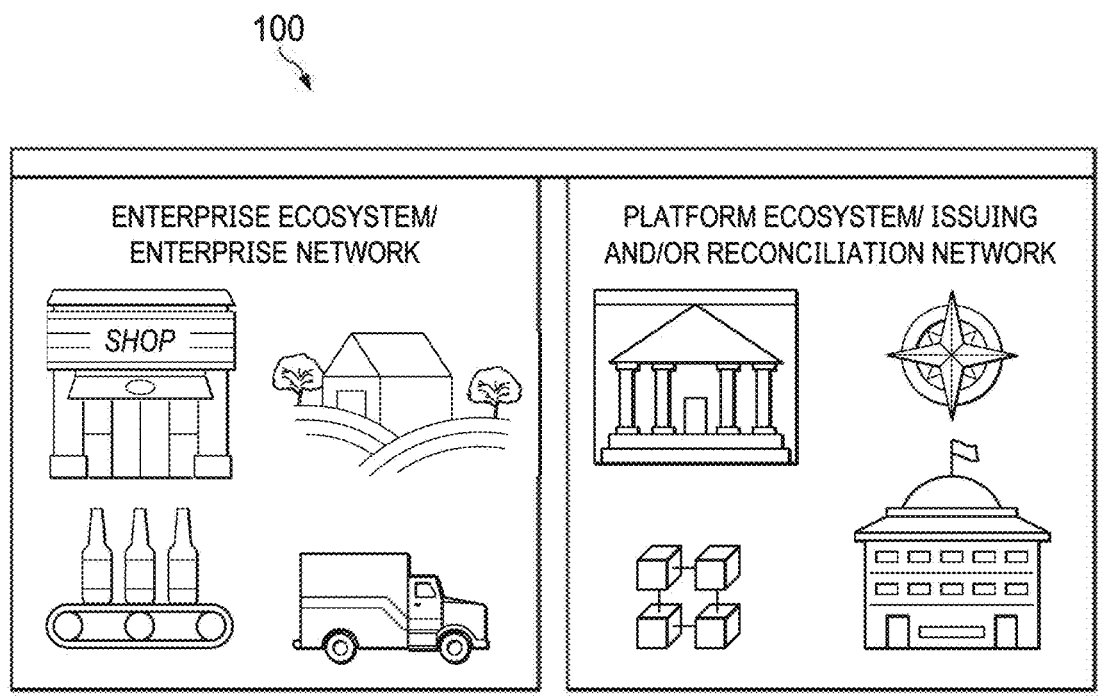
FIG. 1 is a schematic diagram illustrating a hybrid system, according to some embodiments of this disclosure.

FIG. 1 is a schematic diagram illustrating a hybrid system 100, according to some embodiments of this disclosure. The hybrid system may comprise an enterprise system or enterprise network. The hybrid system may further comprise a platform ecosystem or an issuing and/or reconciliation network ("reconciliation network"). Alternatively or additionally, the hybrid system may further comprise a node, an endpoint, a user, an endpoint computing device, a local or remote user terminal, a mobile computing device such as a mobile phone or tablet, a wearable device, etc. The enterprise network and/or the reconciliation network may be associated with, communicate with, and/or comprise one or more distributed ledgers (e.g., decentralized distributed ledgers) and/or blockchain systems. The enterprise network may include one or more computing nodes associated with token transaction initiators or receivers associated with an entity or a product, which can be a digital or physical product associated with the entity. The reconciliation network may include one or more nodes for issuing or generating asset-backed network tokens, issuing or generating smart contracts based on the same, and/or reconciling asset-backed network token transactions conducted in and/or outside the enterprise network. In some embodiments, one of the nodes in the reconciliation network may be associated with or comprise an exchange or an exchange computer server. The exchange computer server (or a group of servers including those that reside outside the platform ecosystem and/or enterprise ecosystem) may create or issue digital assets or tokens; reconcile, on a periodic basis, transactions involving the digital assets or tokens and/or involving smart contracts (or other digital facilitators) based on the digital assets or token; and provide access to a user interface and/or associated mobile application (e.g., mobile wallet application) that enables users associated with nodes on the enterprise ecosystem to execute transactions (e.g., computing transactions) with each other; and communicate information about the reconciliation with other entities.

In some embodiments, the hybrid system and/or the enterprise network and/or the reconciliation network may be associated with a specific location (e.g., geographical jurisdiction such as a country, city, etc.). In such embodiments, computing transactions within the location will take place using the digital asset or token such that the computing transactions occur and/or are reconciled on a distributed ledger or blockchain. In some embodiments, the digital asset or token may be replaced with a physical asset and computing transactions associated with the physical asset may still occur and/or are reconciled on the distributed ledger or blockchain. The location may alternatively or additionally be a network location.

In some embodiments, the enterprise network and the reconciliation network may be a single network. In some embodiments, computing nodes (and/or users) are pre-approved to perform certain types of computing transactions (e.g., based on the type of approval). Smart contracts (e.g., associated with or not associated with digital assets or tokens) may be created and registered/reconciled on the distributed ledger than enable the computing nodes (or users associated with the computing nodes) to perform those certain types of computing transactions on the distributed ledger. In some embodiments, an approved user is a user who was pre-approved or approved either before, simultaneously, or after the user created a private key.

In some embodiments, a digital asset or token to physical asset bridge is provided. In some embodiments, a user or computing node in a jurisdiction may not have or be associated with a physical asset enabling the user to conduct computing transactions in the jurisdiction (or location). However, the user may be a pre-approved user in the hybrid system and/or enterprise network and/or reconciliation network, wherein the hybrid system and/or enterprise network and/or reconciliation network is associated with the jurisdiction. The user may interact (e.g., scanning a code or otherwise conducting a wireless transaction with a mobile device, etc.) with a computing system in the jurisdiction using the user's mobile wallet such that the computing system determines that the user is associated with digital assets or tokens for use in computing transactions (e.g., specific computing transactions, and/or specific computing transactions associated with the jurisdictions and/or specific computing transactions associated with the hybrid system and/or enterprise network and/or reconciliation network, etc.), and enable conversion of a selected quantity of those digital assets or token to physical assets for use in these computing transactions in the jurisdiction. The quantity of physical assets provided to the user may be based on a substantially real-time conversion of the tokens to jurisdiction-specific physical assets (e.g., based on accessing reference information such as a value of a physical asset associated with that jurisdiction or a different jurisdiction with respect to specific physical assets or digital assets or tokens, etc.).

Figure 2:
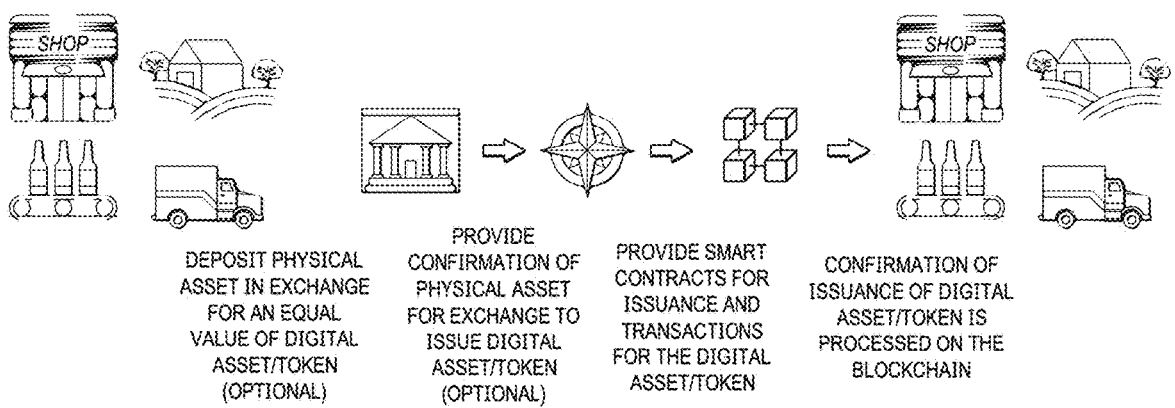
FIG. 2 is a schematic diagram associated with a network ecosystem, according to some embodiments of this disclosure.

FIG. 2 is a schematic diagram associated with a network ecosystem 200, according to some embodiments of this disclosure. The schematic diagram shows exemplary steps. In some embodiments, a physical asset is deposited in a secure storage area (e.g., in a physical entity), in exchange for a digital asset or token. A confirmation of the deposit of the physical asset is provided by the physical entity to a computer server associated with an exchange ("exchange computer server"). Subsequently, the exchange computer server ("MOX") issues a digital asset or token. The exchange computer server may generate and issue smart contracts (or other digital facilitators) for use in transactions (e.g., computing transactions or other transactions) associated involving the digital asset or token in and/or outside the enterprise network. In some embodiments, confirmation of issuance of the digital asset or token is provided on a distributed ledger system or blockchain. In some embodiments, a first digital asset or token (instead of a physical asset) is deposited in a secure storage (e.g., in a digital facility) in exchange for a second digital asset or token.

Figure 3:
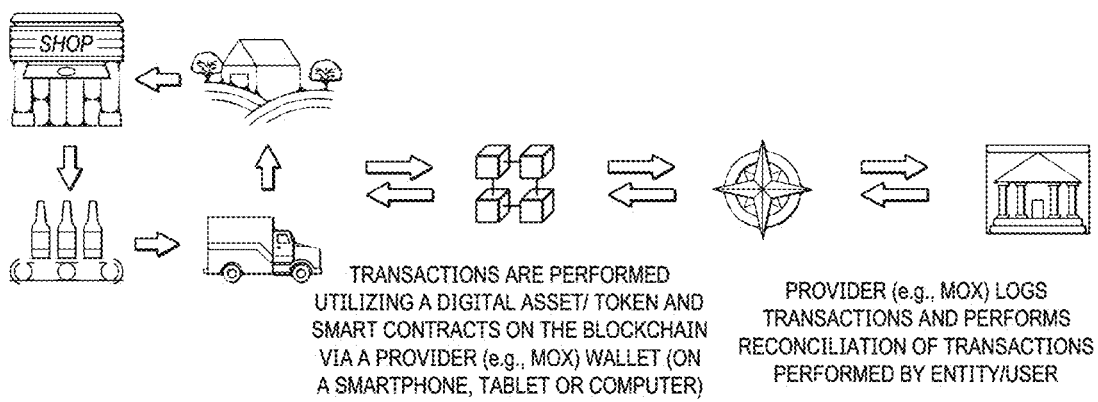
FIG. 3 is another schematic diagram associated with a network ecosystem, according to some embodiments of this disclosure.

FIG. 3 is another schematic diagram associated with a network ecosystem 300, according to some embodiments of this disclosure. FIG. 3 shows that transactions in the enterprise network are performed using the digital asset or token and smart contracts on the blockchain via a mobile wallet initialized on a mobile computing device, computing tablet, or non-mobile computing device. FIG. 3 also shows that the exchange computer server logs transactions and performs reconciliation of transactions performed by a computing node in the enterprise network.

Figure 4:
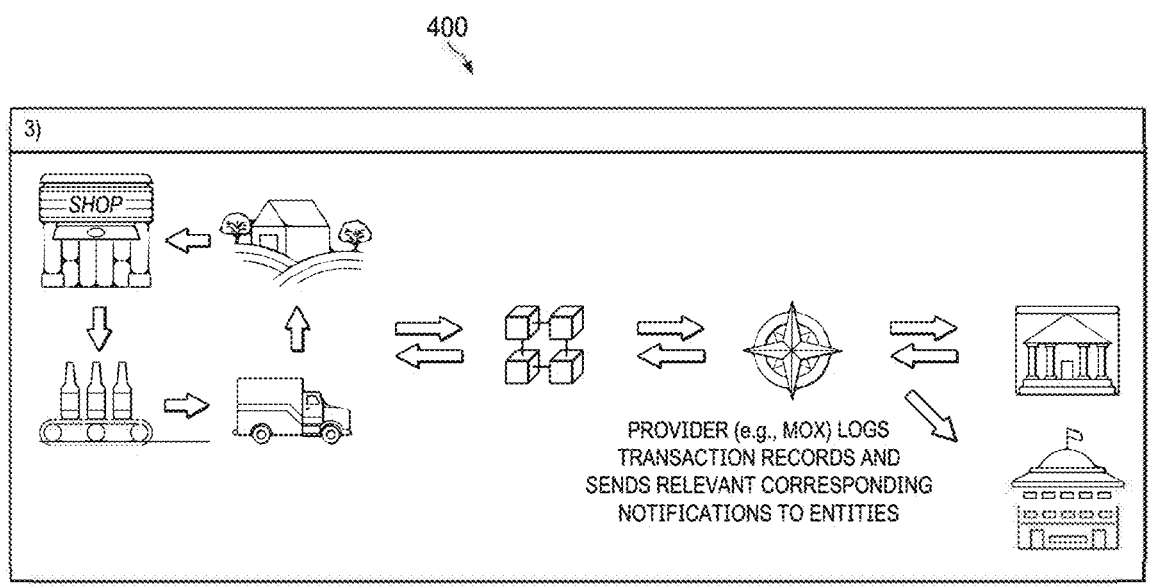
FIG. 4 is another schematic diagram associated with a network ecosystem, according to some embodiments of this disclosure.

FIG. 4 is another schematic diagram associated with a network ecosystem 400, according to some embodiments of this disclosure. FIG. 4 shows that the exchange computer server logs transactions records and transmits (or makes available) notifications associated with the transactions or reconciliation of the transactions to entities in and/or outside at least one of the enterprise network, the reconciliation network, or the hybrid network ecosystem. In some embodiments, the reconciliation network may include a remittance network. Any reconciliation process described herein may include remittance as well.

Figure 5:
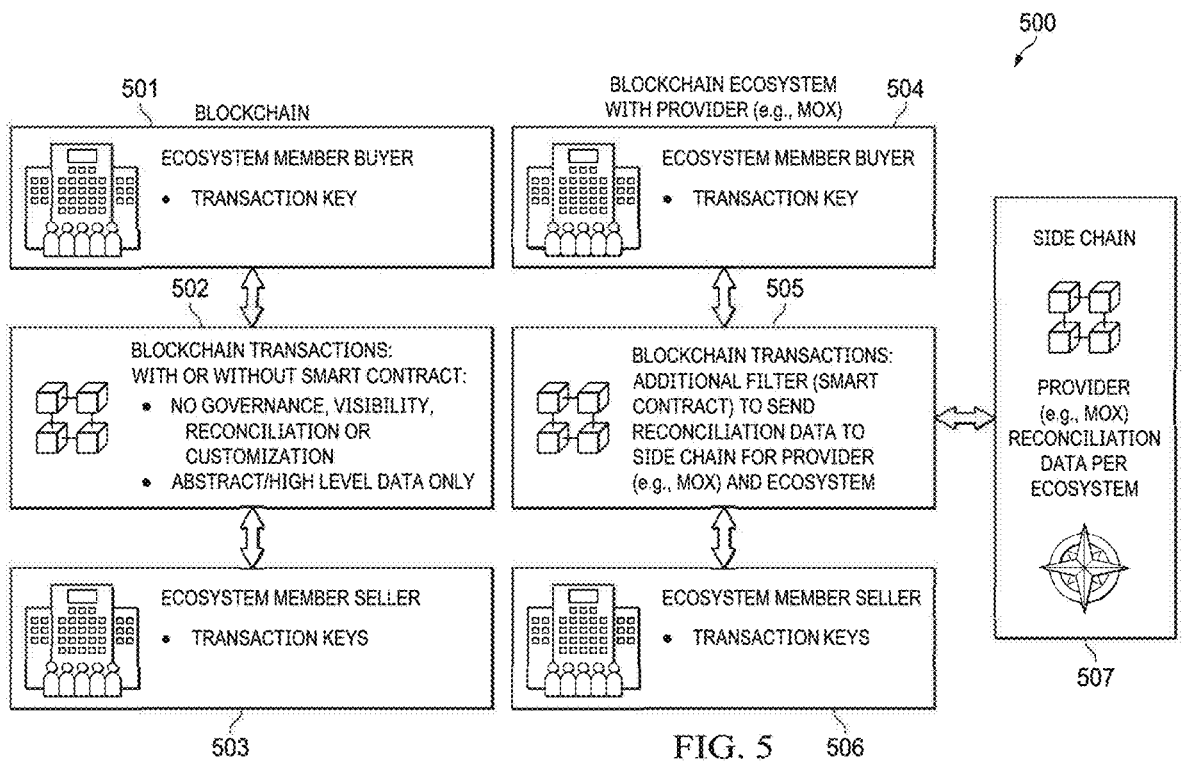
FIG. 5 is another schematic diagram associated with a network ecosystem, according to some embodiments of this disclosure.

FIG. 5 is another schematic diagram associated with a network ecosystem 500, according to some embodiments of this disclosure. In some embodiments, a blockchain network ecosystem is provided. A first user may use a transaction key 501, 504 associated with the blockchain network ecosystem to perform a first transaction (e.g., a purchase transaction) 502, 505. A second user may use the same transaction key or another transaction key 503, 506 associated with the blockchain network ecosystem to perform a second transaction (e.g., a sale transaction) 502, 505. The first transaction and the second transaction may comprise one or more parts of the same transaction. In some embodiments, a filter may be provided in the blockchain network ecosystem in the form of a smart contract. The filter facilitates the first and/or the second transaction. The filter facilitates sending of reconciliation data associated with the first and/or the second transaction to a "side" reconciliation chain. A "side" reconciliation chain may be provided for each blockchain network ecosystem (or for one or more blockchain network ecosystems) 507. In some embodiments, the "side" reconciliation chain may be used to reconcile data associated with the first and/or the second transaction. The "side" reconciliation chain enables more visibility and utility into transactions or operations such as the first transaction and/or the second transaction. This means that information or data associated with the first transaction and/or the second transaction may be viewed or obtained by remote servers that have access to any of the systems or networks described herein. Therefore, systems and methods in the present disclosure may eliminate anonymity or opaqueness associated with transactions performed in blockchain networks and/or systems.

A computing environment 600 (see FIG. 6) associated with or comprised in any of the entities and/or computing systems (including distributed ledger-based systems, blockchain systems, hybrid systems, etc.) 601, 602, 603, 604 described and/or illustrated herein may include general hardware, specifically-purposed hardware, and/or specially purposed-software.

The computing environment 600 may include, among other units, a processor 606, a memory unit (simply called memory) 609, an input/output (I/O) unit 607, a communication unit 614, a resource allocator, a location determinator, and an API unit 608. Each of the processor, the memory unit, the I/O unit, and/or the communication unit may include and/or refer to a plurality of respective units, sub-units, and/or elements. The various units may be implemented entirely in hardware, entirely in software, or in a combination of hardware and software. Some of the units may be optional. Any software described herein may be specially purposed software for performing a particular function. In some embodiments, hardware may also be specially purposed hardware for performing some particular functions. Furthermore, each of the processor, the memory unit, the I/O unit, the communication unit, and/or the other units, may be operatively and/or otherwise communicatively coupled with each other using a chipset such as an intelligent chipset. The chipset may have hardware for supporting connections in the computing environment and connections made to external systems from the computing environment. Some of the units may be comprised in other units. Additionally, some of the units may be optional. Additionally, one or more units may be coupled or connected (e.g., via a wired or wireless connection) to other units.

The processor may control any of the other units and/or functions performed by the units. Any actions described herein as being performed by a processor may be taken by the processor alone and/or by the processor in conjunction with one or more additional processors, units, and/or the like. Multiple processors may be present and/or otherwise included in the computing environment. Thus, while instructions may be described as being executed by the processor, the instructions may be executed simultaneously, serially, and/or by one or multiple processors in parallel. In some embodiments, the processor may refer to any microprocessor, such as a specially purposed microprocessor. In some embodiments, the processor may refer to any type of processor, including a digital processor, an analog processor, a mixed analog-digital processor, etc. In some embodiments, the processor(s) may be specifically designed for use in or associated with distributed ledger systems, blockchain systems, etc.

In some embodiments, the processor may be implemented as one or more computer processor (CPU) chips and/or graphical processor (GPU) chips and may include a hardware device capable of executing computer instructions. The processor may execute instructions, codes, computer programs, and/or scripts. The instructions, codes, computer programs, and/or scripts may be received from and/or stored in the memory unit, the I/O unit, the communication unit, other units, and/or the like. As described herein, any unit may be utilized to perform any methods described herein. In some embodiments, the computing environment may not be a generic computing system, but instead may include customized units designed to perform the various methods described herein.

In some embodiments, the processor may include one or more other units, which may be operably coupled to each other. Therefore, while the units are presented as being separate from the processor, the memory unit, the I/O unit, and the communication unit, in some embodiments, one or more units may be located in at least one of the processor, the memory unit, the I/O unit, and the communication unit.

The location determinator may facilitate detection, generation, modification, analysis, transmission, and/or presentation of location information (e.g., of any computing device described herein). Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determinator may include various sensors, a radar, and/or other specifically-purposed hardware elements for enabling the location determinator to acquire, measure, and/or otherwise transform data of a computing device such as a computing device into location information. In some embodiments, the location determination may be located in the processor.

The resource allocator may facilitate the determination, monitoring, analysis, and/or allocation of computing resources throughout the computing environment. As such, computing resources of the computing environment utilized by the processor, the memory unit, the I/O unit, the communication unit, and/or any other units of the computing environment, such as processing power, data storage space, network bandwidth, and/or the like may be in high demand at various times during operation. Accordingly, the resource allocator may be configured to manage the allocation of various computing resources as they are required by particular units of the computing environment. In some embodiments, the resource allocator may include sensors and/or other specially-purposed hardware for monitoring performance of each unit and/or sub-unit of the computing environment, as well as hardware for responding to the computing resource needs of each unit and/or sub-unit. In some embodiments, the resource allocator may utilize computing resources of a second computing environment separate and distinct from the computing environment to facilitate a desired operation. Therefore, in some embodiments any processor may be referred to as a load-balancing processor. Any apparatus described herein may be referred to as load-balancing apparatus or server. The term load-balancing may refer to allocation of computing resources to the carious units of the computing environment.

For example, the resource allocator may determine a number of computing operations that need to be performed or executed by the computing environment. The resource allocator may then determine that the number of computing resources required by the computing operations meets and/or exceeds a predetermined threshold value. Based on this determination, the resource allocator may determine an amount of additional computing resources (e.g., processing power, storage space of a particular non-transitory computer-readable memory medium, network bandwidth, and/or the like) required by the processor, the memory unit, the I/O unit, the communication unit, and/or any sub-unit of the aforementioned units for enabling safe and efficient operation of the computing environment while supporting the number of simultaneous computing operations. The resource allocator may then retrieve, transmit, control, allocate, and/or otherwise distribute determined amount(s) of computing resources to each unit of the computing environment. In some embodiments, the allocation of computing resources of the resource allocator may include the resource allocator flipping a switch, adjusting processing power, adjusting memory size, partitioning a memory element, transmitting and/or receiving data, controlling one or more input and/or output devices, modifying various communication protocols, and/or the like. In some embodiments, the resource allocator may facilitate utilization of parallel processing techniques, e.g., for parallel computing operations. A computing operation may refer to any operation, function, method, process, etc., described in this disclosure. In some embodiments, the resource allocator may be located in the processor.

The memory unit and/or any of its sub-units may include distributed ledger systems, blockchain systems, random access memory (RAM), read only memory (ROM), and/or various forms of secondary storage. RAM may be used to store volatile data and/or to store instructions that may be executed by the processor and/or any of the other units of the computing environment. For example, the data stored may be a command, a current operating state of the computing environment, and/or any particular unit of the computing environment, an intended operating state of the computing environment and/or any particular unit of the computing environment, and/or the like. As a further example, data stored in the memory unit may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit may include one or more databases for storing any data described herein. Additionally or alternatively, one or more secondary databases located remotely from the computing environment may be utilized and/or accessed by the memory unit.

The API unit may facilitate deployment, storage, access, execution, and/or utilization of information associated with APIs of the computing environment. Some of the APIs may be particularly designed with regard to distributed ledger systems, blockchain systems, etc. In some embodiments, the API unit may be located in the memory unit, while in other embodiments, the API unit may be located separate from the memory unit. The API unit may enable the various units of the computing environment to communicate with each other and/or perform computing operations described herein. Accordingly, the API unit may include API databases comprising information that may be accessed and/or utilized by applications and/or operating systems of other devices and/or computing environments. In some embodiments, each API database may be associated with a customized physical circuit included in the API unit. Additionally, each API database may be public and/or private, and so authentication credentials may be required to access information in an API database.

Any aspect of the memory unit may comprise any collection and arrangement of volatile and/or non-volatile components suitable for storing data. For example, the memory unit may comprise random access memory (RAM) devices, read only memory (ROM) devices, magnetic storage devices, optical storage devices, and/or any other suitable data storage devices. In particular embodiments, the memory unit may represent, in part, computer-readable storage media on which computer instructions and/or logic are encoded. The memory unit may represent any number of memory components within, local to, and/or accessible by a processor.

The I/O unit may include hardware and/or software elements for enabling the computing environment to receive, transmit, present data. For example, elements of the I/O unit may be used to receive, transmit, present data. In this manner, the I/O unit may enable the computing environment to interface with a human user. As described herein, the I/O unit may include an I/O device. The I/O device may facilitate the receipt, transmission, processing, presentation, display, input, and/or output of data as a result of executed processes described herein. In some embodiments, the I/O device may include a plurality of I/O devices. In some embodiments, the I/O device may include one or more elements of a signal system, a computing device, a server, and/or a similar device.

The I/O device may include a variety of elements that enable a user to interface with the computing environment. For example, the I/O device may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O device may communicate with one or more elements of the processor and/or the memory unit to execute operations described herein.

The communication unit may facilitate establishment, maintenance, monitoring, and/or termination of communications between the computing environment and other systems, units, etc. The communication unit may further enable communication between various units of the computing environment. The communication unit may facilitate establishment, maintenance, and/or termination of a communication connection between the computing environment and another device by way of a network or directly. For example, the communication unit may detect and/or define a communication protocol required by a particular network and/or network type. Communication protocols utilized by the communication unit may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), other wired or wireless protocols, and/or the like. In some embodiments, facilitation of communication between the computing environment and any other device, as well as any element internal to the computing environment, may include transforming and/or translating data from being compatible with a first communication protocol to being compatible with a second communication protocol. In some embodiments, the communication unit may determine and/or monitor an amount of data traffic to consequently determine which particular network protocol is to be used for transmitting and/or receiving data.

The communication device may include a variety of hardware and/or software specifically purposed to enable communication between the computing environment and another device, as well as communication between elements of the computing environment. In some embodiments, the communication device may include one or more radio transceivers, chips, analog front end (AFE) units, antennas, processors, memory, other logic, and/or other components to implement communication protocols (wired or wireless) and related functionality for facilitating communication between the computing environment and any other device. Additionally and/or alternatively, the communication device may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements of the computing environment be provided according to the structures disclosed herein may be included in integrated circuits or chipsets of any type, such as ROM, RAM (random access memory), DRAM (dynamic RAM), and video RAM (VRAM), PROM (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as processors (DSP), graphics system processors (GSP), synchronous vector processors (SVP), distributed ledger systems, blockchain systems, and image system processors (ISP) all represent sites of application of the principles and structures disclosed herein.

In some embodiments, implementation of any unit of any system described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

The computing environment may include, but is not limited to, computing grid systems, distributed computing environments, cloud computing environment, distributed ledger systems, blockchain systems, hybrid network systems, etc. Such networked computing environments include hardware and software infrastructures configured to form a virtual network organization comprised of multiple resources which may be in geographically disperse locations.

In some embodiments, the enterprise network is associated with an entity or a physical product or a digital product, and a node of the enterprise network comprises at least one of a user, a vendor, a supplier, a buyer, a seller, a customer, a transaction initiator, a transaction receiver, a human, a robot, a computing device such as an automated computing device, etc. In some embodiments, the physical product or asset may be a metal, a non-consumable, a consumable, a plant (e.g., cannabis) or plant-based product or derivative, cash (e.g., associated with a particular location or currency), a thing, etc. In some embodiments, the digital product may be a pure digital asset or a digital representation of a physical product or asset. In some embodiments, the physical product is consumable by a human being for recreational use. In some embodiments, the physical product is consumable by a human being for medicinal use. In some embodiments, the enterprise network is associated with at least one of an entity (e.g., a hotel, an airline, a restaurant, etc.). In some embodiments, the digital token does not comprise a cryptocurrency, though in other embodiments, it might comprise a cryptocurrency. In some embodiments, the digital token does not comprise a speculative token, though in other embodiments, it might comprise a speculative token for trading on an exchange.

In one embodiment, a platform for e-transactions (e.g., e-commerce) and data management is presented in this disclosure. The platform may allow efficient day-to-day transactions at lower operating costs using proprietary reconciliation and data management between multiple entities. In some cases, the platform facilitates secure and transparent data observance for regulators and other third parties monitoring one or more transactions between the multiple entities. The multiple entities may be one or more individuals, one or more organizations, or a combination thereof.

In some embodiments, the private ecosystem architecture of the platform has significant benefits for high impact retail chains, healthcare systems, government agencies, and large-scale project driven enterprises. For retail chains, the platform lowers costs, enhances customer loyalty, and provides asset transfer solutions at very cheap prices as discussed below. For the healthcare systems, the platform provides an integrated patient and provider data management system, payment, and clearing solutions. For the government agencies, the platform improves efficiency and cost savings for project assessment and procurement, licensing and payments, domestic and international aid management, etc.

The reconciliation functions of the platform create a short cycle operation and settlement (SCOS), dramatically lowering the time and effort to clear, secure and reconcile a wide variety of data driven functions. The platform also creates value add services utilizing artificial intelligence (AI) and machine learning (ML) using data generated from other applications integrated into the platform.

In one embodiment, the platform yields models that can simultaneously work together. These models include blockchain as a service (BaaS), transaction costs (e.g., fees), and data revenue. The platform uses to the BaaS model to provide access to transactions, to scale transactions, and to distribute and predict the software as a service (SaaS) model. The platform uses the transaction fees model to calculate costs associated with a transaction, and offer payment solutions for each transaction as needed. The platform also uses the data revenue model to engage the AI and ML tools of the platform to run analytics on user/entity data associated with transactions.

Additionally, the platform can provide a closed loop transaction and asset transfer solution that allows entities to transmit and receive assets. For instance, assets may comprise digital tokens, digital currencies, digital sureties, etc., that entities transmit and receive among themselves. In some cases, the platform minimizes third-party operating costs as well as other charges associated with asset transfers in order to make asset transfers between entities profitable for stakeholders (e.g., platform providers). In some instances, the platform includes a "know your customer" (KYC) and anti-asset laundering (AAL) (e.g., anti-money laundering) functionality for compliance purposes. Some embodiments of the platform include a data analytics feature powered by an AI and/or an ML tool. Additionally, the platform may streamline settlements to entities and integration into other systems. Moreover, the platform executes operations in a manner that does not require entities to change much in terms of their actions when executing transactions.

In some implementations, the platform is based on blockchain technology that is optimized for transactions between entities. In some embodiments, the optimized (or augmented) blockchain technology may be referred to as speedchain (or SpeedChain or Speedchain) technology. In one embodiment, the speedchain technology relies on a secured distributed ledger that records transactions between entities chronologically, permanently, and unalterably. Additionally, speedchain technology may leverage pre-established smart contracts between entities during transactions between the entities. This beneficially negates the need to use traditional database structures that are often reliant on human data entry and security. Additionally, smart contracts can trigger transactions between entities based on a specific logic, and/or based on AI tools, and/or based on ML tools. All these ensure that records associated with transactions between entities are immutable. Also, the speedchain technology architecture ensures data redundancy and information transparency. Moreover, speedchain technology shortens the time required to conduct transactions between entities by eliminating intermediaries. In one embodiment, speedchain provides a data source of truth with distribution and security through a knowable private ecosystem rather than the distributed anonymous organization employed in most blockchain architectures.

Furthermore, speedchain technology can provide secure access to data for entities associated with the private ecosystem. In some instances, speedchain technology allows ease of transactions (e.g., commerce), data entry consistency, and information sharing. As previously mentioned speedchain technology leverages blockchain technology and integration points to aggregate data. In some cases, speedchain technology creates a protected transactional and custodial history, usable for AI and machine learning. Further, speedchain can provide a single source tracking, a universal dashboard for observing transactions, improve performance of the platform, and reduce costs.

As an example, a first entity may initiate a transaction (e.g., asset transfer, digital asset transfer, etc.) using an application associated with the platform and/or using a first physical location (e.g., store) associated with the platform. In the embodiment where the transaction is initiated at a first physical location associated with the platform, the first entity may provide a first currency of transaction to a first associate at the first physical location. This first currency of transaction may be, of example, a token, digital token, digital sureties, or some other form of transferable asset (e.g., money). The first associate then feeds relevant information associated with the transaction to the platform. In the case of an application associated with the platform, the first entity may directly feed the platform with the relevant information associated with the transaction. Relevant information associated with the transaction may include asset amount, location where transaction was initiated, identification data associated with the first entity, identification data associated with a second entity to with which the first entity is conducting the transaction, location of the second entity, a transaction ID associated with the transaction, a timestamp associated with the transaction, an ID associated with the first associate if an application is not used, etc. The platform then processes the relevant information associated with the transaction based on one or more features of speedchain technology. For instance, the platform may process the relevant information using the KYC and the AAL functionality as well as documenting the transaction. In the embodiment where the transaction comprises an asset transfer, the asset is made available to the second user either via an application associated with the platform or via a second location associated with the platform. In some cases, the second entity is notified about asset availability once the platform processes the relevant information. After the second entity acquires a transferred asset resulting from the transaction, the platform verifies the completion of the transaction and records the completion of the transaction on the distributed ledger.

In one embodiment, the transaction involves an asset transfer request and a receive request comprised in a three-step process. The first step may involve the first entity initiating, for example, an asset transfer request. The identity of the first entity may be verified by the either an application associated with the platform or a first associate connected to the platform. Responsive to verifying and confirming the right identity of the first entity, the asset transfer request is submitted to speedchain aspects of the platform via a dedicated integration. The speedchain then administers KYC and/or AAL on the transaction via a dedicated third party integration. In one embodiment, the platform includes a systemized blockchain reconciliation (SyBR) feature which initiates issuance of smart contracts between two or more entities. For example, the SyBR aspect of the platform may transfer assets from the platform based on the transaction between the first entity and the second entity to the second entity. In some embodiments, the platform includes a RECON feature (which is further discussed below). This RECON feature may allow stakeholders (e.g., first entity, second entity, administrators of the platform, etc.) associated with the transaction to view details associated with the asset transfer request.

At a second stage of the transaction, the speedchain aspects of the platform may trigger or send notifications to the first entity and/or the second entity about one or more assets resulting from the transaction. This notification may be in the form of email, SMS, Push (mobile to mobile), phone call, etc.

At the third stage of the transaction, the second entity may initiate a receive request for an available asset resulting from the transaction. A second associate connected to the platform and/or another application associated with the platform verifies the identity of the second entity. The receive request may be submitted to the speedchain aspect of the platform via a dedicated integration. In one embodiment, the speedchain aspect of the platform administers a KYC and/or an AAL on the receive request via a dedicated third-party integration. In one embodiment, the SyBR aspect of the platform initiates transfer of the available asset from a platform account to the account of the second entity. In some cases, the RECON feature of the platform allows stakeholders associated with the transaction to view details associated with the receive request.

In order to prevent asset laundering and/or other illegal transaction on the platform, the platform may execute compliance operations for its administrators (e.g., first associate connected to the platform, second associate connected to the platform, etc.). In one embodiment, the platform implements a KYC policy and a know your associate or agent (KYA) policy to ensure compliance with transaction laws. In some embodiments, the platform implements training for its administrators. Additionally, the speedchain aspects of the platform may include a watch list of suspicious transactions, and monitoring mechanisms that track a volume, and/or frequency, and/or velocity associated with certain transactions. Additionally, personalized data and analytics can be generated using the AI and/or ML features of the platform to analyze suspicious transactions. Additionally, because of the omni-channel data distribution inherent in some embodiments of the platform, tracking and monitoring of transactions by all stakeholders is greatly simplified.

For regulatory purposes, the speedchain aspects of the platform can facilitate avoiding transaction structuring by an associate connected to the platform. By this is meant that the platform has built-in protocols that prevent an associate connected to the platform from knowingly executing an illegal transaction. Moreover, the platform is designed to prohibit the repeat transfer of assets without drawing the attention of stakeholders. Further, the platform is built, in some embodiments, to prohibit multiple reception of assets due to a suspicious transaction by the same recipient (e.g., second entity) even when the recipient varies receipt (or transfer initiation) locations. In other embodiments, the platform includes a fraud alert and prevention system that notifies stakeholder in real-time or pseudo real-time of suspicious transactions occurring on the platform. In some embodiments, the system generated location-based fraud alerts.

The platform in one embodiment includes a SyBR feature configured for parameterized blockchain data management. In some instances, the SyBR feature allows preapproved stakeholders seamless access to data. In other cases, the SyBR feature distributes data and enhances data security on the platform. Moreover, the SyBR feature can prevent unauthorized access to the platform. Additionally, the SyBR feature may ensure that the platform is AI and/or ML compatible.

In other embodiments, the platform includes a preselected issuance and data operations loop (PAIDOL) feature. This feature of the platform deals with asset ownership and transactional security on the platform. In one embodiment, the PAIDOL feature improves security on the platform by connecting issuance and custodial information to every transaction on the platform. In some cases, the PAIDOL feature facilitates KYC and/or AAL compliance on the platform.

In some embodiments, the platform includes RECON Smart Contract (simply referred to as RECON) feature that manages smart contracts on the platform. A smart contract may be a self-executing contract with terms of agreement between two or more entities on the platform directly written into lines of code. The code and the agreements contained therein exist across the blockchain associated with the platform. In one instance, the RECON feature allows for permissioned functions and side chains to capture and process transaction data. In some cases, the RECON feature assists in data reporting and data transparency for stakeholders (e.g., first entity, second entity, platform administrator, regulators, etc.). Additionally, the RECON feature allows the platform to be integrated into other enterprise applications or vice versa.

In other embodiments, the platform includes a combination of the SyBR feature and the PAIDOL feature. In some cases the platform includes a combination of the SyBR feature and the RECON feature. In some cases the platform includes a combination of the PAIDOL feature and the RECON feature. In further embodiments the platform includes a combination of the SyBR feature, the PAIDOL feature, and the RECON feature.

In one embodiment, the platform optimized blockchain on which the platform is based includes an independent blockchain network for executing transactions. It is appreciated that the transactions described do not include, in some embodiments, an initial coin offering like most cryptocurrencies.

Figure 7:
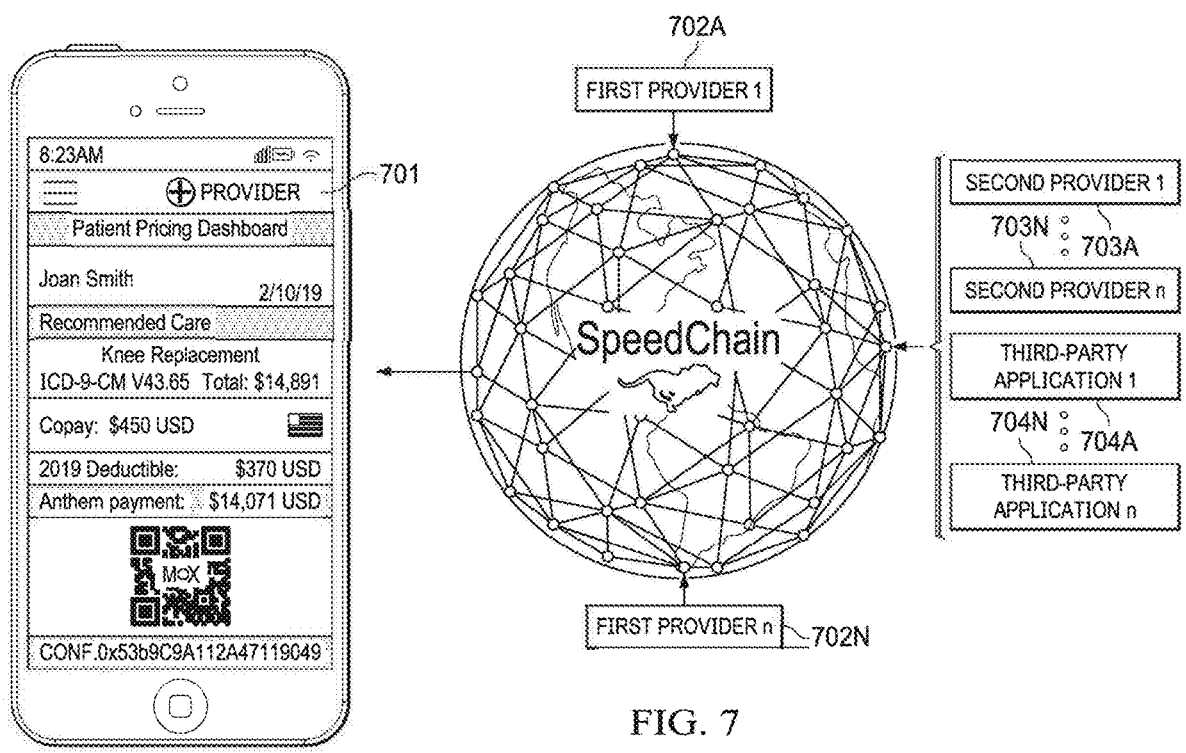
FIG. 7 is an example diagram of the platform adapted for transactions between entities associated with a healthcare system, according to some embodiments of this disclosure.

In some embodiments, the platform may be adapted for transactions between entities associated with a healthcare system. For instance, and as shown in FIG. 7, the platform may be communicatively coupled to a graphical user interface (GUI) 701 including a patient pricing dashboard, and/or a payment form for real-time or pseudo real-time payments, and/or data personalization and analytics linked to the GUI, and/or an omni-channel access to data for stakeholders such as patients, doctors, and platform operators or administrators 702A to 702N, 703A to 703N, 704A to 704N. The platform in this case may include a coding optimization process (COP) and a tokenized recon code smart-contract associated with the speedchain. In such cases, the COP may be based on an AI assisted key word to an International Classification of Diseases (ICD).

Additionally, the platform may facilitate a short billing and settlement cycle for stakeholders such as patients. Moreover, the platform can also provide dynamic staffing of healthcare providers using the AI and/or the ML features of the platform. Further, the platform may enable inter-departmental integration of a plurality of departments associated with a given healthcare system.

TABLE 1

| Key Differentiators | MOX |
|---|---|
| SmartContracts custom-designed per eco-system | Yes |
| Tokens backed by physical asset (FIAT currency) | Yes |
| Permissioned blockchain | Yes |
| Network agnostic (Quorum, Eth, Hyperledger, etc) | Yes |
| Hybrid blockchain (Permissioned tx & Public tx) | Yes |
| Tokens airdropped by eco-system | Yes |
| Reconciliation Smart contract for data analysis | Yes |
| KYC for banks and participants | Yes |
| AML and Machine learning fraud detection | Yes |
| Financial reporting of reconciliation data | Yes |
| Transactions are settled immediately on-chain | Yes |
| Immediate Clearing, reducing total transaction costs | Yes |
| API Integration support with token issuer | Yes |
| API integration for Mobile, Web/Web3 | Yes |
| Wallet based transaction support | Yes |
| Transaction Privacy (only visible to concerned party) | Yes |
| Net positions support for all parties | Yes |
| Wallet support/SMS/QR code support for users for efficient e-commerce | Yes |
| Data analysis support & ML for enhanced UX | Yes |

TABLE 1-continued

| Key Differentiators | MOX |
| --- | --- |
| Tradeable cryptocurrency (ICO) | No |
| Independent blockchain network | No |

In some embodiments, the platform integrates data from the ecosystem (e.g., the community of stakeholders) partners including ICD codes, pricing, and insurer information. In such embodiments, the platform may reconcile data and populate one or more forms associated with GUI's connected to the platform. Moreover, the platform may monitor issuance and activity associated with transactions performed on the platform. In some cases, the platform processes patient data and can allow patients to view, via a GUI, real-time costs at any point of diagnosis. The platform may also be tied to a copay on a dashboard communicatively coupled to the GUI. Additionally, the GUI may allow the patient to view all activity via an application or via an online web browser. It is appreciated that the embodiment of the platform related to healthcare systems may include the SyBR feature, the PAIDOL feature, the RECON feature, or a combination thereof.

Figure 8:
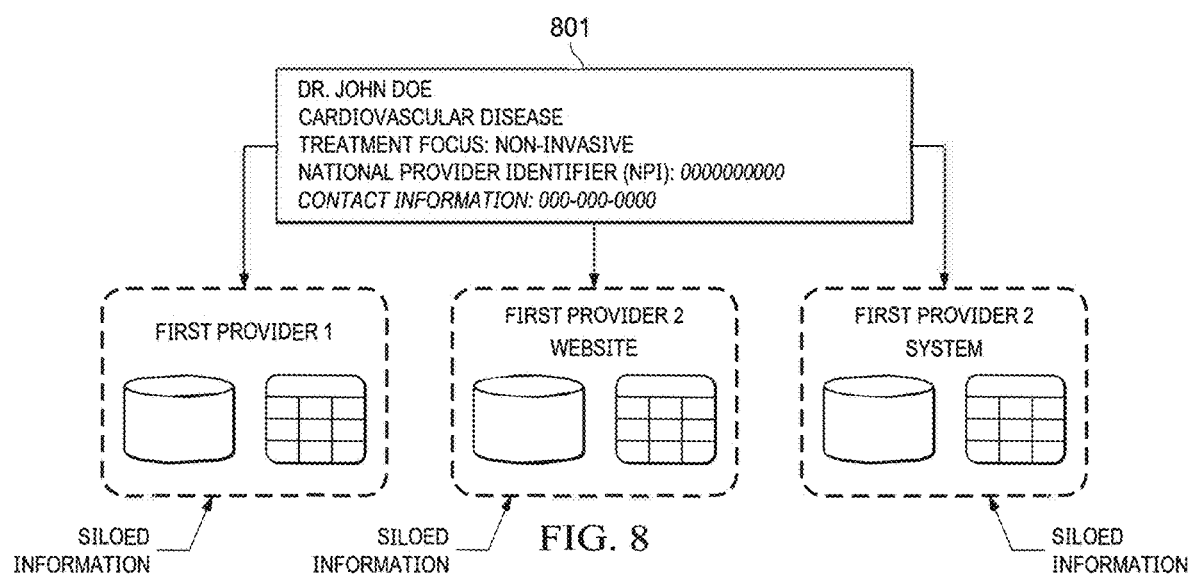
FIG. 8 is a siloed architecture of the platform, according to some embodiments of this disclosure.
Figure 9:
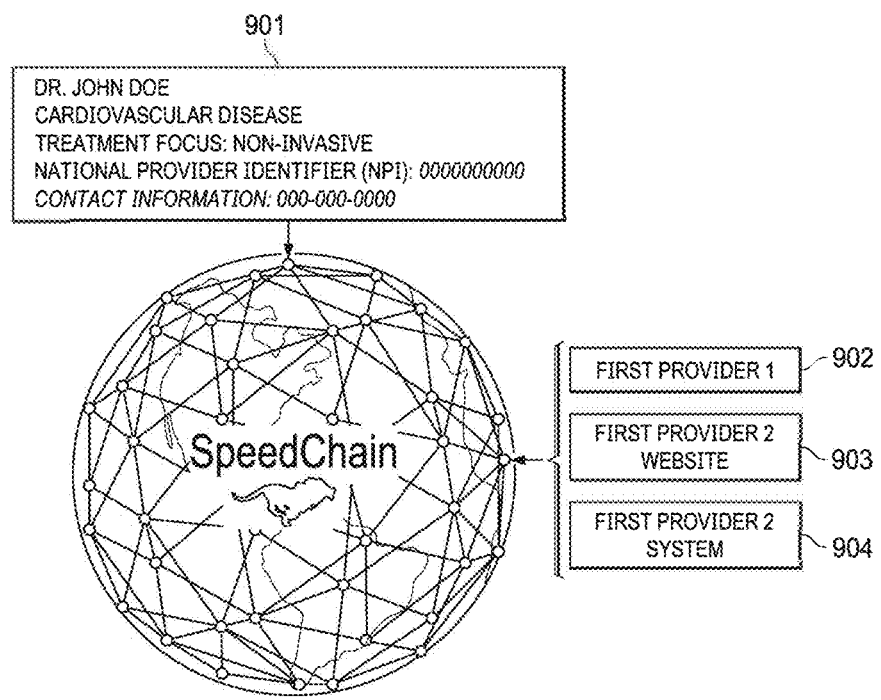
FIG. 9 shows a single point of information adaptation of the platform, according to some embodiments of this disclosure.

By way of example, the platform can serve as a single point (e.g., source) of truth for data associated with stakeholders. For example, while the platform can ensure that information from multiple providers are appropriately siloed as shown in FIG. 8, for example, the platform in some cases can be adapted to serve as a single point of information 901 as shown in FIG. 9 for various providers 902, 903, 904 thus negating the need for having multiple siloed data.

The benefits of the healthcare related embodiment of the platform include, among other things, more transparency for patients, easy to use for patients and other stakeholders, cost awareness, multiple payment options, wellness pricing, increased efficiency, cost reduction, data integration, patient retention, AI and ML functionality, predictive analytics, etc.

Table 1 above provides a summary of some of the features included in the platform. The platform may be part of or integrated into one or more ecosystems or environments described herein. The last two rows of the table indicate that the platform does not include tradeable cryptocurrencies nor is the platform based on an independent blockchain network.

In one embodiment, the platform facilitates process efficiency, process transparency, and process accountability solutions for government agencies. For instance, government agencies may use the platform to restore tourism and recreational opportunities, address critical county and municipal road repairs, rebuild local government infrastructure, rebuild education facilities and increase investment in schools (e.g., K-12 schools), restore critical life-safety services to panhandle communities, and provide affordable housing for displaced families. In accomplishing all this, the platform may provide: data transparency to stakeholders; pricing awareness to stakeholders; AI and ML tools for project optimization; project health or project status data to stakeholders; cross project integration; and cost reduction.

In one embodiment, the platform is used as a solution to address climate issues. More specifically, the platform can be used to provide a sustainable development goal (SGD) that leads to performance improvement using a blockchain ecosystem. In some embodiments, the performance improvements include new distribution capability (NDC) tracking, comparative effectiveness research (CER) and AAU data management, International transaction log monitoring, pre-Conference of the Parties 25 (COP 25) advancements, better use cases for climate neutral now initiative, and better results through AI and ML usage.

To reiterate, the speedchain technology on which the platform is based configured to set up private ecosystems for entities to conduct commerce with data components on both public and private blockchain environments. S.P.E.E.D. or Secure Private Ecosystems for Enterprise Deployment sets out to create private ecommerce environments that have more security, speed and lower cost than a traditional ecommerce platforms. The technology components of speedchain include SyBR, and/or PAIDOL, and/or RECON Smart Contract, or a combination thereof. Members or entities within the ecosystem can set up a unique private key that will allow them to perform activity within the ecosystem. The members include company employees, customers, regulators, vendors etc.

SyBR's function include: setting pre-established rules of the road for conducting transactions within a certain ecosystem?; what functions (e.g., buying and selling, sending information, tracking a device, the parameters of activity (how much does something cost)) will be carried out within the ecosystem?; what temperature does something have to be before sending an alert to a stakeholder?; how much is a limit for an asset transfer at a single location?; during what time frame or within a certain geography is an asset transfer allowed?; etc. These parameters/functions are included in: the issuance smart contract and are then repeated in the RECON smart contract which allows the reporting on the data operation carried out in the issuance contract. SyBR can also launch both the issuance and RECON smart contract within the technology system of Speedchain.

Other details associated with SyBR include a parameterized blockchain data management that: allows preapproved stakeholders seamless access to data; distributes data; enhances security on the platform; prevents unauthorized access to the platform; and that allows for AI/ML capability.

The RECON smart contract is designed to either coexist with an issuance smart contract or operate as a stand-alone smart contract. The purpose of the RECON smart contract is to utilize an additional set of private keys to a blockchain or a distributed ledger technology (DLT) transaction or communication with the purpose of extracting reconciliation information from the issuance contract and collecting the data onto a side chain. The data is then used for reporting purposes. Managing the RECON Smart contract: allows for permissioned functions and side chains to capture and process transaction data; assists in the ease of use for reporting and transparency of data; and allows for Integration into third party Enterprise Resource Planning (ERP) solutions.

PAIDOL is another major differentiator for speedchain versus other blockchain solutions. For every member of an ecosystem, a preapproved issuance ID is associated with the creation of their private key. It is important to note that speedchain does not have access to any member's private key but it does associate a PAIDOL # associated with the creation of the key to transactions. This identifier is then associated with all activity within the ecosystem. This concept is important as it relates to: consent for the sharing of health records; tracking usage for money transfers and AAL/KYC; quality assurance for accounting personnel; and Know Your Resident (KYR) information. In one embodiment, the KYR is a version of the KYC.

Moreover, the platform includes ownership and transactional security that improves security by connecting issuance and custodial information to every transaction. The platform also assists in KYC/AAL compliance. In one embodiment, the platform comprises a hybrid ecosystem including blockchain technology, speedchain technology, and an endpoint device.

Figure 6:
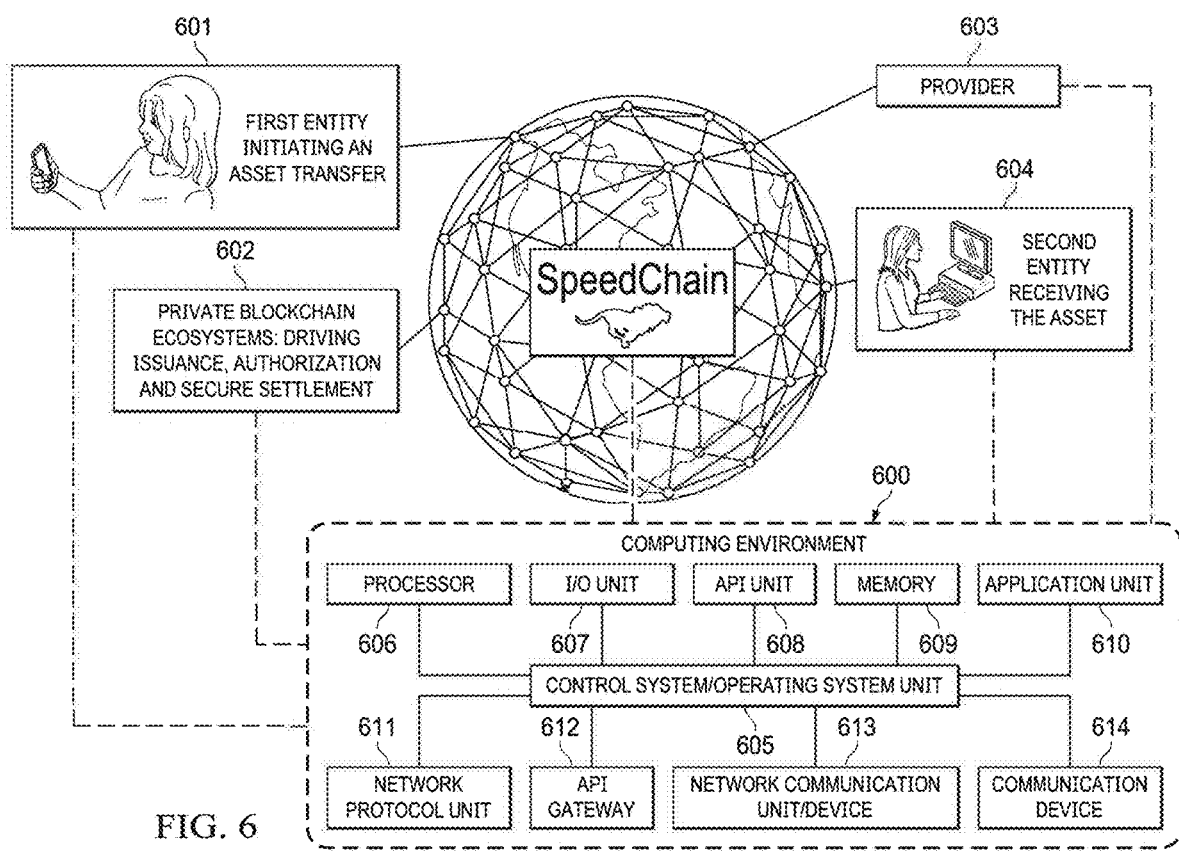
FIG. 6 is a network diagram associated with the platform driven by Speedchain, according to some embodiments of this disclosure, and a computing environment that can be implemented anywhere within the network diagram of FIG. 6 or in the computing environment of any other figure (e.g., FIG. 15) described herein or in any other computing environment not described herein, according to some embodiments of this disclosure.

It is appreciated that the processes executed in association with the platform can be executed by a computing environment such as computing environment 600 shown in FIG. 6. More specifically, computing environment 600 can be used by the first entity to initiate a transaction (e.g., asset transfer) and can also be used by the second entity to initiate a transaction (e.g., asset reception). Computing environment 600 can also be used by the provider associated with the platform to execute the operation of the platform. In essence, computing environment 600 can be used anywhere in the network diagram of FIG. 6. The computing environment 600 may be integrated into one or more computing devices or apparatuses associated with FIG. 6 or any other computing devices or apparatuses or networks illustrated or described herein.

The various systems and modules described in this disclosure may have multiple validation and control points, and multiple actors consuming data. Additionally, one or more systems/modules/subsystems/blocks described herein may: assess whether data associated with a given transaction needs to be reconciled; assess whether there is visibility into a chain of custody (e.g., associated with data, assets, transactions, etc.); and assess whether data needs to be tracked from a given point in time. Additionally, according to some implementations of this disclosure, a KYC process may be implemented/executed by one or more processors by, for example, a social network through one or more e-wallets (or other data storages). Data associated with such a KYC process may be aggregated and managed. Additionally, an aggregated token (or other digital asset) to fiat settlement process may also be performed using the data associated with a KYC process, in some instances.

Figure 10:
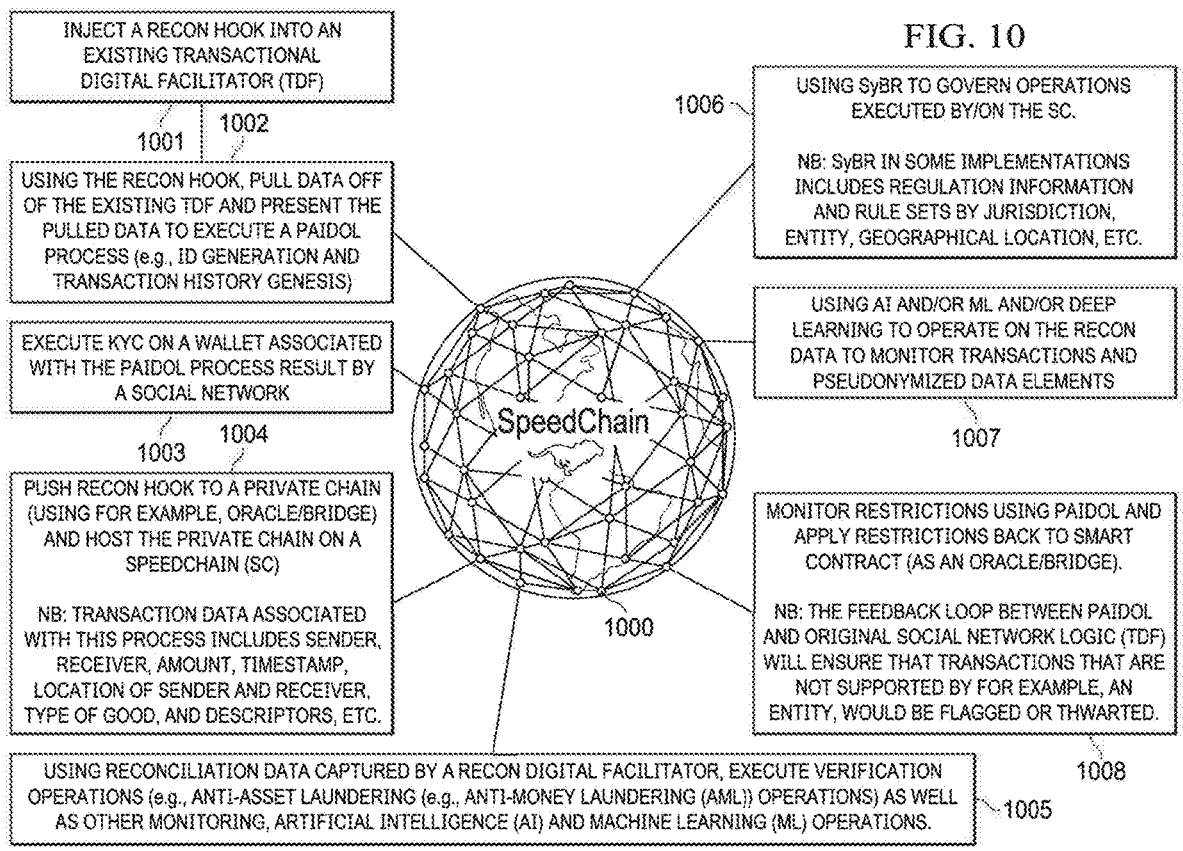
FIG. 10 shows a system for extracting reconciliation data, according to some embodiments of this disclosure.
Figure 11:
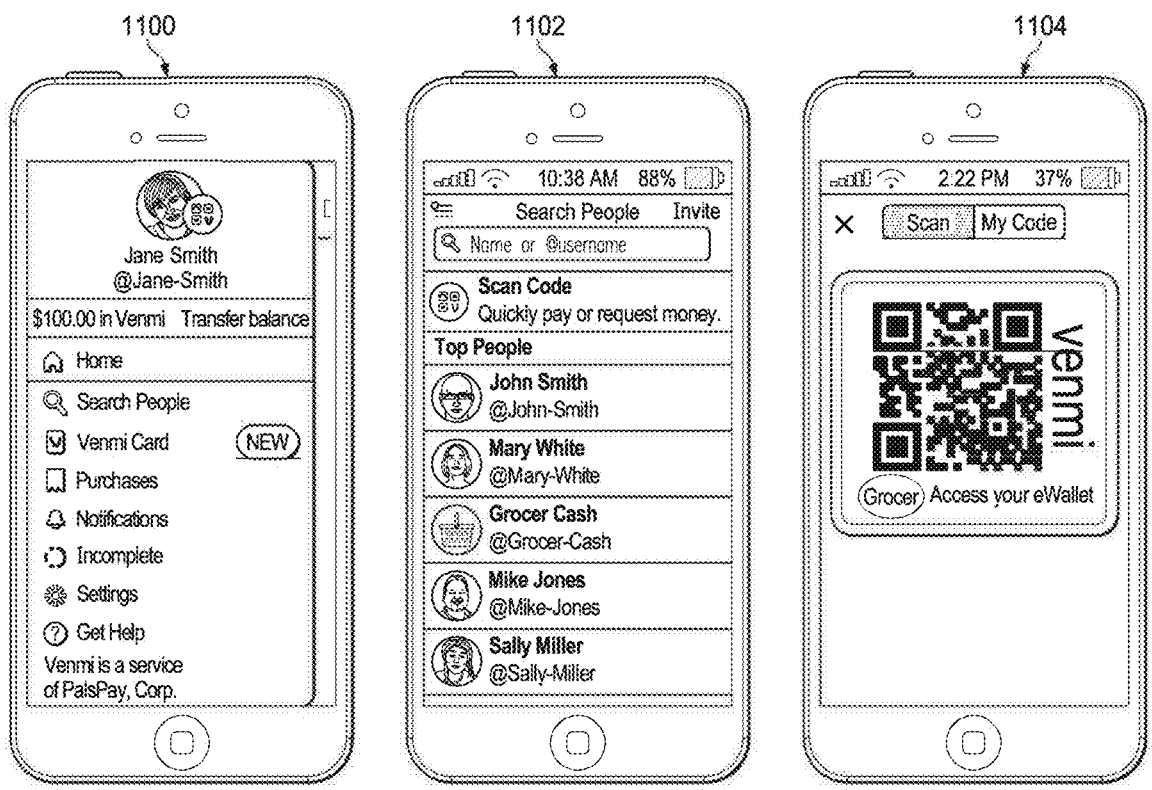
FIGS. 11, 12, 13, 14A and 14B show exemplary user interfaces, according to some embodiments of this disclosure.
Figure 12:
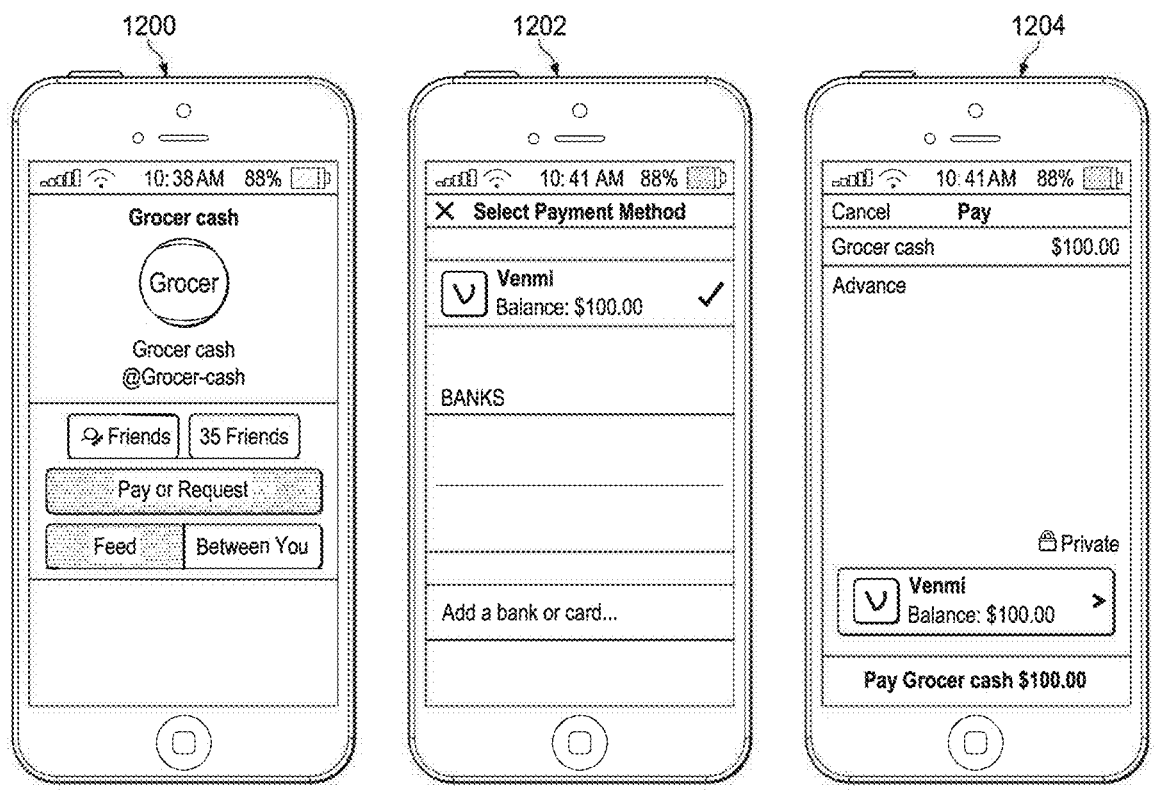
Figure 13:
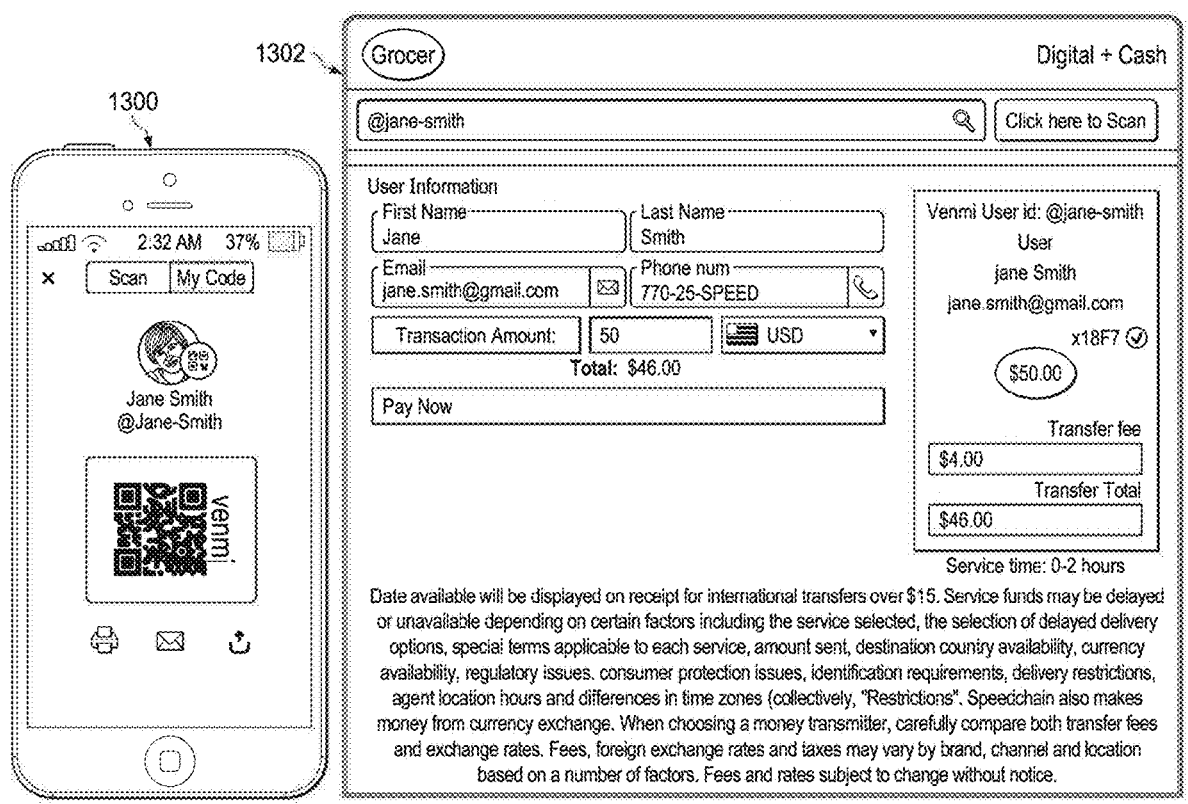
Figure 14A:
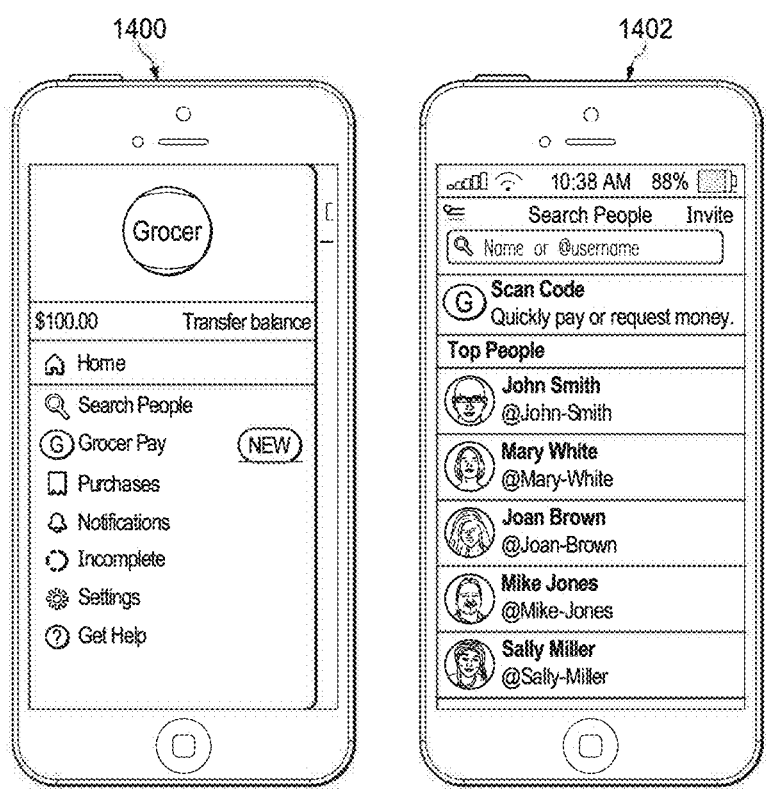
Figure 14B:
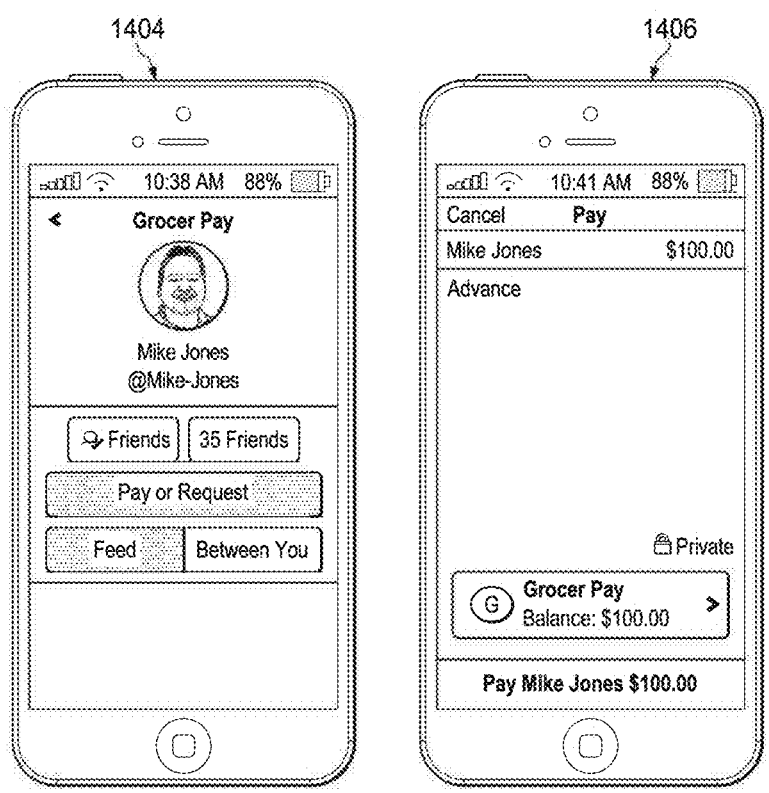

FIG. 10 shows a system for extracting reconciliation data, according to some embodiments of this disclosure. As can be seen in the diagram, various blocks/modules/subsystems are communicatively coupled to the speedchain 1000. According to some implementations, the various blocks/modules/subsystems may be executed by one or more processors as needed. For example, one or more processors may inject, at block 1001, a RECON hook into an existing transactional digital facilitator (TDF). In one embodiment, the TDF may be a smart contract. At block 1002, the RECON hook may be used to pull data off an existing TDF. The hook may be a digital matching or association mechanism. Without the hook, the reconciliation digital facilitator cannot pull the reconciliation data. The pulled data may be presented to execute a PAIDOL process as described elsewhere herein. In some instances, a PAIDOL process may be associated with an ID generation and transaction history genesis associated with the existing TDF.

At block 1003, a social network may execute, using one or more processors, a KYC process on a wallet associated with the PAIDOL process result. The RECON hook may then be pushed to a private chain which may be subsequently hosted on the speedchain 1000. In one embodiment, the RECON hook may be pushed using, for example, Oracle/Bridge, etc. It is appreciated that transaction data associated with the process in block 1003 may include sender information, receiver information, amount, timestamp, location of sender and receiver, type of asset/good being transferred, as well as other descriptors, etc.

Using reconciliation data captured by a RECON smart contract (or digital facilitator), verification operations such as anti-asset laundering (e.g., an anti-money laundering) operation as well as other monitoring using AI (artificial intelligence) and ML (machine learning) operations may be performed at block 1005 on data generated by the process in block 1004. At block 1006, SyBR may be used to govern operations executed by/on the speedchain. It is appreciated that SyBR in some implementations includes regulation information and rule sets by jurisdiction, entity, geographical location, etc.

At block 1007, AI and/or ML and/or deep learning may be used to operate on RECON data to monitor transactions and pseudonymized data elements such as currency, cross-border restrictions, anti-asset laundering, restricted good transactions and other watch lists to comply with regulations (e.g., entity regulations). Restrictions on transactions occurring on the speedchain may be monitored at block 1008 using PAIDOL. In one embodiment, restrictions on associated with transactions on the speedchain may also be applied back to a TDF using on Oracle/Bridge, for example. In some instances, a feedback loop between PAIDOL and the original social network logic (e.g., TDF) may ensure that transactions that are not supported by, for example, an entity, would be flagged or thwarted. It is appreciated that the processes or operations associated with the various blocks/modules/subsystems may be interchangeable as needed and as such may not, in some implementations, have a specific order of execution.

In summary, a reconciliation digital facilitator (e.g., reconciliation smart contact) may hook into or otherwise associate or interact with a transactional digital facilitator that is used on a public blockchain (or private blockchain system). A PAIDOL number or identifier is generated such that both (or more than two) actors (e.g., parties, computing systems, mobile devices, etc.) in a transaction that have smart keys also have a PAIDOL number. The PAIDOL number and reconciliation information data from the transactional digital facilitator is pulled into a sidechain ecosystem such that verification processes can be performed on the reconciliation data.

Establishing trust between actors (e.g., senders and recipients of data) on a public blockchain environment is costly and inefficient. It is therefore more efficient to just verify a transaction or computing operations performed between the actors. The present invention enables that efficiency. The present invention allows digital assets to be utilized in a network environment (e.g., a network environment associated with regulations or rules that govern transfer of data, etc.). The data may be currency, money, or any other type of asset. The systemized blockchain reconciliation (SyBR) system establishes logic associated with different jurisdictions' (e.g., geographical jurisdictions) rules associated with data transfer or exchange. The SyBR system (or a different system or network that interacts with the SyBR system) also establishes one or more data operations loop identifiers (e.g., PAIDOL number) for each actor in the network environment. Each actor may play a role in the data transfer or exchange (e.g., sender, recipient, storage, provision of security for the data transfer or exchange, etc.). The system may utilize a reconciliation digital facilitator (e.g., smart contract) to extract reconciliation data from the transactional digital facilitator (e.g., associated with or established by the social network and used on a public blockchain network) and pull that reconciliation data to a sidechain (which may also be known as the SpeedChain). Verification processes may then be performed on the reconciliation data. The verification processes include those associated with anti-money laundering, anti-terrorist financing, machine learning, etc.

Embodiments of this disclosure may provide a non-transitory computer-readable medium comprising computer-readable code configured for performing one or more methods, operations, or functions described herein. In some embodiments, the apparatus may include a resource allocating system (e.g., in the processor or separate from the processor) for allocating memory and/or power resources among the various components of the apparatus. In some embodiments, one or more computing device processors (located in the same system or disparate systems which may be located in the same or different location(s)) may be used to perform various operations, methods, or functions described herein.

The processor 606 may control any of the other units in the apparatus, elements of those units, and/or functions performed by those units. Any actions described herein as being performed by a processor may be taken by the processor alone and/or by the processor in conjunction with one or more additional processors, units, subunits, elements, components, devices, and/or the like. Additionally, while only one processor may be shown in the figures, multiple processors may be present and/or otherwise included in the computing environment 600 (see FIG. 6). Thus, while instructions may be described as being executed by the processor (and/or various units of the processor), the instructions may be executed simultaneously, serially, and/or by one or multiple processors in parallel.

In some embodiments, the processor 606 may be implemented as one or more computer processor (CPU) chips and/or graphical processor (GPU) chips and may include a hardware device capable of executing computer instructions. The processor may execute instructions, codes, computer programs, and/or scripts. The instructions, codes, computer programs, and/or scripts may be received from and/or stored in the memory, the I/O unit, the network communication device, sub-units and/or elements of the aforementioned units, other devices and/or computing environments, and/or the like. As described herein, any unit and/or subunit (e.g., element) of the computing environment and/or any other computing environment may be utilized to perform any operation. In some embodiments, the computing environment may not include a generic computing system, but instead may include a customized computing system designed to perform the various methods described herein.

The memory 609 may include random access memory (RAM), read only memory (ROM), and/or various forms of secondary storage. RAM may be used to store volatile data and/or to store instructions that may be executed by the processor. For example, the data stored may be a command, a current operating state or configuration of the apparatus, and/or the like. As a further example, data stored in the memory may include instructions related to various methods and/or functionalities described herein. ROM may be a non-volatile memory device that may have a smaller memory capacity than the memory capacity of a secondary storage. ROM may be used to store instructions and/or signals that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory may include one or more databases for storing any data described herein. Additionally or alternatively, one or more secondary databases located remotely from the computing environment may be utilized and/or accessed by the memory.

In some embodiments, the memory 609 may be utilized for storing, recalling, receiving, transmitting, and/or accessing various instructions or data during operation of the apparatus. The memory may include various types of data storage media such as solid state storage media, hard disk storage media, and/or the like. The memory may include dedicated hardware elements such as hard drives and/or servers, as well as software elements such as cloud-based storage drives. In some embodiments, the memory may include various units such as an operating system unit (which may also be referred to as a control system unit), an application unit, and/or an application programming interface (API) unit.

The operating system unit 605 may facilitate deployment, storage, access, execution, and/or utilization of an operating system utilized by the computing environment and/or any other computing environment described herein. In some embodiments, the operating system may include various hardware and/or software elements that serve as a structural framework for enabling the processor to execute various operations described herein. The operating system unit may further store various pieces of information and/or data associated with operation of the operating system and/or the computing environment as a whole, such as a status of computing resources (e.g., processing power, memory availability, resource utilization, and/or the like), runtime information, modules to direct execution of operations described herein, user permissions, security credentials, and/or the like. The computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The application unit 610 may facilitate deployment, storage, access, execution, and/or utilization of an application utilized by the computing environment (e.g., associated with the apparatus). For example, users may be required to download, access, and/or otherwise utilize a software application on the apparatus or a computing device in communication with the apparatus in order for various operations described herein to be performed. Information included in the application unit may enable a user to execute various operations described herein. The application unit may further store various pieces of information associated with operation of the application and/or the computing environment as a whole, such as a status of computing resources (e.g., processing power, memory availability, resource utilization, and/or the like), runtime information, modules to direct execution of operations described herein, user permissions, security credentials, and/or the like.

The API unit 608 may facilitate deployment, storage, access, execution, and/or utilization of information associated with APIs of the computing environment. For example, computing environment may include one or more APIs for enabling various input systems, computing devices, applications, and/or computing environments to communicate with each other and/or perform operations on data. Accordingly, the API unit may include API databases comprising information that may be accessed and/or utilized by applications and/or operating systems of other devices and/or computing environments. In some embodiments, each API database may be associated with a customized physical circuit included in the memory and/or the API unit.

The I/O unit 607 may facilitate the receipt, transmission, processing, presentation, display, input, and/or output of data as a result of executed processes described herein. In some embodiments, the I/O unit may include a plurality of I/O units. In some embodiments, the I/O unit may include one or more elements of a computing device, a server, and/or a similar device. The I/O unit may include a variety of elements that enable a user to interface with the computing environment. For example, the I/O unit may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O unit may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O unit may communicate with one or more elements of the processor and/or the memory to execute operations described herein.

The network communication device 613 may facilitate establishment, maintenance, monitoring, and/or termination of communications between the computing environment (e.g., associated with the apparatus) and other devices such as other apparatuses, computing devices, other computing environments, server systems, and/or the like. The network communication device may further enable communication between various elements of the computing environment. In some embodiments, the network communication device may include a network protocol unit, an API gateway, and/or a communication device. The network communication device may include hardware and/or software elements.

The network protocol unit 611 may facilitate establishment, maintenance, and/or termination of a communication connection between the computing environment (e.g., associated with the apparatus) and another device (e.g., associated with another apparatus or another computing device) by way of a network. For example, the network protocol unit may detect and/or define a communication protocol required by a particular network and/or network type. Communication protocols utilized by the network protocol unit may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment and any other device, as well as any element internal to the computing environment, may include transforming and/or translating data from being compatible with a first communication protocol to being compatible with a second communication protocol. In some embodiments, the network protocol unit may determine and/or monitor an amount of data traffic to consequently determine which particular network protocol is to be used for transmitting and/or receiving data.

The API gateway 612 may facilitate the enablement of the apparatus, or other devices and/or computing environments, to access the API unit of the memory unit of the computing environment (e.g., associated with the apparatus or other apparatuses or computing devices). For example, a computing device may access the API unit via the API gateway. In some embodiments, the API gateway may be required to validate user credentials associated with a user of a computing device prior to providing access to the API unit to the user. The API gateway may include instructions for enabling the computing environment to communicate with another device.

The communication device 614 may include a variety of hardware and/or software specifically purposed to enable communication between the computing environment and another device, as well as communication between elements of the computing environment. In some embodiments, the communication device may include one or more radio transceivers, chips, analog front end (AFE) units, antennas, digital or analog processors, memory, other logic, and/or other components to implement communication protocols (wired or wireless) and related functionality for facilitating communication between the computing environment and any other device. Additionally and/or alternatively, the communication device may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements be provided according to the structures disclosed herein may be included in integrated circuits of any type to which their use commends them, such as ROMs, RAM (random access memory), DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as digital signal processors (DSP), graphics system processors (GSP), synchronous vector processors (SVP), and image system processors (ISP) all represent sites of application of the principles and structures disclosed herein.

This application claims the benefit of U.S. Provisional Patent Application No. 62/786,202, titled "Asset-backed network token for use in a hybrid distributed ledger-based network ecosystem," filed Dec. 28, 2018, which is incorporated by reference herein in its entirety for all purposes. This application claims priority to and incorporates by reference U.S. application Ser. Nos. 16/414,516, 16/414,524, 16/414,530, and 16/414,536, all filed on May 16, 2019, in their entirety for all purposes. This application claims the benefit of and incorporates by reference U.S. Provisional Application No. 62/888,167, filed Aug. 16, 2019, in its entirety for all purposes. This application incorporates by references the entirety of PCT/US2019/68705, filed Dec. 27, 2019, in its entirety for all purposes.

Embodiments described herein are directed to private blockchain ecosystems and associated distributed applications. In some embodiments, data may be encrypted and stored on a distributed ledger in a blockchain system such that a next data entry in a chain of stored data entries cannot be computed/processed unless information (e.g., time stamp) regarding the previous data entry is available. In some embodiments, the processing of the next data entry may be part of any authentication operation described herein. In some embodiments, authentication/approval (e.g., of a user's computing operation such as those described below) may be performed using information associated with a data block that comprises a data entry or a sub-data block, which may be referred to as a microblock or nanoblock, that includes more granular information compared to the larger data block. In some embodiments, authentication using the sub-data block is more secure compared to a larger data block. In some embodiments, the blockchain ecosystem described herein enables securing transaction custody, validating ownership, and tracking data integrity while automating communication.

In some embodiments, a private ecosystem comprises or is formed by a predetermined set of entities. In some embodiments, one entity (e.g., a super-entity) may authorize other entities to appoint superusers. Each predetermined entity (may also be referred to as a founding entity) assigns or authorizes superuser status to least one user under the control of the predetermined entity. The superuser has the power to allow/approve users into the private ecosystem. Approving a user to enter an ecosystem (e.g., before the user actually enters the ecosystem) may be referred to as a pre-approved issuance. These users allowed into the private ecosystem may be referred to as pre-approved users. As used herein, a user may refer to at least one of a person, an entity, a computing system, a mobile device (e.g., a mobile phone), an Internet of Things (IOT) device, a network, a location (e.g., physical location, network location, etc.), a node, or any combination thereof. At the time the user is approved to enter the private ecosystem (and/or at the time the user enters the private ecosystem and/or at the time the user creates a user credential to enter the private ecosystem), a unique identifier (e.g., numbers, letters, symbols, or any visual or non-visual indicia) may be associated with the user. A data operations loop computing operation tracks computing operations, transactions, activity, transfers, communications, transmissions, receipts, access logins, access logout, reads, writes, edits, etc., associated with (e.g., initiated by or executed by or involving) the unique identifier ("PAIDOL" identifier). A user creates a private key that is not shared with anybody and is known only to the user. The private key may be at least one of a username, password, retinal scan information, fingerprint information, or any other kind of visual or non-visual indicia that can be used as an authentication credential to at least one of enter the private ecosystem and perform a computing operation that is trackable in the private ecosystem. The unique identifier that is associated with the private key is merely associated with creation of the private key (the system described herein has knowledge that the private key has been created but does not have knowledge of what the private key is and/or the elements of the private key and/or even a partial portion of the private key). In some embodiments, the PAIDOL identifier is used by the Data Operations Loop portion of PAIDOL to track activity associated with the users, wherein the activity is going to or associated with the distributed application layer of the system. PAIDOL is essentially a security system for the private blockchain ecosystem.

As an example, a law firm could be or could implement a private blockchain ecosystem for storing data. For example, one or more offices of an international law firm could be a founding entity. One or more of the offices may authorize a superuser to add each employee of the one or more of the offices as pre-approved users who are assigned PAIDOL numbers. In an IOT embodiment, a PAIDOL number may be provided for a location (e.g., a house) or each system in a house. The PAIDOL number can be used to monitor activity associated with systems in the house.

In some embodiments, the PAIDOL identifier for a user is generated substantially simultaneously with the generation of the private key by the user. In some embodiments, one cannot be generated without the other.

The private ecosystem, or any of the founding entities associated with the ecosystem, may establish rules or parameters associated with pre-approving users, defining what computing operations or activity a particular user (e.g., associated with a predetermined entity) or a superuser can engage in, defining what activity may constitute "good" behavior in the private ecosystem (e.g., thereby earning a user a certain amount of communication currency in the private ecosystem), defining what activity may constitute "bad" behavior in the ecosystem (e.g., thereby causing an amount of communication currency possessed by the user to be deducted by a certain amount or "spent"), etc. In some embodiments, when a quantifiable amount of "bad" behavior is equal to or greater than a certain threshold, the user associated with the "bad" behavior may be prevented from accessing the private blockchain ecosystem, or may be tagged or otherwise placed on temporary probation. In some embodiments, the communication currency may be non-fungible non-financial currency issued to pre-approved users in a blockchain ecosystem. This communication currency is useful in a cybersecurity context. The process of providing and taking away communication currency from users in a blockchain ecosystem may be used for securing an IOT network. In some embodiments, a hardware (or software) system or device may be introduced into the system that provides the function of securing the IOT network. In some embodiments, this system or device provides the function of providing and/or taking away communication currency from users in a blockchain ecosystem (or in a non-blockchain IOT network system or any other network system). In some embodiments, any features or embodiments described in this disclosure with regard to the private blockchain ecosystem may also be equally applicable or incorporated in a public blockchain ecosystem.

This process reduces the private blockchain system's susceptibility to Sybil attacks because no "bad" user can last for an extended period of time in the ecosystem. In some embodiments, the parameters and rules associated with issuance and taking away communication currency may be established by SyBR either before, after, or at the time of creating the private blockchain ecosystem. This may be useful in an Internet of Things (IOT) context. For example, a smart TV in an IOT network may be limited to ten operations as defined by SyBR. If the smart TV performs an operation not defined by SyBR (e.g., mimicking another device in the IOT network), the smart TV's access to the host of the IOT network (or other devices in the network) is limited to fewer operations or is cut off (e.g., for a period of time). Therefore, PAIDOL is important in securing IOT devices because it enables tracking of activity associated with (e.g., initiated by or executed by) IOT devices.

In some embodiments, the private blockchain ecosystem described herein is less susceptible to Sybil attacks and 51% attacks. In some embodiments, the ecosystem described herein can stop a user from violating rules of the ecosystem. For example, with regard to transfer (e.g., data transfer, money transfer, etc.), a user may send a certain amount from one branch and since there is a limit for one branch, may go to another branch and send another amount. The ecosystem described herein may detect this attempted second transfer and prevent it from occurring. PAIDOL is important because the PAIDOL identifier may be associated with a pre-approved user/branch attempting the transfer in the private blockchain ecosystem and can be used to stop the transfer or limit the transfer or deduct communication currency associated with the user or the branch. The ecosystem described herein is less or not susceptible to 51% attacks like other blockchain ecosystems because there are no private miners in the ecosystem.

In some embodiments, any of the computing activity initiated or executed by users (e.g., associated with the unique identifier) may involve or be associated with digital tokens. As used herein, a digital token may be a digital representation of a physical asset that might have tangible value. In other embodiments, any of the computing activity initiated or executed by users (e.g., associated with the unique identifier) does not involve and is not associated with digital tokens.

In some embodiments, analytics (cognitive hybrid intelligence) are provided based on the actions in the private ecosystem associated with the identification information. These analytics may be useful in a GDPR (European model) context where trends can be analyzed from data associated with a PAIDOL identifier without revealing the actual identity of the user. In some embodiments, machine learning operations are performed on data collected in the private blockchain ecosystem and predictive analytics can be generated. For example, a predictive analytic can include predicting what percentage of felons who choose "Plan C" do not go to prison again or what percentage of cases have a particular outcome. The machine learning data may be secured and encrypted in the private blockchain ecosystem.

SyBR is a computing tool (e.g., including software and/or hardware) to establish parameters or rules of activity in a private blockchain ecosystem. These parameters or rules may be established either before or at the time of establishing the private blockchain ecosystem. The activity includes user activity. Therefore, SyBR drives the ecosystem. For example, a founding entity may establish a file uploading interface that remains private for other founding entities within the private ecosystem such that the uploaded data remains secure but can still be operated on (e.g., any of trackable operations described herein) by users of the founding entities. The data can be published and the operations (e.g., including communication logs) associated with the data can be tracked using the PAIDOL identifier associated users who initiated, executed, or otherwise participated in the operations. In some embodiments, the publishing operation may comprise a choice such that either all founding entities (e.g., the pre-approved users of the founding entities) or only a section of the founding entities (e.g., their pre-approved users) or only a group of pre-approved users can view (or otherwise operate on (e.g., any of trackable operations described herein)) the published data. SyBR is a digital facilitator and may be referred as an issuance digital facilitator. In some embodiments, this digital facilitator on a transaction chain or controls activity of transaction nodes by using an issuance digital facilitator architecture.

"RECON" may refer to a reconciliation digital facilitator and/or a side chain associated with this digital facilitator. This digital facilitator provides a unique way of accessing data in the private blockchain ecosystem. In some embodiments, when a user creates a private key, Speedchain (e.g., private blockchain network ecosystem) creates its own private key and/or RECON creates its own private key. RECON essentially is a user on any computing operation or transaction described herein such that RECON access reconciliation data associated with the computing operation or transaction. In some embodiments, SyBR controls what type of data (and/or operation) RECON can access (and publish to the side chain) in the private blockchain ecosystem. In some embodiments, SyBR does not have a publishing function that RECON has. In some embodiments, RECON gathers data from the ecosystem that SyBR has created or initiated the creation of (via users) and reports it to entities on the side chain which is different from the main transaction chain where SyBR operates. RECON uses its own private key to access SyBR and/or the data and/or the transactions created or initiated by SyBR.

In some embodiments, a digitized copy of a tangible or physical asset may be referred to an "ECHO" of the tangible or physical asset. The ECHO may be an electronically captured object associated with the tangible or physical asset. In some embodiments, a SyBR mesh or cybermesh or digital asset mesh is provided. When a token for an asset is created (e.g., at the time of creation) on the private blockchain system, a digital asset mesh (or data operations loop) is provided around it or is wrapped around the tokenized asset. This data operations loop is a secure layer. The digital asset mesh comprises a set of private keys or security blanket over and on top of digitizing and/or tokenizing the physical asset. The data operations loop tracks operations or transactions associated with the asset in the ecosystem. Any of the features associated with the data operations loop associated with PAIDOL can be applied to the data operation loop associated with the digital asset mesh. In some embodiments, the digital asset mesh that wraps around the digital asset may be further encrypted and stored in the private blockchain ecosystem.

UNIFI Implementation

In some embodiments, a master data exchange (or a private blockchain ecosystem) such as UNIFI may be provided. The master data exchange provides secure access to files and provides secure transfer of files. Any user who is uploading, viewing, editing, etc., files has a PAIDOL identifier. SyBR is used to set up logic and processes associated with the ecosystem. This embodiments is directed to improving discovery reform in the criminal justice system. A founding entity may have an authorized superuser who provides pre-approval for users under the control of the founding entity (or under control of other founding entities) to use the private blockchain ecosystem. The pre-approved user is assigned a PAIDOL identifier that allows the user entry into the private blockchain ecosystem. In some embodiments, the PAIDOL identifier may be generated by any of the digital facilitators (e.g., the issuance digital facilitator) described herein. The ecosystem enables fast and secure access to data to all permissioned or pre-approved parties.

UNIFI computing system (e.g., combination of hardware and/or software) powered by Speedchain allows criminal justice stakeholders to create a "Master File" that all parties will have access to share important files with each other while a case is processed through the criminal justice system. UNIFI is substantially more secure than most case management systems since the backbone of our system is built on Speedchain, an enhanced version of Blockchain designed and built for criminal justice users who need to share sensitive information about cases rapidly. Data files put into UNIFI can be instantly shared with any stakeholder that is authorized to see the files, so control of an agency's information is never compromised. UNIFI can store an unlimited amount of data, so there never needs to be a concern about how long data will be available to access. UNIFI will allow an Agency to collect, store, organize, and exchange massive amounts of written (any type of report), oral (911 Calls etc.), voice (conversations that are taped) and video (body cam, Fire Dept., EMS, etc.) data between stakeholders in the criminal justice system. UNIFI provides the power to protect department and user data, lower operating expense, leverage AI and machine learning and seamlessly connect with criminal justice stakeholders. UNIFI increases the speed, accuracy, and capacity of case file data transfers between agencies. Recent Criminal Justice Reforms in New York will require agencies to look at their processes differently. UNIFI unites criminal justice stakeholders on a single, secure data management platform capable of storing and transferring massive amounts of data in near real-time. With a unified information transfer system, involved agencies (e.g., law enforcement, first responders, public defenders, prosecution and district attorneys, courts and judicial systems, defendants, grand juries, etc.) will be literally reading from or accessing the same page or portal.

The system allows: managing files from a single platform, sharing data with a click of a button, uploading reports, body camera footage, first responder recordings, securing access by users and groups, creating reports of user activity, etc. In some embodiments, the enterprise blockchain ecosystem will automate the collection, storage, and distribution of any and all types of case file data from any and all agencies who are or may be involved in the prosecution and disposition of a case, from the moment a 911 call is placed to the termination of a sentence no matter how long that takes and no matter how many twists and turns a case may take while it runs its course. The blockchain ecosystem may utilize at least one of SyBR (digital facilitators associated with transactions in the ecosystem), RECON (digital facilitators for reporting to approved third parties and regulators), PAIDOL (for distributing immutable and secured data on permissioned nodes in the blockchain ecosystem), and CHI (AI and machine learning for data health and wealth), etc.

UNIFI's capabilities are as follows:

TABLE 2

Capabilities of UNIFI.

| Capabilities | Why it Matters |
| --- | --- |
| Agencies use their Case Management System to load case related data files into UNIFI. | No need to spend time training on inputting data in a new case management system. |
| UNIFI will allow for the instant exchange of required case file information to other stakeholders. This means that any agency who is using UNIFI can have multi-directional communication using the actual data/media files that make up a criminal justice case. | UNIFI will allow Agency personnel to instantly publish data files in the system so that others may view it, making the compliance with Discovery Reform laws viable for any Agency who is using UNIFI. |
| UNIFI is agnostic, not favoring any of Law Enforcement, Prosecution, Defense Bar, Courts or any other segment of the criminal justice system. | UNIFI merely creates a single portal for files relating to any and all cases to reside so that those who are authorized can share data files rapidly and conveniently. |

TABLE 2-continued

Capabilities of UNIFI.

| Capabilities | Why it Matters |
| --- | --- |
| Each Agency working on a case will have total control over their data. | Agency administrators will determine what information is loaded into UNIFI and who will be allowed to see it. |
| Due to UNIFI's structure on the Speedchain backbone, cross-county and cross-state agencies can access each other's data as it relates to a defendant or a case under the rules defined by the Administrators in each Agency | As we know, defendants often cross jurisdictions, and the case may reflect this. UNIFI can accommodate multiple agencies from multiple jurisdictions working on a case or working with a defendant |
| UNIFI can store an unlimited amount of data so any case created in UNIFI can be accessed indefinitely. | Any amount of data that is necessary to comply with Discovery rules and laws can be stored including video (body cam, interviews, etc.), voice (911 calls, etc . . .) lab reports or police reports related to any case can be stored and shared indefinitely. |
| All Agency activity in UNIFI is private and secure. | An agency (e.g., user or founding entity) with access to UNIFI cannot view or track any other agencies activity. Within an Agency, only those with Administrator access can view and track activity. No one will ever know if or how many times a file has been accessed. |
| UNIFI can identify identical documents being published, identifying duplicate documents. | Opening and viewing duplicate documents can be a wasteful time drain. Knowing that certain files are duplicates of others in the case file will save time. |
| UNIFI can identify if a file that has been downloaded and uploaded has been edited. Security measures such as Cryptography and Encryption ensure that only those users who are authorized can see case file data | UNIFI will allow the "new" file to be loaded and published, but will assign a new file name. Agency Administrators will control who sees what and when. If many people need to see a case file, it can be set to be viewed by many. If the case file has information that is intended to be shared with only one or two parties, UNIFI can accommodate that as well. One to One or One to Many. |
| If a case gets sealed, UNIFI can quickly seal the case so that it is no longer viewable by any party, per the Court's order. | Case file transitions are easy to accommodate in UNIFI. |
| As a case continues to migrate though the criminal justice system, additional agencies. who get assigned to work the case such as Probation, Corrections, Parole, 3$^{rd}$ Party Collateral contacts can continue to share data through UNIFI. | UNIFI is not limited to serving Law Enforcement, Prosecution, and Defense Bar. UNIFI can also serve ANY agency, public or private, that may encounter a case and/or defendant during the life of a case. Probation, Alternative Sentencing, County Correctional Services, NYDOC, Parole, Treatment, and private 3$^{rd}$ party groups supporting the public agencies can all work on a single case file and share important information about a case or defendant. |

In some embodiments, files that are uploaded are private and are not accessible by the other party for e.g., DA cannot see Defense files and vice versa. In some embodiments, only shared files can be viewed by both parties. In some embodiments, account logins are protected by MFA (Multi-factor authentication) ensuring that users' login information is safe and secure. In some embodiments, UNIFI can support single sign-on (SSO) with SAML or SAML (Secure Assertion Markup Language) to integrate into the county's SSO to eliminate dual logins. In some embodiments, Speedchain is built using an AD (Active Directory) platform and can integrate into an Active directory system. In some embodiments, UNIFI does not limit by the number of files uploaded or downloaded (capacity in Petabytes). In some embodiments, there is no file size limit, although a maximum file size of 1 GB ensure faster uploads and downloads. In some embodiments, the files are stored securely. In some embodiments, Speedchain technology is built with security for all uploaded files, including military grade encryption, key vault for key storage and smart contracts for access control. In some embodiments, Speedchain technology disallows file tampering, as every file is identified by a unique fingerprint consisting of encoded and hashing algorithms that prevent tampering.

In some embodiments, Speedchain technology can detect a duplicate file that has been shared, within a case. Additionally, the file is marked as duplicate whereby reducing wasted time in duplicate file processing. In some embodiments, Speedchain does not have access to any of the files in the system as each file is encrypted with user's private keys that are stored on user's wallet. In some embodiments, activity on a file uploaded, downloaded, viewed etc. is private and cannot be viewed by the other party, for e.g.: DA cannot see the number of times a file had been viewed by the Defense and vice versa. In some embodiments, all files are stored on UNIFI are stored on UNIFI forever (~100 years), unless a case is sealed or purged by Court order. In some embodiments, any files longer than 3 years will be available for access after 24 hours upon request. In some embodiments, UNIFI supports sealing of case upon Court order or by jurisdiction like Juvenile cases. In some embodiments, once a case has been sealed, no further file access is allowed unless expunged by a Court order. In some embodiments, once a case has been closed by the Admin, all the concerned parties (DA, Defense, PD) will be notified via email (or other communication mechanism) that a case has been sealed. In some embodiments, a case can be expunged for further review. In some embodiments, UNIFI provides an ability for a party to mark for completion after necessary files have been shared, e.g., DA can issue a certificate of completion once basic files have been added to the case within the 15 day limit. Similarly, in some embodiments, Defense team can issue a certificate of completion once they have shared the necessary files within the 30 day limit. In some embodiments, UNIFI will notify the other party of the completion status via email (or other communication mechanism).

In some embodiments, UNIFI can be integrated into a county's case management system without the need to upload files thereby increasing efficiency. In some embodiments, UNIFI uses Speedchain technology built with APIs like REST APIs, SOAP, EDI or HTTP(s) built with Oauth or Oauth2 style authentication. In some embodiments, Speedchain supports various formats like JSON, XML, csv or other native formats. In some embodiments, UNIFI is built on Blockchain technology that provides Security, Scalability, Reliability and tamper-resistancy. In some embodiments, Speedchain is different from Bitcoin and other cryptocurrencies. In some embodiments, Speedchain is neither a currency nor a public chain. In some embodiments, Speedchain uses smart contract or digital facilitator technology built on permissioned blockchain to ensure data privacy and access controls to the data comprised on or associated with the permissioned blockchain. In some embodiments, Speedchain is built on a permissioned or private blockchain that is not accessible for public networks such that data is securely stored in the UNIFI ecosystem and only authorized users can access the data.

Tangible Assets Implementation

In some embodiments, embodiments described herein can be used to tokenize oil, gas, land, mineral, rights, leases, and titles, and/or royalties ("tangible assets") associated with the same, and/or triggers that kick off the royalties associated with the same. In some embodiments, a private blockchain ecosystem is established where SyBR drives procedures for tokenizing, storing, and communicating (or any other data-related operations described herein) tokenized or digital versions of the tangible assets, or associated data, by pre-approved users in the private blockchain ecosystem. In some embodiments, a tangible asset may be a physical asset. In other embodiments, a tangible asset may be a non-physical asset. In some embodiments, RECON is used to grab or capture the tokenized, stored, or communicated data and make it publishable to regulators, owners, etc., (e.g., on the side chain). When a pre-approved user sets up their private key in the ecosystem, PAIDOL identifies each private key holder in the ecosystem. CHI (Cognitive Hybrid Intelligence) produces analytics based on all the data. In some embodiments, the tokenized data may be exchanged in any of the data exchanges described herein. In some embodiments, each pre-approved user may have a PAIDOL identifier issued by Speedchain and a private key created or generated by the user. In some embodiments, each tangible asset may have a PAIDOL identifier. The ecosystem enables computing, tracking, and storing of data. For example, digital facilitators (e.g., any of the digital facilitators described herein) drive triggers for payment (e.g., royalty payments). Additionally, SyBR and associated digital facilitators provide automated logic for tracking and transferring ownership of the tangible assets. In some embodiments, this system may also be used for intangible assets such that all procedures and features described with regard to tangible assets are equally applicable with regard to intangible assets. In some embodiments, any instances of "pre-approved" may be replaced by "approved." In some embodiments, an approved user is a user who was pre-approved or approved either before, simultaneously, or after the user created a private key.

FIGS. 11, 12, 13, 14A, and 14B show exemplary user interfaces, according to some embodiments of this disclosure. In 1100, a user opens an app (e.g., a mobile app). In 1102, the user chooses the scan option. In 1104, the user scans a QR code. In 1200, the user selects an option to pay. In 1202, the user confirms the option to pay. In 1204, the user selects pay. In 1300, the user presents the QR code for an associate at the Grocer. In 1302, the associate scans the QR code, verifies, and pays the user. In 1400, the user opens an app. In 1402, the user chooses a recipient. In 1404, the user confirms the recipient and/or the option to pay the recipient. In 1406, the user finalizes and pays the recipient.

Figure 15:
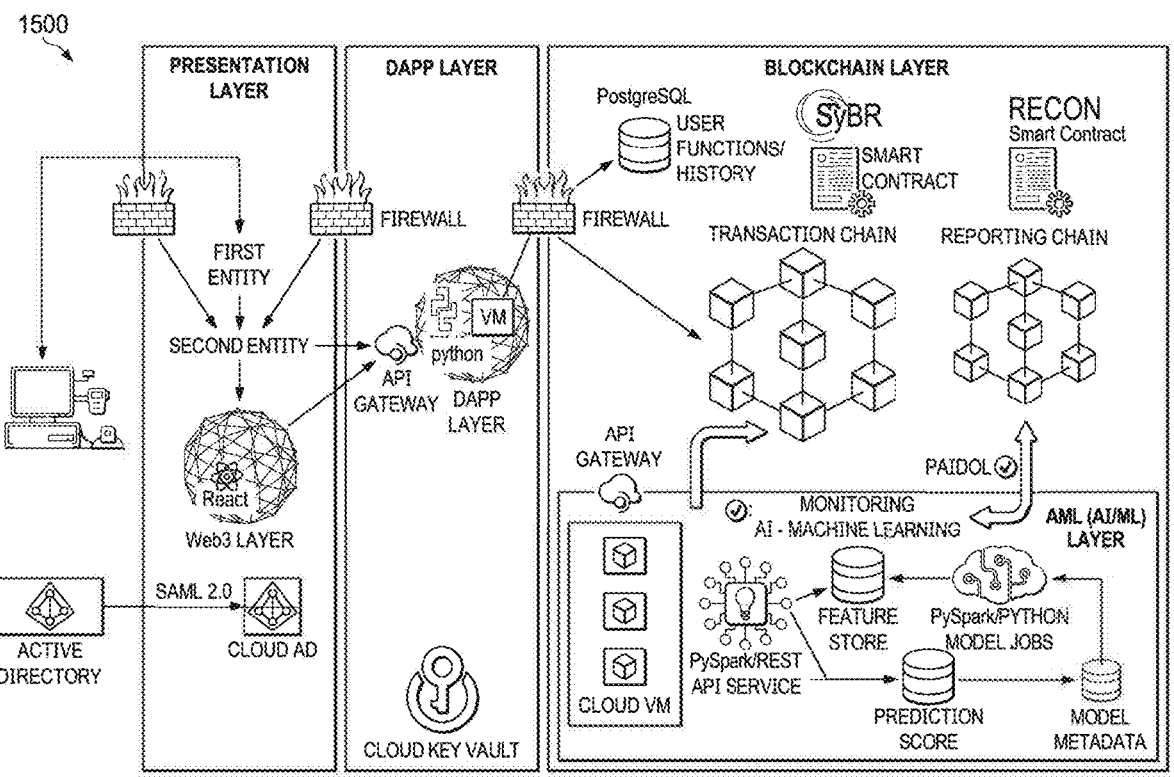
FIG. 15 shows an exemplary private blockchain ecosystem or data exchange network architecture, according to some embodiments of this disclosure.

FIG. 15 shows an exemplary private blockchain ecosystem or data exchange network architecture, according to some embodiments of this disclosure. Various systems of this architecture have been described in this disclosure, including SyBR, RECON, PAIDOL, AI-Machine Learning (CHI), etc. In some embodiments, the transaction chain may comprise or be comprised in an enterprise network. In some embodiments, the reporting chain may comprise or be comprised in a reconciliation network. DAPP may refer to distributed applications. AI/ML refers to Artificial Intelligence/Machine Learning.

Figure 16:
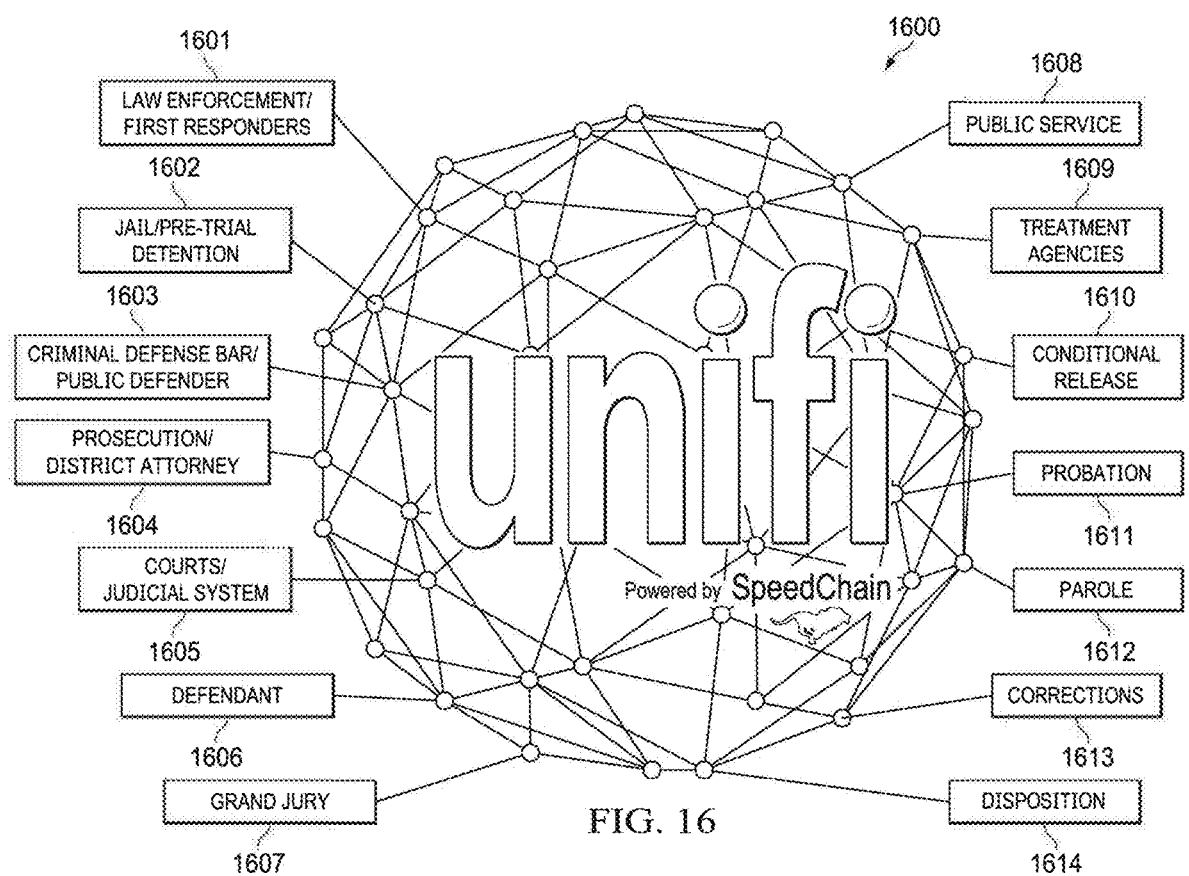
FIG. 16 shows an exemplary private blockchain ecosystem implementation, according to some embodiments of this disclosure.

FIG. 16 shows an exemplary private blockchain ecosystem implementation 1600, according to some embodiments of this disclosure. This implementation shows entities/processes/stages/outcomes, etc., 1601-1614 associated with the UNIFI embodiments described in this disclosure.

Figure 17:
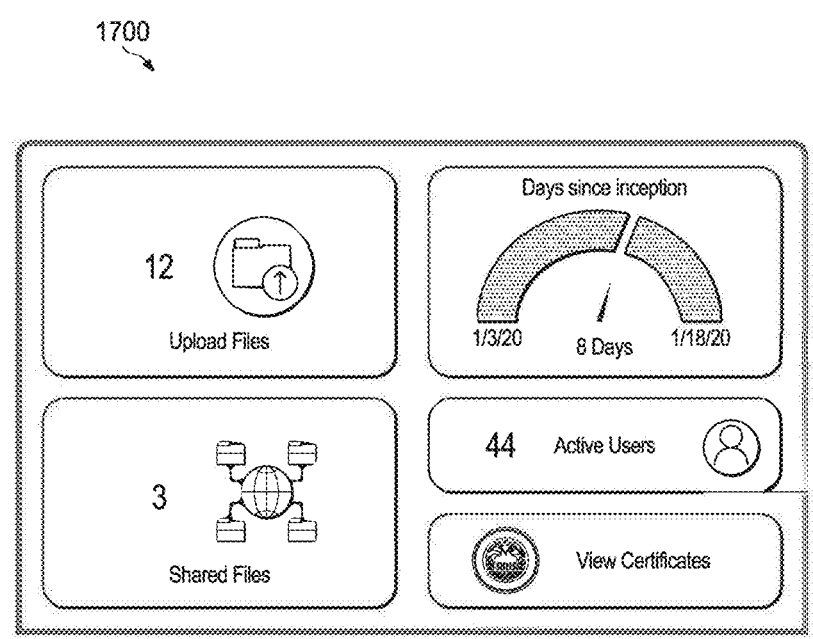
FIG. 17 shows user interfaces associated with an exemplary private blockchain ecosystem implementation, according to some embodiments of this disclosure.

FIG. 17 shows user interfaces 1700 associated with an exemplary private blockchain ecosystem implementation, according to some embodiments of this disclosure. The user interfaces show the number of uploaded files (which may or may not be shared based on an option selected by a user), number of shared files, number of active users in the ecosystem, and the number of days since the inception of the case or since inception of the ecosystem. An option to view certificates is also shown.

In some embodiments, the UNIFI concept (for criminal justice) can be widened also for groups and government agencies. A private blockchain ecosystem can be provided for securely 1) allowing ecosystem users to login, 2) upload data, 3) control who can see it (or otherwise manipulate it), 4) publish data to a shared portion of the platform, 5) and track usage (e.g., any computing operations described herein) of the data. In some embodiments, a digital security operation, layer, system, or network comprises a preselected issuance and data operations loop system. In some embodiments, the security operation is used for flagging or tracking the computing transaction in response to determining an attribute of the computing transaction meets a condition for accessing files that are stored on a cloud or cloud-based server system. In some embodiments, usage of the data is tracked (e.g., by a data operations loop system associated with a digital security operation, layer, system, or network) so that the usage can be charged either per access or per time associated with the access.

In some embodiments, a method is provided for use in a hybrid network ecosystem comprising an enterprise network and a reconciliation network, the method comprising: generating, by at least one first computing node in the enterprise network or the reconciliation network, a first digital facilitator, wherein the first digital facilitator provides one or more parameters for accessing or distributing data on a distributed ledger in the enterprise network, wherein a private key is used for performing a computing operation, based on the data, in the enterprise network; and generating, by the at least one first computing node in the enterprise network or the reconciliation network or at least one second computing node in the enterprise network or the reconciliation network, a second digital facilitator, wherein the second digital facilitator provides the one or more parameters for accessing or distributing the data in the reconciliation network.

In some embodiments, the computing operation comprises a distributed ledger-based computing operation.

In some embodiments, the first digital facilitator comprises an issuance digital facilitator.

In some embodiments, the second digital facilitator comprises a reconciliation digital facilitator.

In some embodiments, the one or more parameters comprises time-based parameters, geographical or network location-based parameters, identity-based parameters, or amount-based parameters.

In some embodiments, the method further comprises preventing unauthorized access to the data in the enterprise network, the reconciliation network, or communication network.

In some embodiments, the unauthorized access is determined based on a private key provided for gaining access to the data.

In some embodiments, the computing operation comprises a digital token-based computing operation.

In some embodiments, the first digital facilitator or the second digital facilitator is used to generate a digital token, wherein the digital token enables the computing operation. In some embodiments, the digital token may be replaced with communication currency as described herein. In some embodiments, communication currency may also be referred to as communication tokens.

In some embodiments, the computing operation comprises an asset-transferring computing operation.

In some embodiments, the at least one first computing node or the at least one second computing node comprises an artificially intelligent computing node.

In some embodiments, the at least one first computing node or the at least one second computing node executes a machine learning operation.

In some embodiments, the distributed ledger is associated with a blockchain system.

In some embodiments, a method is provided for use in a hybrid network ecosystem comprising an enterprise network and a reconciliation network, the method comprising: generating, by at least one first computing node in the enterprise network or the reconciliation network, a first digital facilitator, wherein the first digital facilitator enables a first device to use a private key to access data associated with a distributed ledger transaction; and transmitting, via the reconciliation network, the data from the first computing device to a second computing device, wherein the first computing device and the second computing device are connected via the reconciliation network.

In some embodiments, the second device is or is not part of the enterprise network.

In some embodiments, the data associated with the distributed ledger transaction is transparent to the second computing device.

In some embodiments, the method further comprises generating, by the at least one first computing node in the enterprise network or the reconciliation network or at least one second computing node in the enterprise network or the reconciliation network, an issuance digital facilitator (or transactional digital facilitator), wherein reconciliation information associated with the issuance digital facilitator is extracted or received by the first computing device, wherein the issuance digital facilitator sets parameters for the distributed ledger transaction. In some alternate embodiments, the reconciliation information associated with the issuance digital facilitator sets parameters for the distributed ledger transaction.

In some embodiments, a method is provided for use in a hybrid network ecosystem comprising an enterprise network and a reconciliation network, the method comprising: generating a private key for a user or device in the enterprise network or the reconciliation network; associating identification information associated with the private key or associated with a custodian of the private key, wherein the identification information enables initiation or execution of one or more distributed ledger-based computing transactions in the enterprise network or the reconciliation network; and generating, by the at least one first computing node in the enterprise network or the reconciliation network or at least one second computing node in the enterprise network or the reconciliation network, an issuance digital facilitator, wherein parametric information associated with the issuance digital facilitator is applied to the one or more distributed ledger-based computing transactions in the enterprise network or the reconciliation network.

In some embodiments, the identification information enables tracking of information associated with the one or more distributed ledger-based computing transactions in the enterprise network or the reconciliation network.

In some embodiments, a method associated with an asset-backed network token for use in a distributed ledger associated with a hybrid network ecosystem comprising an enterprise network and a reconciliation network comprises: generating, by at least one computing node in the reconciliation network, a network token, the network token associated with a physical asset, the physical asset being stored in a physical entity, the network token being transferable in the enterprise network; generating, by the at least one computing node in the reconciliation network, a digital contract associated with the network token or the generation of the network token, the digital contract enabling a transaction between a first computing node in the enterprise network and a second computing node in the enterprise network, the transaction comprising a transfer of the network token between the first computing node and the second computing node; and reconciling, by the at least one computing node in the reconciliation network, and in the distributed ledger, the transfer of the network token between the first computing node in the enterprise network and the second computing node in the enterprise network. In some embodiments, any transaction or computing operation or network token does not need to be backed by an asset. Therefore, any transaction or computing operation or network token described as being asset-backed may not be asset-backed in some embodiments. In some embodiments, a network token is not provided or used in any of the methods or operations described herein.

In some embodiments, the method further comprises providing a digital wallet to a computing device associated with the first computing node or the second computing node, the digital wallet enabling initiation of the transaction between the first computing node and the second computing node. As used herein, a wallet may refer to any type of digital storage or repository.

In some embodiments, the digital wallet enables generation of a code for use in initiating the transaction between the first computing node and the second computing node.

In some embodiments, the code comprises a QR code. Alternatively, the code may be any other type of code.

In some embodiments, the transaction between the first computing node and the second computing node comprises a wireless transaction.

In some embodiments, the digital wallet provides a dashboard for enabling viewing information associated with the reconciling.

In some embodiments, the digital wallet comprises a mobile wallet.

In some embodiments, the digital contract comprises a smart contract.

In some embodiments, the method further comprises generating at least one instance of the reconciliation.

In some embodiments, the method further comprises storing the at least one instance of the reconciliation in a local database associated with the enterprise network.

In some embodiments, the method further comprises storing the at least one instance of the reconciliation in a local database associated with the reconciliation network.

In some embodiments, the method further comprises transmitting the at least one instance of the reconciliation to one or more nodes located inside or outside of at least one of the enterprise network or the reconciliation network.

In some embodiments, the reconciliation network comprises a token-issuing or token-generating network.

In some embodiments, the at least one computing node in the reconciliation network comprises an intelligent computing node.

In some embodiments, at least one of the first computing node or the second computing node comprises at least one of a mobile computing device or a non-mobile computing device.

In some embodiments, a key associated with at least one of the network token, the generation of the network token, the generation of the digital contract, the transfer of the network token, or the reconciliation of the network token is at least one of recoverable, traceable, storable, or transmittable to at least one entity.

In some embodiments, the key comprises a public key.

In some embodiments, the key comprises a private key.

In some embodiments, information associated with at least one of the network token, the generation of the network token, the generation of the digital contract, the transfer of the network token, or the reconciliation of the network token is at least one of recoverable, traceable, storable, or transmittable to at least one entity.

In some embodiments, another method associated with an asset-backed network token for use in a distributed ledger associated with a hybrid network ecosystem comprising an enterprise network and a reconciliation network comprises: generating, by at least one computing node in the reconciliation network, a network token, the network token associated with a digital asset, the network token being transferable in the enterprise network; generating, by the at least one computing node in the reconciliation network, a digital facilitator associated with the network token or the generation of the network token, the digital facilitator enabling or governing a transaction between a first computing node in the enterprise network and a second computing node in the enterprise network, the transaction comprising a transfer of the network token between the first computing node and the second computing node; and processing, by the at least one computing node in the reconciliation network, and in the distributed ledger, the transfer of the network token between the first computing node in the enterprise network and the second computing node in the enterprise network.

In some embodiments, the digital facilitator comprises or is a smart contract.

In some embodiments, the digital facilitator comprises computing protocol.

In some embodiments, the digital facilitator comprises computing protocol customized for at least one of the enterprise network or the reconciliation network.

In some embodiments, the digital facilitator comprises digital verification information.

In some embodiments, another method associated with an asset-backed network token for use in a distributed ledger associated with a hybrid network ecosystem comprising an enterprise network and a reconciliation network comprises: generating, by at least one computing node in the reconciliation network, a network token, the network token associated with a physical asset, the physical asset being stored in a physical entity, the network token being transferable in the enterprise network; generating, by the at least one computing node in the reconciliation network, a digital facilitator (or enabler) associated with the network token or the generation of the network token, the digital facilitator enabling a transaction between a first computing node in the enterprise network and a second computing node in the enterprise network, the transaction comprising a transfer of the network token between the first computing node and the second computing node, the transfer of the network token between the first computing node and the second computing node not causing transfer of the physical asset; and processing or reconciling, by the at least one computing node in the reconciliation network, and in the distributed ledger, the transfer of the network token between the first computing node in the enterprise network and the second computing node in the enterprise network.

In some embodiments, another method associated with an asset-backed network token for use in a distributed ledger associated with a hybrid network ecosystem comprising an enterprise network and a reconciliation network comprises: generating, by at least one computing node in the reconciliation network or the enterprise network, a network token, the network token associated with a physical asset, the physical asset being stored in a physical entity, the network token being transferable in at least one of the enterprise network or the reconciliation network; generating, by the at least one computing node in the reconciliation network or the enterprise network, a digital facilitator associated with the network token or the generation of the network token, the digital facilitator enabling a transaction between a first computing node in the enterprise network and a second computing node in at least one of the enterprise network or the reconciliation network, the transaction comprising a transfer of the network token between the first computing node and the second computing node, the transfer of the network token between the first computing node and the second computing node not causing transfer of the physical asset; and processing or reconciling, by the at least one computing node in the reconciliation network or the enterprise network, and across the distributed ledger, the transfer of the network token between the first computing node in the enterprise network and the second computing node in the enterprise network.

In some embodiments, the method further comprises compiling data associated with the distributed ledger.

In some embodiments, the method further comprises compiling data associated with the processing or reconciling step into a smart contract, wherein the smart contract is stored across the distributed ledger.

In some embodiments, the method further comprises coding data associated with the processing or reconciling step into a smart contract, wherein the smart contract is stored across the distributed ledger.

In some embodiments, the method further comprises using an artificial intelligence (AI) engine to process the coded data. In some embodiments, AI can be used to process any data or transactions described herein.

In some embodiments, the method further comprises coding data associated with the processing or reconciling step into a digital facilitator, wherein the smart contract is stored across the digital facilitator.

In some embodiments, a method is provided associated with an asset-backed network token for use in a distributed ledger associated with a hybrid network ecosystem comprising an enterprise network and a reconciliation network, the method comprising: generating, by at least one computing node in the reconciliation network or the enterprise network, a network token, the network token being transferable in at least one of the enterprise network or the reconciliation network; determining a user in a geographical location is an approved user for executing computing transactions in the at least one of the enterprise network or the reconciliation network, the approved user being associated with a digital repository comprising or being associated with the network token; transmitting approval to a computing system in the geographical location, the computing system interacting with the digital repository, the computing system enabling the user to recover a physical asset in exchange for a computing transaction based on the network token, the physical asset being specific to the geographical location; and processing or reconciling, by the at least one computing node in the reconciliation network or the enterprise network, and across the distributed ledger, the approval enabling the user to recover the physical asset in exchange for the computing transaction based on the network token. In some embodiments, the network token may not be used or provided for in any embodiments described in this disclosure. In some embodiments, communication currency or tokens and/or smart contracts may be used instead of network tokens described in this disclosure.

In some embodiments, the method further comprises generating, by the at least one computing node in the reconciliation network or the enterprise network, a digital facilitator associated with at least one of the network token, the generation of the network token, or an exchange computing transaction based on the network token, the digital facilitator enabling the user to recover the physical asset in exchange for the computing transaction based on the network token. In some embodiments, any of the network tokens described herein may be replaced with communication currency or communication tokens or smart contract-associated data.

In some embodiments, the physical asset is based on a real-time comparison of the network token with a reference physical asset or a reference digital asset. In some embodiments, the physical asset that is digitized on a distributed ledger is tagged with an identifier (Real-time Digital Asset Character (REDAC or a REDAC #)) and/or a security identifier at the time of digitization or issuance of the digitized asset. In some embodiments, the physical asset is based on a real-time comparison of the physical asset with a reference physical asset or a reference digital asset. In some embodiments, "tracking" data may be replaced by any other computing operation with respect to the data described herein, including storing, logging, accessing, or determining the data.

In some embodiments, a method is provided for use in a hybrid network ecosystem comprising an enterprise network and a reconciliation network, the method comprising: determining, using one or more computing device processors, a transactional digital facilitator comprising a reconciliation hook, wherein the transactional digital facilitator is used for facilitating a computing transaction on a blockchain network ecosystem; extracting, using the one or more computing device processors, using the reconciliation hook, reconciliation data to a private network ecosystem; executing, using the one or more computing device processors, a verification operation on the reconciliation data in the private network ecosystem. In some embodiments, the blockchain network ecosystem comprises a private or public blockchain network ecosystem. In some embodiments, the method further comprises extracting a security identifier to the private network ecosystem. In some embodiments, the security identifier is associated with the computing transaction. In some embodiments, the security identifier is associated with a computing system that is party to the computing transaction. In some embodiments, the method further comprises executing a security operation associated with a feedback channel between the blockchain network ecosystem and a digital security operation layer, system, or network. In some embodiments, the digital security operation layer, system, or network comprises a preselected issuance and data operations loop system. In some embodiments, the security operation is used for flagging the computing transaction in response to determining an attribute of the computing transaction meets a condition. In some embodiments, the blockchain network ecosystem comprises the enterprise network and the private network ecosystem comprises the reconciliation network.

In some embodiments, a method is provided creating a secure Internet of Things (IOT) network, the method comprising: accessing a digital facilitator, wherein the digital facilitator establishes parameters for communication between a first device and a second device in an IOT network or network activity associated with the first device or the second device in the IOT network; determining a first communication or a first network activity associated with the first device or the second device; analyzing the first communication or the first network activity based on the parameters established by the digital facilitator, wherein the analysis is based on a game theory operation and is conducted in substantially real-time; issuing or taking away, based on the analysis of the first communication or the first network activity, at least one of communication currency or a functioning license to the first device or the second device.

In some embodiments, a method is provided for creating a secure Internet of Things (IOT) network, the method comprising: accessing a digital facilitator, wherein the digital facilitator establishes parameters for communication between a first device and a second device in an IOT network or network activity associated with the first device or the second device in the IOT network; determining a first communication or a first network activity associated with the first device or the second device; analyzing the first communication or the first network activity based on the parameters established by the digital facilitator, wherein the analysis is based on a game theory operation and is conducted in substantially real-time; assigning, based on the first communication or the first network activity a status to the first device or the second device; and determining, based on the first device or the second device, future permissible network activity or communication associated with the first device or the second device. In some embodiments, the status comprises at least one of an approved device, or an unapproved or rogue device. In some embodiments, the parameters establish standards or parameters for determining approved device behavior, or unapproved or rogue device behavior.

In some embodiments, a method is provided for inoculating an Internet of Things (IOT) network, the method comprising: a digital facilitator defines parameters for communication between a first device and a second device in an IOT network or network activity associated with the first device or the second device in the IOT network; issuing or taking away, based on the analysis, a functioning license from the first or second device in the IOT network, or taking away, based on the analysis, communication currency from the first or second device.

In some embodiments, a status may be assigned to a device based on analysis performed. Examples of such statuses might include "Approved," "Unapproved," "Rogue," "New," "Needs Review," etc. Future permissible activity or communication might be determined based on the status of the device. For example, if a device is assigned the status of "Rogue," it might not be able to communicate with other "Approved" devices within the Internet of Things (IOT) network. Such analysis might be based on network rules, digital facilitators, game theory-based rules, etc.

In some embodiments, devices are identified using a preselected issuance and data operations loop (PAIDOL) feature. In some embodiments, analysis might be implemented on a fifth generation mobile network (5G), or any other network such as a wireless network, 4G or 3G network, etc. Analysis might include a process where device activity is compared to the activity or communication behavior of a normal device, or a device with a positive status such as "Approved." Such analysis might be based on a set of rules. Rules and analysis of the IOT and devices might be applicable to a public or private blockchain network. Analysis might include real-time analysis of the device activity or communication.

In some embodiments, the IOT environment might secure itself through advanced computing and artificial intelligence (AI) programs. Such programs might operate in a private blockchain network or a public blockchain network. The advanced computing and AI programs might be implemented in a machine to machine optimization and exchange (MMOX) network, which allows devices operating in the network to exchange security, identity, and activity information. This process may identify devices (or operations executed by the devices) in the network as either trusted or threats. This all may combine to inoculate a wireless network. MMOX may require no additional resources, maintenance, or monitoring while assessing the health of the blockchain network. Such processes might be automated. In some embodiments, the IOT network may be a non-blockchain wireless network, which may be a cellular or non-cellular network.

In some embodiments, a real-time functioning license or communication currency might be implemented by a digital facilitator. Digital facilitators may govern machine to machine (M2M) behavior within a network (e.g., a blockchain network). Communication currency, or a functioning license, might be issued based on M2M behavior adhering to secure logic (M2M rules) set forth by the digital facilitators. The M2M rules may be computed in real time based on a combination of game theory operations, identifying characteristics associated with devices (may be referred to as users), and/or operations in the network.

In some embodiments, a secure IOT environment might be designed to validate M2M communications. Such embodiments might evaluate device behavior by comparing their behavior against a rule set associated with a network (e.g., a blockchain network). The rule set which is used may be determined by a transactional digital facilitator. Use of such a rule set may ensure that consistent M2M communications are valid within the network, and better secures the network. Such embodiments might detect and report rogue devices and deny access to devices determined to be rogue or otherwise invalid. This may be implemented prior to deployment of 5G protocol in the network.

In some embodiments, a decentralized architecture for implementing the blockchain network might utilize secure access controls. The network might be federated or might be on the cloud. Some embodiments might allow users from multiple organizations to securely share data with one another on the same blockchain network. This architecture might include key management and rule sets (e.g., set by digital facilitators) that decentralized from the network to enhance security. Such sets might allow for specific parameters, which may be enforced to increase network security. This embodiment might enhance security by use of system generated identifiers (e.g., for users or devices or for computing operations) and activity reports (e.g., for users or devices or for computing operations). This may allow for the architecture to avoid points of failure and privacy concerns.

In some embodiments, third party access (e.g., a new user or recently approved user) to a network's sensitive data might be limited by use of a communication protocol. Such a communication protocol might be distributed. Such embodiments might use digital facilitators to validate the user's activity or automate the user's workflow or the user's transactions on the network, based on rule sets associated with specific user activities, as defined by the digital facilitators. Such an embodiment might control and validate the user's communications within the network. Such an embodiment may also track custody of data (e.g., associated with a particular user) or transactions (e.g., associated with a particular user) with system-generated activity reports. Such activity reports might be generated in real-time. In some embodiments, the terms "device" and "user" may be used interchangeably. Any features or elements described with respect to one embodiment may be applicable to or incorporated in any other embodiment described herein.

In some embodiments, any severs or devices on a computer network, within an Internet of Things (IOT), or within in an ecosystem, might be secured by physical security measures. Such security measures include, but are not limited to, locked server rooms, password protected devices, encrypted devices, limited employee entry, entrance security protocols, biometric based security measures, password on PIN based security measures, etc. In such embodiments, the Wi-Fi, on which involved devices operate, might be a member of the same ecosystem or network as the devices.

In some embodiments, devices or users might be assigned different states. Such a state might be related to the device's or user's status within the network. Such states might include "Rogue," "Member," "Verified," "Processing," "Good," "Bad," etc. Such a state might be defined by whether or not a device or user has been verified. In some embodiments, states might have other states associated with them within a hierarchy or set progression. For example, state "Member" might only be able to progress to state "Verified," based on a positive transaction such as a verification, and might only be able to regress to state "Rogue," based on a negative transaction such as breaking a network rule. Multiple steps or verifications may be needed to change a user or devices state. Certain privileges within the network might only be afforded to users or devices assigned certain states.

In some embodiments, communication currency may be distributed to or assigned to users or devices based on their state. If a device or user performs a negative action, communication currency may be assigned away from the device or user. If a device or user performs a positive action, communication currency may be assigned to the device or user. Upon assignment of the communication currency the state of the device or user may also be changed. For example, if communication currency is assigned away from the device, its state may correspondingly be downgraded. In some embodiments, communication currency may be digital tokens.

In some embodiments, reconciliation (RECON) digital facilitators or smart contracts might be enabled to change the states of users or devices. Such RECON smart contracts may analyze the behavior of the users or devices, and may compare that behavior to a set of network rules. If a user or device is in violation of some rule, then the RECON smart contract might downgrade the state of the user or the device, or may remove the user or the device from the network. In some embodiments, any operations or features described with respect to the RECON digital facilitators may also be applicable to the transactional digital facilitators.

In some embodiments, a method is provided for use in a blockchain Internet of Things (IOT) network, the method comprising: determining, using one or more computing device processors, a transactional digital facilitator, wherein the transactional digital facilitator establishes rules for a computing operation initiated by a device in the blockchain IOT network, wherein the device is associated with an identifier; tracking, using the identifier associated with the device, using the one or more computing device processors, a computing operation initiated by the device in the blockchain IOT network; analyzing, using the one or more computing device processors, the computing operation; determining, using the one or more computing device processors, the computing operation is an approved or unapproved computing operation; and in response to determining the computing operation is the unapproved computing operation, performing, using the one or more computing device processors, a first exchange associated with an account or container associated with the device, wherein the first exchange causes a first state, or progression towards the first state, to be assigned to the device or maintained for the device, wherein the first state restricts the device from performing a second computing operation in the blockchain IOT network. Alternatively, in some embodiments, the first state, or progression towards the first state, assigned to the device or maintained for the device, causes the first exchange associated with an account or container associated with the device, to be performed.

In some embodiments, the first exchange comprises assignment away of least one unit of communication currency from the account or container associated with the device, wherein the communication currency comprises non-financial currency, wherein the account or container is stored in at least one of the device or a server external to the device.

In some embodiments, the method further comprising in response to determining the computing operation is the approved computing operation, performing a second exchange associated with the account or container associated with the device, wherein the second exchange causes a second state, or progression towards the second state, to be assigned to the device or maintained for the device, wherein the second state of the device enables the device to perform the second computing operation in the blockchain TOT network. Alternatively, in some embodiments, the second state, or progression towards the second state, assigned to the device or maintained for the device, causes the second exchange associated with an account or container associated with the device, to be performed.

In some embodiments, the second exchange comprises assignment at least one unit of communication currency to an account or a container associated with the device, wherein the communication currency comprises non-financial currency, wherein the account or container is stored in at least one of the device or a server external to the device.

In some embodiments, the analyzing the computing operation comprises comparing first data associated with the computing operation to second data associated with an approved computing operation.

In some embodiments, the analyzing the computing operation comprises real-time analyzing of the computing operation.

In some embodiments, the computing operation comprises device activity of the device that does not involve second device activity associated with at least one other device in the blockchain IOT network.

In some embodiments, the computing operation comprises device activity of the device that involves second device activity associated with at least one other device in the blockchain IOT network.

In some embodiments, the computing operation comprises communication within or outside the blockchain IOT network.

In some embodiments, the device comprises a computing system.

In some embodiments, the computing system comprises at least one of a portable device, a household device, a laptop, a mobile phone or tablet, a desktop computer, a thermostat, a television, a music player, a hearing or audio device, a wearable device, or a motor vehicle.

In some embodiments, the device comprises a computing network.

In some embodiments, the blockchain IOT network comprises at least one of a cellular, wired, wireless, or power network.

In some embodiments, the blockchain IOT network comprises a public blockchain network.

In some embodiments, the blockchain IOT network comprises a private blockchain network.

In some embodiments, the identifier is generated in the blockchain IOT network substantially simultaneously with or after the device creates a private key known only to the device or a user of the device.

In some embodiments, assigning the first state to the device comprises deactivating a license associated with the device or a function of the device.

In some embodiments, the method further comprising in response to determining the computing operation is the approved computing operation, assigning a second state to the device, wherein assigning the second state to the device comprises activating a license associated with the device or a function of the device.

In some embodiments, the first state is stored in at least one of the device or a server external to the device and communicating with the device.

In some embodiments, an apparatus is provided for use in a blockchain-based Internet of Things (IOT) network, the apparatus comprising one or more computing device processors executing code, wherein the code is configured to: determine a transactional digital facilitator, wherein the transactional digital facilitator establishes rules for a computing operation or communication initiated or executed by a device in the blockchain IOT network, wherein the device is associated with an identifier; track a computing operation initiated by the device in the blockchain IOT network; analyze the computing operation; determine the computing operation is an approved or unapproved computing operation; in response to determining the computing operation is the unapproved computing operation, perform a first exchange associated with an account or container associated with the device, wherein the first exchange causes a first state, or progression towards the first state, to be assigned to the device or maintained for the device, wherein the first state restricts the device from performing a future computing operation in the blockchain IOT network, wherein the first exchange comprises assignment away of least one unit of communication currency from the account or container associated with the device, wherein the account or container is stored in at least one of the device or a server external to the device; and in response to determining the computing operation is the approved computing operation, perform a second exchange associated with the account or container associated with the device, wherein the second exchange causes a second state, or progression towards the second state, to be assigned to the device or maintained for the device, wherein the second state of the device enables the device to perform the future computing operation in the blockchain IOT network, wherein the second exchange comprises assignment at least one unit of communication currency to an account or a container associated with the device.

In some embodiments, a method is provided for use in a private blockchain network ecosystem comprising an enterprise network, the method comprising: providing, using one or more computing device processors, at least one transactional digital facilitator, wherein the transactional digital facilitator defines parameters associated a computing operation, initiated by an approved user in the enterprise network, wherein the approved user is associated with an identifier, wherein the identifier is generated in the private blockchain network ecosystem substantially simultaneously with or immediately after the approved user creates a private key known only to the approved user; and tracking, using the identifier associated with the approved user, using the one or more computing device processors, the computing operation defined by the parameters established by the transactional digital facilitator and initiated by the approved user in the enterprise network, wherein the enterprise network is not accessible to an unapproved user. In some embodiments, the tracking may be replaced by any other computing operation described herein.

In some embodiments, the private blockchain network ecosystem comprises a reconciliation network, and the method further comprises: providing at least one reconciliation digital facilitator, wherein the reconciliation digital facilitator facilitates reporting, via the reconciliation network, data associated with the computing operation, to a recipient.

In some embodiments, the approved user is approved by a superuser.

In some embodiments, the superuser is controlled by an entity associated with the private blockchain network ecosystem.

In some embodiments, the private key comprises at least one of an authentication credential, a username, a password, retinal scan data, facial data, or fingerprint data.

In some embodiments, the user comprises a person, an entity, or a system.

In some embodiments, the computing operation comprises a data sharing, transmission, access, or receipt operation.

In some embodiments, the method further comprises applying an intelligent computing operation to the data.

In some embodiments, the method further comprises applying an analytical computing operation to the data.

In some embodiments, the method further comprises predicting a trend based on the data.

In some embodiments, the recipient is an approved recipient.

In some embodiments, the computing operation is associated with a tokenized asset.

In some embodiments, the method further comprises providing a digital mesh for securing the tokenized asset.

In some embodiments, the tokenized asset is associated with at least one of an oil, gas, land, or mineral, right, lease, title, or royalty.

In some embodiments, the computing operation is not associated with a tokenized asset.

In some embodiments, a system associated with the approved user or a location associated with the approved user is associated with the identifier or a second identifier.

In some embodiments, the private blockchain ecosystem is associated with an entity associated with a criminal case, and wherein the data is associated with the criminal case.

In some embodiments, the method further comprises determining the computing operation is an approved or unapproved computing operation.

In some embodiments, the method further comprises in response to determining the computing operation is the approved computing operation, transmitting at least one unit of communication currency from an account associated with the approved user, wherein the communication currency comprises non-financial currency.

In some embodiments, the method further comprises in response to determining the computing operation is the unapproved computing operation, deducting at least one unit of communication currency from an account associated with the approved user, wherein the communication currency comprises non-financial currency.

In some embodiments, the method further comprises publishing data associated with the computing operation, in response to receiving a publishing instruction from the approved user.

In some embodiments, the data is published via the reconciliation network.

In some embodiments, the reconciliation digital facilitator causes creation of a second private key.

In some embodiments, the reconciliation digital facilitator or the reconciliation network is controlled by the transactional digital facilitator.

In some embodiments, an apparatus is provided for use in a private blockchain network ecosystem comprising an enterprise network, the apparatus comprising one or more computing device processors configured for: executing at least one transactional digital facilitator, wherein the transactional digital facilitator defines parameters associated a computing operation, initiated by an approved user, in the enterprise network, wherein the approved user is associated with an identifier, wherein the identifier is generated in the private blockchain network ecosystem substantially simultaneously with or immediately after the approved user creates a private key known only to the approved user; and tracking, using the identifier associated with the approved user, the computing operation defined by the parameters established by the transactional digital facilitator and initiated by the approved user in the enterprise network, wherein the data is not associated with a tokenized asset, wherein the enterprise network is not accessible to an unapproved user.

In some embodiments, a method for use in a private blockchain network ecosystem comprising an enterprise network, the method comprising: providing, using one or more computing device processors, at least one transactional digital facilitator, wherein the transactional digital facilitator defines parameters associated a computing operation, initiated by an approved user, in the enterprise network, wherein the approved user is associated with an identifier, wherein the identifier is generated in the private blockchain network ecosystem substantially simultaneously with or immediately after the approved user creates a private key known only to the approved user; and tracking, using the one or more computing device processors, using the identifier associated with the approved user, the computing operation defined by the parameters established by the transactional digital facilitator and initiated by the approved user in the enterprise network, wherein the data is associated with a tokenized asset, wherein the enterprise network is not accessible to an unapproved user.

In some embodiments, the method further comprises providing at least one reconciliation digital facilitator, wherein the reconciliation digital facilitator facilitates reporting, via the reconciliation network, data associated with the computing operation, to a recipient.

In some embodiments, a method for use is provided in a private blockchain network, the method comprising: enabling, using one or more computing device processors, approval of a user for initiating a computing operation in the private blockchain network; determining, using the one or more computing device processors, the user creates a private key known only to the user; generating, using the one or more computing device processors, an identifier for the user; associating, using the one or more computing device processors, the identifier with the private key or the user; and tracking or logging, based on the identifier associated with the private key or the user, using the one or more computing device processors, data associated with a computing operation defined by the parameters established by the transactional digital facilitator and initiated or executed by the approved user, wherein an unapproved user cannot access the private blockchain network or perform a second computing operation in the private blockchain network.

In some embodiments, the identifier comprises a unique identifier.

In some embodiments, the method further comprises reporting the data associated with the computing operation to a recipient.

In some embodiments, the data is associated with a tokenized asset.

In some embodiments, the tokenized asset is associated with at least one of an oil, gas, land, or mineral, right, lease, title, or royalty.

In some embodiments, the data is not associated with a tokenized asset.

In some embodiments, the computing operation comprises an asset-transferring computing operation.

In some embodiments, the method further comprises predicting a trend based on the data.

In some embodiments, the private blockchain network is associated with an entity associated with a criminal case, and wherein the data is associated with the criminal case.

In some embodiments, the method further comprises determining the computing operation is an approved or unapproved computing operation.

In some embodiments, the method further comprises in response to determining the computing operation is the approved computing operation, transmitting at least one unit of communication currency from an account associated with the approved user, wherein the communication currency comprises non-financial currency.

In some embodiments, the method further comprises in response to determining the computing operation is the unapproved computing operation, deducting at least one unit of communication currency from an account associated with the approved user, wherein the communication currency comprises non-financial currency.

In some embodiments, the data comprises real-time data or historical data associated with the computing operation.

In some embodiments, a method is provided for use in a private blockchain network, the method comprising: enabling, using one or more computing device processors, approval of a user for initiating a computing operation in the private blockchain network; determining, using the one or more computing device processors, the user creates a private key known only to the user; generating, using the one or more computing device processors, an identifier for the user; associating, using the one or more computing device processors, the identifier with the private key or the user; and determining, based on the identifier associated with the private key or the user, using the one or more computing device processors, data associated with a computing operation defined by the parameters established by the transactional digital facilitator and initiated or executed by the approved user, wherein an unapproved user cannot perform a second computing operation in the private blockchain network.

In some embodiments, the method further comprises tracking access of the data associated with the computing operation, wherein the data is stored on a cloud server.

In some embodiments, a method for use is provided in a hybrid network ecosystem comprising an enterprise network and a reconciliation network, the method comprising: determining, using one or more computing device processors, a transactional digital facilitator comprising a reconciliation hook, wherein the transactional digital facilitator is used for facilitating a computing transaction on a blockchain network ecosystem; extracting, using the one or more computing device processors, using the reconciliation hook, reconciliation data to a private network ecosystem; executing, using the one or more computing device processors, a verification operation on the reconciliation data in the private network ecosystem.

In some embodiments, the blockchain network ecosystem comprises a private or public blockchain network ecosystem.

In some embodiments, the method further comprises extracting a security identifier to the private network ecosystem.

In some embodiments, the security identifier is associated with the computing transaction.

In some embodiments, the security identifier is associated with a computing system that is party to the computing transaction.

In some embodiments, the method further comprises executing a security operation associated with a feedback channel between the blockchain network ecosystem and a digital security operation layer, system, or network.

In some embodiments, the digital security operation layer, system, or network comprises a preselected issuance and data operations loop system.

In some embodiments, the security operation is used for flagging the computing transaction in response to determining an attribute of the computing transaction meets a condition.

In some embodiments, the blockchain network ecosystem comprises the enterprise network and the private network ecosystem comprises the reconciliation network.

Figure 18A:
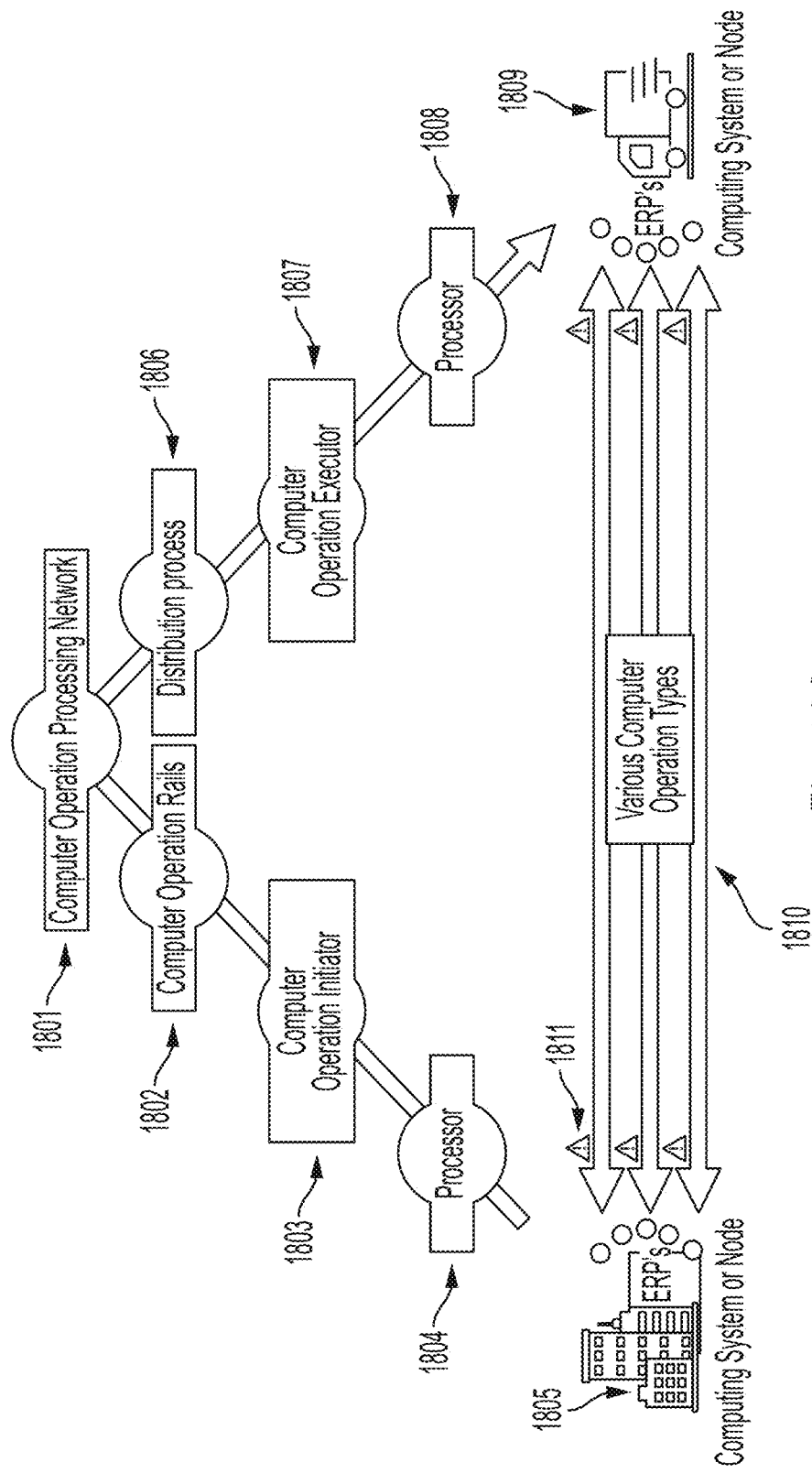
FIG. 18A shows how a computing operation or transfer of a digital asset executes in a network or across a series of transactions, according to some embodiments of this disclosure.

FIG. 18A shows how a computing operation or transfer of a digital asset executes in a typical network or series of operations. Such a process is often rife with inefficiencies and risks to the operation. Computing operations or transfers of digital assets might be run through a central computer operation processing network 1801. The computer operation processing network 1801 may be a computer-based electronic network for processing computer operations. The computer operation processing network 1801 may support both additive and deductive processes. The computing operation or digital transfer of assets may be executed between two or more computing systems or nodes 1805, 1809. These computing systems or nodes may be enterprise resource-planning ("ERP") system.

In some embodiments, the two or more computing systems or nodes 1805, 1809 may participate in various computer operation types 1810 between themselves. These computer operation types 1810 may pose a significant amount of risk factors 1811. Risk factors 1811 may include fraud, operation errors, party disputes, unnecessary costs, theft, security risk, delivery errors, etc. These computer operation types 1810 are usually not automated and are often too complicated and complex.

In some embodiments, computer operation types 1810 are processed by a processor 1804, 1808 on each end of a computer operation or transfer of a digital asset. The computer operation types 1810 may then be passed through or handled by a computer operation initiator 1803. The computer operation type 1810 may then be onboarded onto a computer operation rail 1802. The computer operation type 1810 may then pass through the centralized computer operation processing network 1801, which may then execute a distribution process 1806 to move the computer operation type 1810 to a computer operation executor 1807.

Figure 18B:
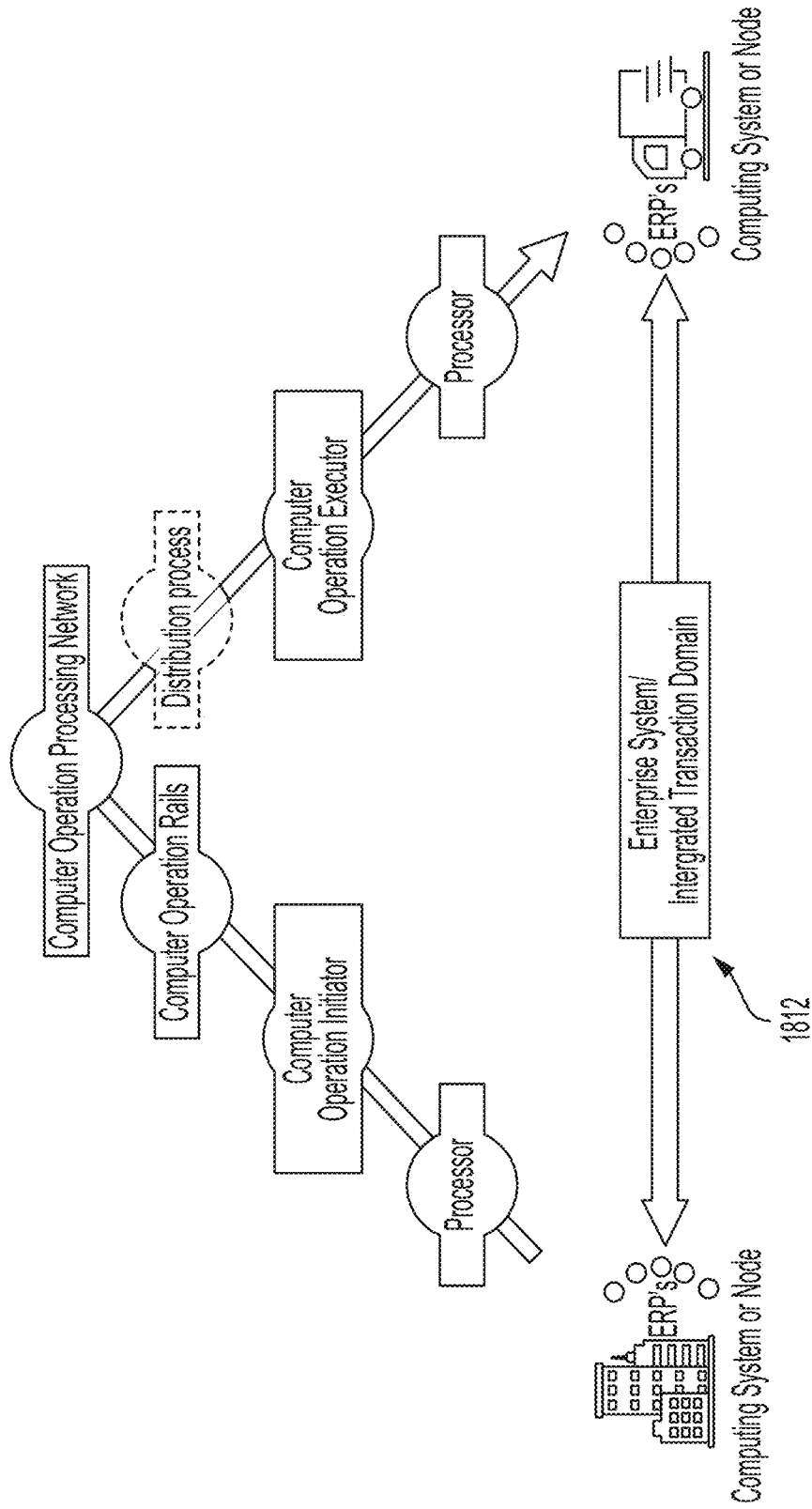
FIG. 18B shows how computing operations or transfers of digital assets might be improved by the implementation of an enterprise system or integrated transaction domain, according to some embodiments of this disclosure.

In some embodiments, computer operation types might be unified under, or replaced by, an enterprise system or integrated transaction domain 1812. The enterprise system or integrated transaction domain 1812 may unify the process followed in a network or series of operations. The enterprise system or integrated transaction domain 1812 may automate processes or remove distribution processes 1806, as illustrated in FIG. 18B.

In some embodiments, the enterprise system or integrated transaction domain 1812 may be a unified payment marketplace, a distributed ledger, a blockchain network, a blockchain marketplace, a computing system, a process integration platform, an application, an exchange, an operation processing platform, etc.

In some embodiments, the computer operation processing network 1801 may be an automated clearing house ("ACH").

In some embodiments, computer operation types 1810 may include at least one of: profile synchronization, mass digital asset distribution, digital asset verification, computing operations, transfers of digital assets, deliveries, invoice payment, payment verification, product shipments, provision of services, purchases, sales, etc.

In some embodiments, computer operation initiators and computer operation executors 1803, 1807 may include at least one of: users, administrators, originating entities, originating ERPs, receiving entities, receiving ERPs, financial institutions, banks, originating banks, deposit banks, blockchain wallets, blockchain ecosystems, digital facilitators, etc.

In some embodiments, a computer operation rail 1802 may include at least one of: digital asset transfer rail, mass digital asset distribution rail, profile distribution rail, data distribution rail, credit rails, credit cards, centralized electronic payment rails, real-time rails, payment rails, etc.

In some embodiments, a distribution process 1806 may include at least one of: automatic transfer of a digital asset, mass distribution of a digital asset, distribution of data, physical execution of a payment or delivery, manual transfer of a digital asset, check execution, wire transfers, use of virtual cards, use of credit cards, etc.

In some embodiments, a computing system or node 1805, may execute a computing operation or transfer of a digital asset by sending instructions or an asset to a processor 1804. A processor 1804 may then distribute a digital asset to a computer operation initiator 1803, or may partially execute instructions for execution of a computer operation by a computer operation initiator 1803. The computer operation initiator 1803 may then onboard a digital asset or the results of a partially executed computer operation onto a computer operation rail 1802. The computer operation rail 1802 may then send a digital asset or partially executed computing operation into a computer operation processing network 1801.

The computer operation processing network 1801 may then take at least one of the following actions: analyze the details of the digital asset, partially process the computer operation, identify all destinations for the digital asset or partially processed computing operation, update a ledger or database based on the digital asset or partially processed computing operation, split up the digital asset or partially processed computing operation into separate components, store a digital asset or partially processed computing operation, message a user, administrator, or other entity with details of the digital asset or partially processed computing operation, etc.

The computer operation processing network 1801 may then, if necessary, send the digital asset or partially executed computing operation to a distribution process 1806, which may assist in transmitting the digital asset or partially executed computing operation to a computer operation executor 1807. The computer operation executor 1807 may then finalize or execute the computing operation or further process the digital asset. The computer operation executor 1807 may then send a digital asset or the results of a computing operation to a processor 1808, which may return the results of a computing operation or digital asset to a computing system or node 1809.

In some embodiments, the computer operation processing network 1801 may bypass the distribution process 1806.

In some embodiments, analysis of a digital asset or partially processed computing operation may utilize machine learning or artificial intelligence processes.

Figure 19:
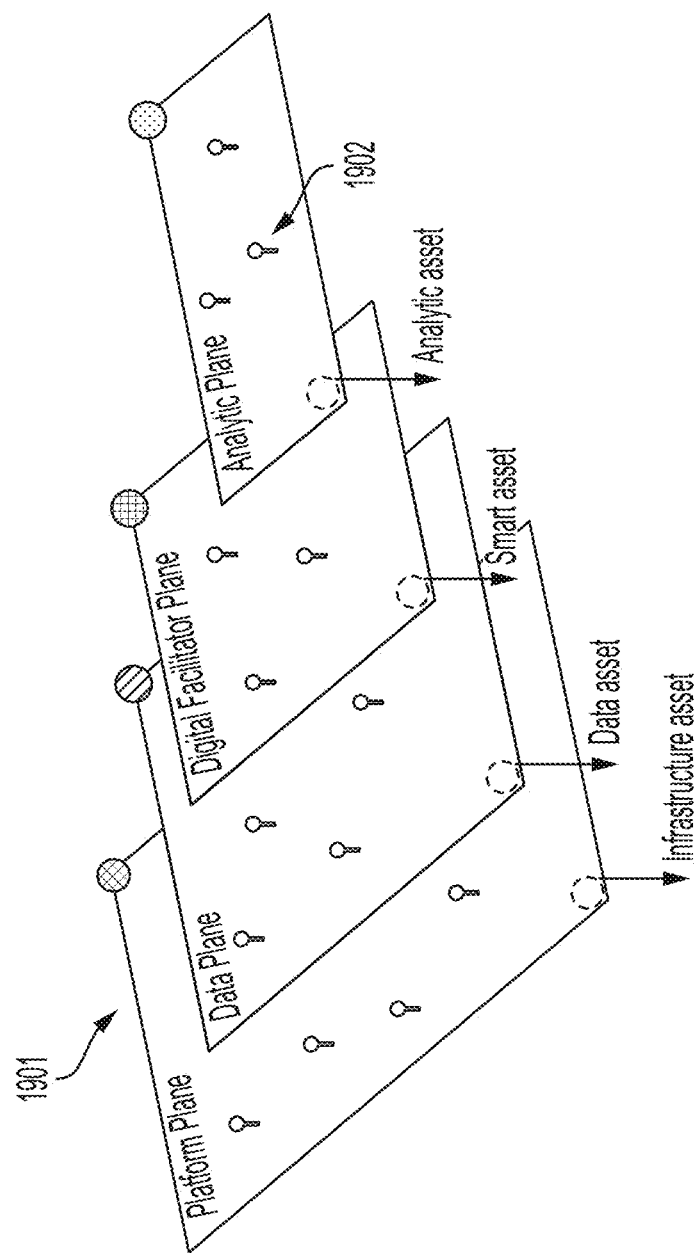
FIG. 19 shows how an enterprise system or integrated transaction domain may be comprised of different integrated planes, according to some embodiments of this disclosure.

FIG. 19 shows how an enterprise system or integrated transaction domain 1812 may be comprised of different integrated planes 1901. Different planes 1901 may be layered on top of one another to create an infrastructure for the enterprise system or integrated transaction domain 1812. Each plane 1901 may be a layer for a digital architecture or logical architecture that forms the enterprise system or integrated transaction domain. Each plane 1901 may be an asset or may be comprised of multiple different components or assets 1902.

A plane 1901 may be a platform plane. A platform plane may comprise components 1902 directed towards: release pipeline automation, software delivery automation, source repository connectivity, automated code deployment, plug in test services, access control, integrations services, connector libraries, data transmission security, transformation services, automated data transformation, IT integration, rapid ingest, automated deployment, container orchestration, rapid infrastructure scaling, etc.

A plane 1901 may be a data plane. A data plane may contain components 1902 directed towards: PAIDOL services, I.D. and transaction tracking services, microservice architecture, release pipelines, software delivery automation, automated code deployment, plug-in test services, trusted data services, metadata dictionary support, detailed off blockchain database transaction tracking, data lineage tracking, cross-border data tacking, payment services, ransomware services, vendor storage, rapid payer plug-in, vendor information and graphs, transaction data storage, containerization support, etc.

A plane 1901 may be a digital facilitator plane. A digital facilitator plane may include components 1902 directed towards: I.D. and transaction tracking services, digital facilitator linkage and tracking "on" and "off" a blockchain network, digital facilitators for reporting approved parties and regulators, data extensions, "on" and "off" blockchain network integration, public blockchain network transaction tokenization support, private blockchain network tokenization support, multi-party signature support, etc.

A plane 1901 may be an analytic plane. An analytic plane may include components 1902 directed towards: dashboards and other visualizations methods, GUIs, data readouts, service communication connections, automated invoice-to-payment tools, machine learning based tools, risk management services, invoice analyzers, risk scoring and transaction velocity tools, fraud analysis tools, analytic capabilities, etc.

In some embodiments, planes 1901 may be layered on top of one another, such that information and results from the various components 1902 described can seamlessly be sent to other components 1902 within the enterprise system or integrated transaction domain 1812. Each plane 1901 may be responsible for its own processes and role, but they also may work in unison with other planes 1901 when a process requires it. Different inputs and outputs may enter and exit the enterprise system or integrated transaction domain 1812 through the planes 1901.

Figure 20:
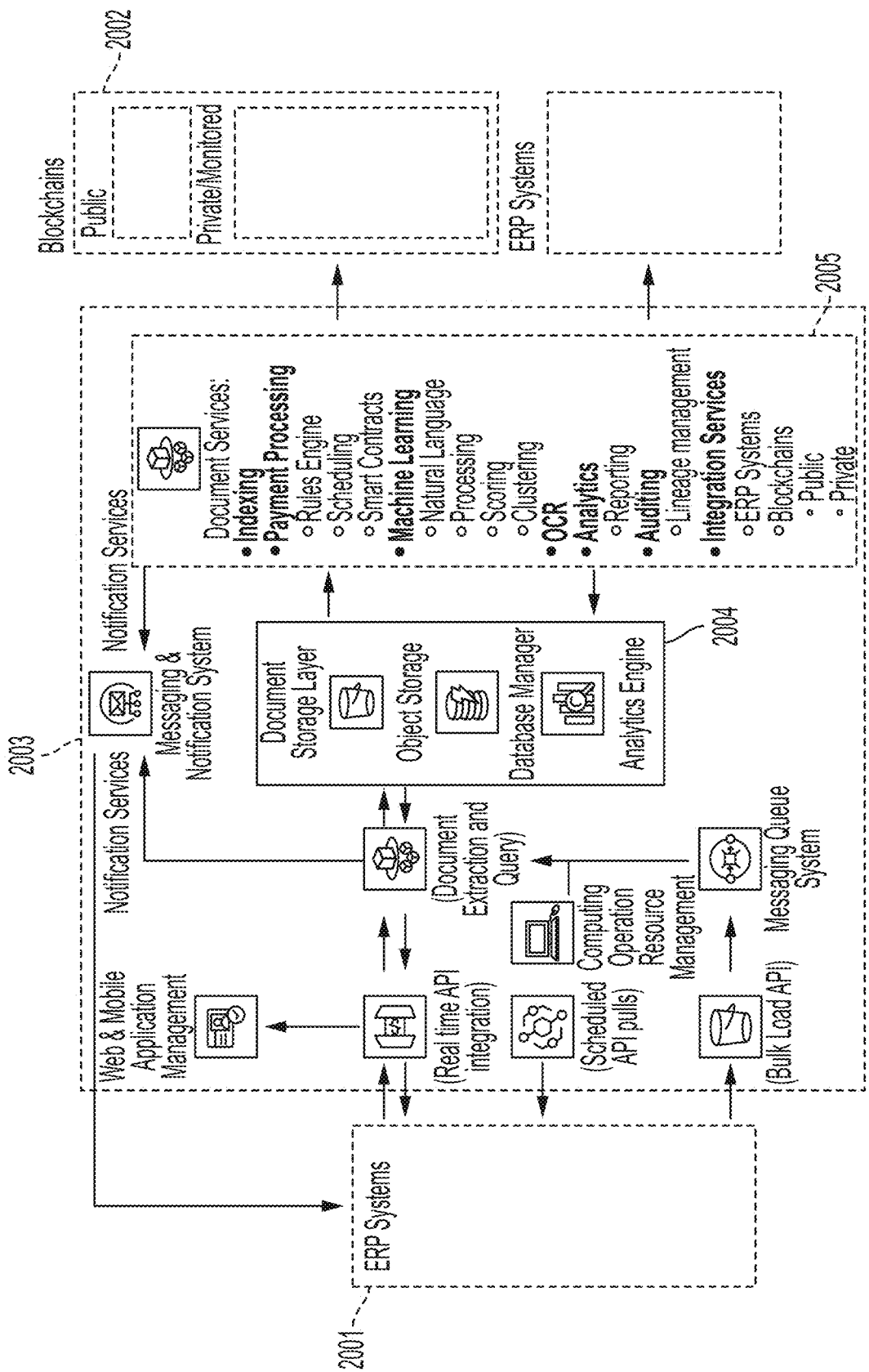
FIG. 20 shows an exemplary architecture for the implementation of an enterprise system or integrated transaction domain, according to some embodiments of this disclosure.

FIG. 20 shows an exemplary architecture for the implementation of an enterprise system or integrated transaction domain 1812. FIG. 20 serves as a reference for building a platform that may contain any number of features, methods, and systems found in this specification. Notifications, messages, and information from the enterprise system or integrated transaction domain 1812 may be distributed to ERP systems 2001. The enterprise system or integrated transaction domain 1812 may interface with a variety of public, private, or monitored blockchain networks 2002. The enterprise system or integrated transaction domain 1812 may have a variety of software components and/or systems 2003. Software components and/or systems 2003 may be internal to the enterprise system or integrated transaction domain 1812.

In some embodiments, messages and notifications within, into, and out of the enterprise system or integrated transaction domain 1812 may be routed through a messaging and notification software component and/or system 2003. Any documents associated with the enterprise system or integrated transaction domain 1812, used to operate a digital facilitator, used to execute a computing operation, or used to digitally transfer an asset may be processed in or sent through a variety of document services protocols 2005. Those same documents may be stored in a document storage layer 2004. The document storage layer may include different software components and/or systems 2003, such as object storage, a database manager, or an analytics engine. The document service protocols 2005 may include at least one of: indexing, payment processing, rules engines, scheduling processes, smart contracts, digital facilitators, machine learning processes, natural language processes, scoring, clustering, OCR services, analytics services, reporting services, auditing services, lineage management services, integration services, ERP systems, blockchains (public or private), etc. The document services protocols 2005 may interface with the messaging and notification system.

In some embodiments, the document storage layer 2004 may interface with a document extraction and query software component and/or system 2003. The document extraction and query component may interface with the real time API integration software component and/or system 2003. The real time API integration may interface with ERP systems 2001, and may send information to a web and mobile application management software component and/or system 2003.

In some embodiments, the document extraction and query component may receive information from a computing operation resource management software component and/or system 2003, a scheduled API pull software component and/or system 2003, or a messaging queue software component and/or system 2003. The scheduled API pull component may send information to ERP Systems 2001.

In some embodiments, the messaging queue system may receive information from a bulk load API software component and/or system 2003. The bulk load API software component and/or system may receive information from ERP systems 2001.

In some embodiments, the enterprise system or integrated transaction domain 1812 may host a large number of operations and may contain the components and/or systems 2003 needed to operate as a single point of processing computing operations or digital transactions as well as handling any secondary or associated processes necessary for processing those computing operations or digital transactions. The enterprise system or integrated transaction 1812 domain may interface with external networks. The external networks may provide information to the internal components and/or systems 2003 that may be necessary for processing computing operations or digital transactions In some embodiments, the computing environment may include a substitute enterprise resource-planning ("ERP") system. The substitute ERP system may identify and host various types of computer operations. The computer operations may include operations to sell products or services, distribute products or services, distribute resources, verify information of entities engaging with the ERP system, accounting operations, procurement operations, host product or service information, host personnel information, etc.

In some embodiments, the computing environment may utilize the substitute ERP system to enter a traditional ERP system, identify computing operations that are pending, collect information relevant to the computing operation, execute the computing operation, record that the computing operation has been executed, and send that record and associated data to a receiver, the traditional ERP system, or a third party.

In some embodiments, pending computing operations might include document imaging, document information extracting, execution of computing operations, execution of a digital facilitator, payment, accounting entries, accounting verifications, entry of new entities associated with the computing environment.

In some embodiments, associated entities might include: users, administrators, shipping companies, data processors, insurance providers, banks, commercial enterprises, contractors, vendors, sellers, purchasers, etc.

In some embodiments, the computing environment may onboard information associated with computing operations, analyze that information, and execute the computing operation based on the onboarded information.

In some embodiments, the information associated with the computing operation may be an asset transfer file. The asset transfer file may be preconfigured or may be configured on-demand. In some embodiments, the asset transfer file may be a payment file.

In some embodiments, the information associated with a computing operation may be onboarded using a data hook.

In some embodiments, executing the computing operation may be done with a virtual card, a virtual account, a virtual payment method, a digital token, a digital facilitator, a cryptocurrency, etc.

In some embodiments, a data hook may be a digital facilitator. The data hook may be a digital matching or association mechanism.

In some embodiments, the computing environment may execute "atomic operations." Atomic operations may consolidate liner processes that involve multiple steps into a single process or operation.

In some embodiments, atomic operations may include at least one of: a digital facilitator, a digital token, a cryptocurrency, virtual cards, virtual accounts, virtual payment methods, etc.

In some embodiments, linear processes may include at least one of: operation approval, operation execution, operation settlement, and operation reconciliation. Operation execution may include at least one of: payment processes, transfer of a digital asset, execution of a digital contract, etc.

In some embodiments, the computing environment may include a ledger. The ledger may be a distributed ledger, a distributed database, a data collection ledger, a centralized ledger, an asynchronous ledger, a synchronous ledger, a blockchain network, etc.

In some embodiments, users may be able to update a ledger following a computing operation. A computing operation may be a payment process, such as a straight through process or a supplier initiated payment.

A straight through process ("STP") may include a process whereby: parties agree that once an asset transfer request is sent, a party will send a digital asset transfer request, and a different party will transfer the asset. Transfer of the asset may be done by a digital facilitator, a digital token, a cryptocurrency, virtual cards, virtual accounts, virtual payment methods, etc. An asset transfer request may include an invoice.

A supplier initiated asset transfer process ("SIP") may include a process whereby a party sends an asset transfer request, another party approves it, then a virtual terminal allows a party to generate an asset transfer, then an issuing party generates an asset transfer method, which is sent to a processing party for processing. The asset transfer method may include at least one of: a digital facilitator, a digital token, a cryptocurrency, virtual cards, virtual accounts, virtual payment methods, etc. An asset transfer request may include an invoice.

In some embodiments, a ledger, computing operation, payment processes, and other components, may be located in a single enterprise system or integrated transaction domain. The enterprise system or integrated transaction domain may host all information necessary for a computing operation and may execute all computing operations. The enterprise system or integrated transaction domain may house all components and processes discussed throughout this specification.

In some embodiments, the enterprise system or integrated transaction domain may utilize additive and deductive hooks. Additive hooks or deductive hooks may onboard information associated with the STP or SIP, execute a computing operation, and alert relevant parties to the execution of the computing operation. The parties may be given an option to update a ledger after the execution of the computing operation. The ledger may be able to be updated through a single click. Executing the computer operation may be done by a digital facilitator, a digital token, a cryptocurrency, virtual cards, virtual accounts, virtual payment methods, a wire transfer, an automated clearing house, a stablecoin, etc.

In some embodiments, the enterprise system or integrated transaction domain may work in unison with an automated clearing house ("ACH"). Additive or deductive hooks may onboard information associated an invoice or an asset transfer request, execute a computing operation, and enrich the ACH with the information associated with an invoice or transfer request or some other information.

In some embodiments, where executing the computer operation is done via a stablecoin, the stablecoin may be backed by a ledger. Transfer of the stablecoin may need to be verified by comparison to some associated balance or ledger before occurring.

In some embodiments, additive or deductive hooks serve as a connection between the computing operation, the ledger, the parties to the computing operation, the enterprise system or integrated transaction domain, etc.

In some embodiments, the computing environment may include a receiving party database. The receiving party database may allow parties to verify and execute computing operations and digital transfers of assets. The receiving party database may be a part of the enterprise system or integrated transaction domain.

In some embodiments, the receiving party database may handle computing operations or digital transfers of assets for multiple parties. Parties may be required to become an active participant in the receiving party database or the enterprise system or integrated transaction domain in order to request or execute a computing operation or digital transfer of assets. The receiving party database may maintain a list or compilation of parties. The receiving party database may update the list or compilation of parties when a new party is involved in a computing operation or digital transfer of assets or enters the enterprise system or integrated transaction domain.

In some embodiments, the receiving party database may require approval from multiple parties before it will execute a computing operation or digital transfer of assets. Multiple parties may submit approval by a one-click process, a digital facilitator, a digital token, a cryptocurrency, virtual cards, virtual accounts, virtual payment methods, a stablecoin, etc.

In some embodiments, executing a computing operation or digital transfer of assets may be done by a digital facilitator, a digital token, a cryptocurrency, virtual cards, virtual accounts, virtual payment methods, a wire transfer, an automated clearing house, a stablecoin, etc.

In some embodiments, wherein executing a computing operation or digital transfer of assets by way of a digital facilitator, the digital facilitator may be a multi-signature digital facilitator. A multi-signature digital facilitator may allow for multiple parties to endorse and track the digital facilitator. A multi-signature digital facilitator may identify parties to the computing operation or digital transfer of assets.

In some embodiments, a party may have to go through an inclusion process to be added to the receiving party database. The inclusion process may involve: finding a potential new party, checking the potential new party against a set of criteria to prove they are the intended party; validating that they are the intended party, authenticating a computing operation or digital transfer of assets, executing a computing operation or digital transfer of assets, and submitting prove that the computing operation or digital transfer of assets was executed.

In some embodiments of the receiving party database, parties may be identified, selected, onboarded, or validated by a "receiving party hook."

In some embodiments, the receiving party database may include a party verification system. The party verification system may verify a party based on a set of rules of criteria associated with the system. The party verification system may automatically verify a party if they pass some threshold of criteria, or it may require active participation in the receiving party database by executing a computing operation or digital transfer of assets.

In some embodiments, the computing environment may include a computer operation rail. Computing operations or digital transfers of assets may be executed on the computer operation rail. "Receiving party hooks," "data hooks," "additive hooks," "deductive hooks," or "reconciliation hooks" may operate on the computer operation rail. These hooks may populate the computer operation rail with onboarded information and data.

In some embodiments, the computing environment may include digital facilitators. The digital facilitators may be used to sell data on an exchange. Data sold on the exchange may include at least one of: personal identifying information, location data, data about past computing operations, party verification criteria, qualitative data, preference data, demographic data, etc.

In some embodiments, an individual may pick particular bits or sections of data that they wish to distribute or sell. This information will be distributed or sold by use of a digital facilitator. An individual may choose to permanently sell or distribute the selected data, or they may choose to lease the data for a royalty. Individuals may opt in to allow some other entity to handle distribution of the data, or they may personally select their own preferences and distribution methods.

In some embodiments, the digital facilitator may be enabled with a multi-party acceptance protocol. A party may need to execute a digital facilitator to send a digital asset to multiple parties, and a multi-party acceptance protocol may allow all parties to receive a digital asset upon execution of a single digital facilitator.

In some embodiments, the digital facilitator may be enabled with multi-party signature support. A digital facilitator may need to be executed, processed, approved, or received by multiple parties. Multi-party signature support enables multiple parties to sign onto a digital facilitator or process associated with a digital facilitator, so that executing, processing, approving, or receiving the digital facilitator can be streamlined. Execution, processing, approval, or receiving may be done in a single computing operation or single instantaneous chain of computing operations.

In some embodiments, the computing environment may be able to transition any blockchain functionality to a cloud-based computing system, and vice versa. Any blockchain smart contract or digital facilitator may have an associated key or hash number. This key or hash number may be replicated by a concatenation of keys in a ledger, database, or table that is stored on the cloud or off of the blockchain. Any blockchain transactions may be replicated and then stamped with a permanent number. This permanent number may serve as a reference between a blockchain transaction and its cloud or off-blockchain counterpart.

In some embodiments, the computing environment may include a secure data tunnel. The secure data tunnel may allow communications between two entities. The entities may be parties to a computing operation or digital transfer of assets.

In some embodiments, the enterprise system or integrated transaction domain may be located on a cloud server.

The enterprise landscape has seen little innovation in past decades, and is littered with inflexible, antiquated, manual processes that introduce unnecessary levels of risk and error. A cloud-native enterprise system or integrated transaction domain can enhance the security and transparency of the enterprise landscape.

In some embodiments, the enterprise system or integrated transaction domain may include a cloud-native data platform that may expose API services.

The enterprise system or integrated transaction domain may include data assets.

The enterprise system or integrated transaction domain may include process automation by use of digital facilitators. The enterprise system or integrated transaction domain may include a library of analytic services. The enterprise system or integrated transaction domain may include complex data virtualization support. The enterprise system or integrated transaction domain may include process tokenization on a blockchain network.

The enterprise system or integrated transaction domain may include ERP API integration. The enterprise system or integrated transaction domain may include process reconciliation. The enterprise system or integrated transaction domain may include machine learning driven services and other automation services.

The enterprise system or integrated transaction domain may include a party or user directory. The enterprise system or integrated transaction domain may include user access controls. The enterprise system or integrated transaction domain may include encrypted chat functionality.

In some embodiments, the enterprise system or integrated transaction domain may be associated with a state entity. State entities may include nations, states, counties, governmental organizations, administrative agencies, etc. In some embodiments, state entities may use an enterprise system or integrated transaction domain to perform government services or distribute assets through government programs. Assets may include digital assets or other assets. Distributions of assets may be sent to multiple individuals or entities simultaneously.

Figure 21:
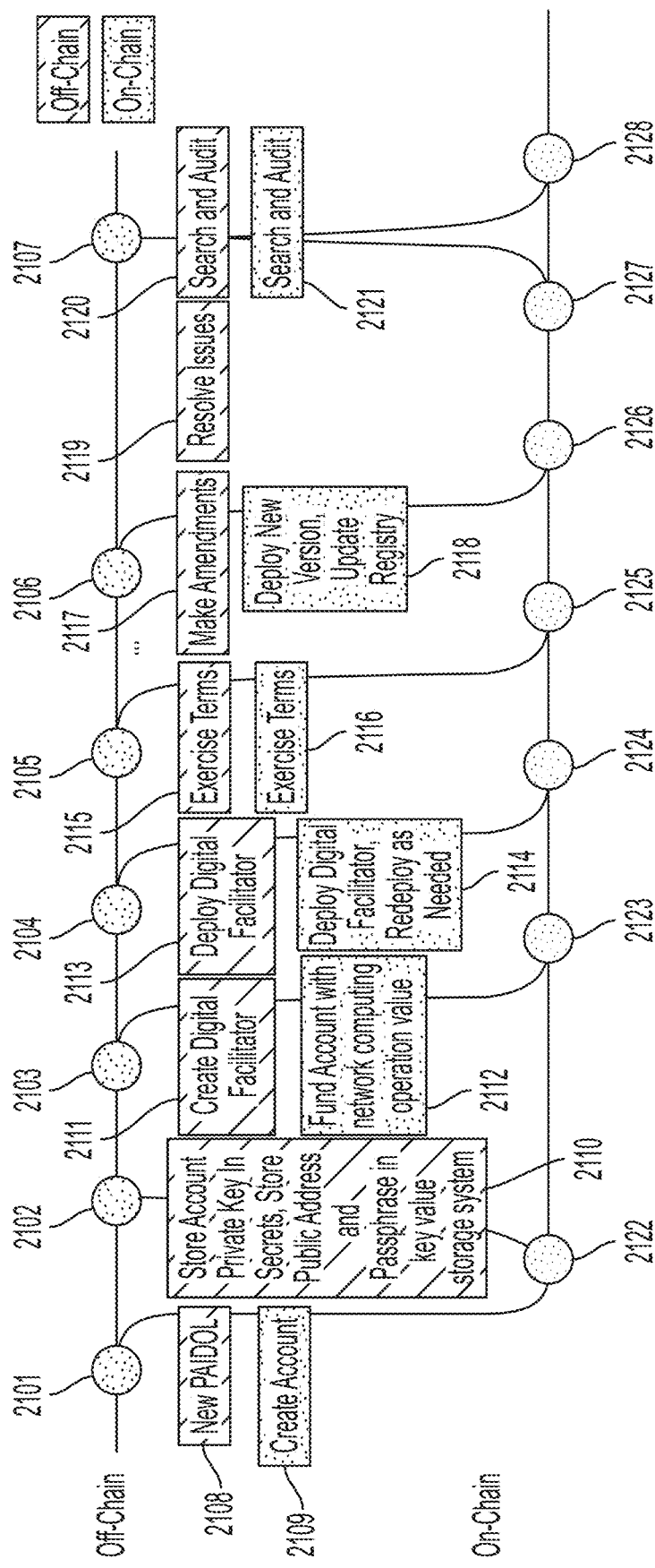
FIG. 21 shows an "off-chain" and "on-chain" ledger, such that computing processes can be executed and mirrored between a distributed ledger and a local ledger.

FIG. 21 shows an "off-chain" and "on-chain" ledger, such that computing processes can be executed and mirrored between a distributed ledger and a local ledger. A distributed ledger may comprise a series of nodes 2122, 2123, 2124, 2125, 2126, 2127, 2128. These nodes 2122, 2123, 2124, 2125, 2126, 2127, 2128 may be data structures that record the most recent computing operations, or computing operation data that have occurred in a network or computing system. A local ledger may have similar nodes 2101, 2012, 2013, 2014 2105, 2106, 2017 that may mirror the nodes 2122, 2123, 2124, 2125, 2126, 2127, 2128 on the distributed ledger. These nodes 2101, 2012, 2013, 2014 2105, 2106, 2017 may be data structures that record the most recent computing operations, or computing operation data that have occurred in a network or computing system. Computing operations that occur on the distributed ledger, the local ledger, or both, may be recorded on a node on at least one of the ledgers. Some computer operations or computer operation data may be stored on both ledgers. Some computer operations may execute, and then be stored (or have associated data stored) on both ledgers simultaneously, while some computer operations may execute, be stored (or have associated data stored) on one ledger, and then that information may be replicated on the other ledger. The ledgers may synchronize at times, to replicate any computing operations or computing operation data that may be stored on one, but not the other.

In some embodiments of an "off-chain" and "on-chain" ledger, computing operations may include the creation of a new PAIDOL 2018, and then the creation of a new account 2109. The creation of the new PAIDOL 2108 may occur "off-chain," or on the local ledger, while the creation of the account 2019 may occur "on-chain," or on the distributed ledger.

In some embodiments, following the creation of a new account 2109, an account private key and a public address and passphrase may be generated or stored 2110. Storage of the account private key or the public address or the passphrase 2110 may occur "off-chain" or on the local ledger.

In some embodiments, following the storage of the account private key or public address or passphrase 2110, a digital facilitator may be created 2111 and an account may be funded with a network computing operation value 2112. The digital facilitator may be created 2111 "off-chain," or on the local ledger, and the account may be funded with a network computing operation value 2112 "on-chain," or on the distributed ledger.

In some embodiments, a network computing operation value may include a cost necessary to perform a computing operation.

In some embodiments, following the creation of the digital facilitator 2111 or funding of account with a network computing operation value 2112, the digital facilitator may be deployed 2113, 2214. The digital facilitator may be deployed 2113, 2114 either "off-chain," or on the local ledger, or "on-chain," or on the distributed ledger. The digital facilitator may be deployed or re-deployed 2113, 2114 multiple times.

In some embodiments, following deployment of the digital facilitator 2113, 2214, terms of the digital facilitator may be exercised 2115, 2116. The terms may be exercised 2215, 2116 either "off-chain," or on the local ledger, or "on-chain," or on the distributed ledger. The terms may be exercised or re-exercised 2115, 2116 multiple times.

In some embodiments, following exercising of the terms 2215, 2116, amendments to the digital facilitator may be made 2117 or a new version of the digital facilitator may be deployed 2118. Amendments to the digital facilitator may be made 2117 "off-chain," or on the local ledger. A new version of the digital facilitator may be deployed 2118 "on-chain," or on the distributed ledger. When a new version of the digital facilitator is deployed 2118, a registry may be updated 2118.

In some embodiments, following amending the digital facilitator 2117 or deploying a new version of the digital facilitator 2118, any remaining issues may be resolved 2119. Issues may be resolved 2119 "off-chain," or on the local ledger, or "on-chain," or on the distributed ledger.

In some embodiments, following resolving issues 2119, searches and audits may be performed 2120, 2121, such that any errors on inconsistencies in the "off-chain" or "on-chain" process may be corrected. Searches and audits may be performed 2120, 2121 "off-chain," or on the local ledger, or "on-chain," or on the distributed ledger. Searches and audits may be performed 2120, 2121 multiple times.

All of the above steps or computing operations that occur "off-chain" or "on-chain" may be performed in any order, and may have various portions of the computer operations or computer operation data stored on either the distributed ledger or the local ledger.

In some embodiments, all of the above steps or computing operations may occur within a computing system or within an associated network or within an enterprise ledger. All of the above steps or computing operations may be executed upon the request of a computing system or user or on a network of servers.

Figure 22:
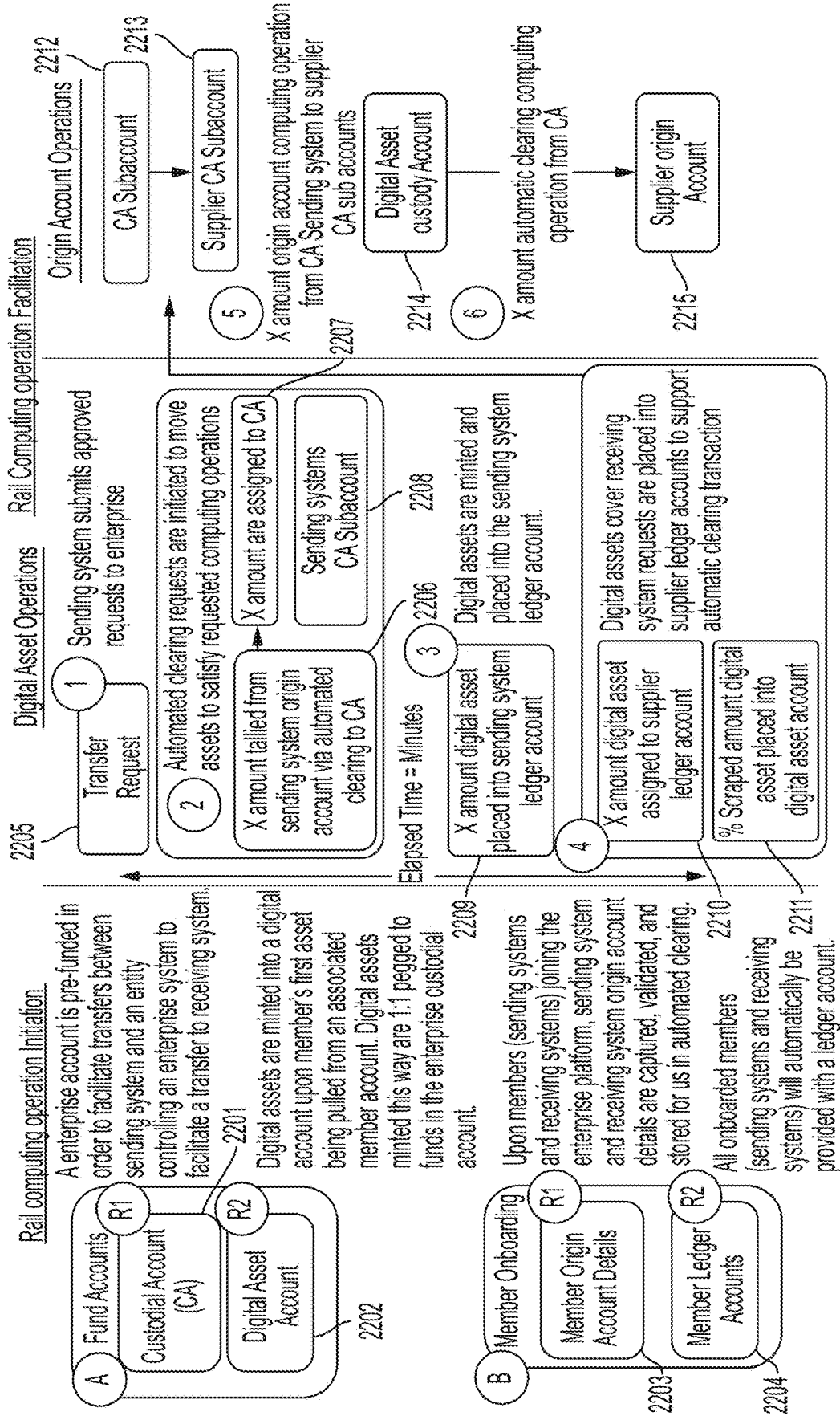
FIG. 22 shows the steps for rail computing operation initiations, and for rail computing operation facilitations. These rail computing operations form the processes that may occur within an enterprise ledger.

FIG. 22 shows the steps for rail computing operation initiations, and for rail computing operation facilitations. These rail computing operations form the processes that may occur within an enterprise ledger.

Rail computing operations may be executed within the span of a few minutes.

In some embodiments of a rail computer operation initiation, there may be two processes, whereby accounts are funded 2202 within a rail computing operation or an enterprise ledger and members are onboarded 2203, 2204 onto a rail computing operation or an enterprise ledger.

In some embodiments of the account funding process 2202, the process may utilize a custodial account, which may be contained within the enterprise ledger and associated with a user. The process may utilize a digital asset account, which may also be contained within the enterprise ledger and associated with a user.

In some embodiments of the member onboarding process 2203, 2204, the process may utilize details from a member's origin account, and may create a ledger account for a member. A member's origin account may be stored outside of the network, computer system, or enterprise ledger, or may be associated with a third party entity.

In some embodiments of a rail computer operation initiation: an enterprise account is pre-funded in order to facilitate transfers between a sending system and an entity controlling an enterprise system to facilitate a transfer to a receiving system. Digital assets may then be minted into a digital account upon member's first asset being pulled from an associated member account. Digital assets minted this way are 1:1 pegged to funds in an enterprise custodial account.

In some embodiments of a rail computer operation initiation: upon members (members may include sending systems and receiving systems) joining the enterprise platform, sending system and receiving system origin account details may be captured, validated, and stored for us in automated clearing. All onboarded members (onboarded members may include onboarded sending systems and receiving systems) may automatically be provided with a ledger account.

All of the above steps or computing operations that may form a rail computer operation initiation may be executed in any order, and certain steps or computing operations may be executed while others are not.

In some embodiments of a rail computer operation facilitation, there may be multiple processes, some of which may be classified as digital account operations, and some of which may be classified as origin account operations. Digital account operations and origin account operations may run simultaneously or they may run separately.

In some embodiments, digital asset operations may include transfer requests 2205, initiation of automated clearing requests 2206, 2207, 2208, digital assets being placed into a sending system ledger account 2209, and digital assets covering receiving system requests 2210, 2211.

In some embodiments of .digital asset operations or the above specific steps of digital asset operations: a sending system may submit an approved request to an enterprise or an enterprise ledger. Following that, automated clearing requests may be initiated to move assets in order to satisfy the approved request or other requested computing operations. Following that, digital assets (the amount of which may be based on the amount tallied from the sending system origin account) may be minted and placed into the sending system ledger account. Following that, digital assets covering the receiving system request may be placed into a supplier ledger.

In some embodiments, when digital assets covering the receiving system request may be placed into a supplier ledger, an amount of digital assets (which may be based on the amount placed into the sending system ledger account) may be assigned to a supplier ledger account or a receiving system ledger account. Following that, a certain amount of scraped digital assets may be placed into the digital asset account.

In some embodiments, when automated clearing requests are initiated, a specified amount may be tallied from the sending system's origin account via automated clearing to a custodial account. The same specified amount may be assigned to a custodial account, and a sending systems custodial subaccount may be utilized for the process.

In some embodiments, origin account operations may include operations within a custodial account subaccount 2212, operations within a supplier or receiving system custodial account subaccount 2213, computing operations using an amount (which may be based on amount relevant to digital asset operations), from or through an origin account, from the custodial account of a sending system to a the custodial account sub account of a supplier or receiving system, operations within a digital asset custody account, an amount (which may be based on the amount running from or through an origin account) being used in an automatic clearing computing operation from a custodial account, or operations within a supplier or receiving system origin account.

All of the above steps or computing operations that may form a rail computer operation facilitation may be executed in any order, and certain steps or computing operations may be executed while others are not. In some embodiments, a digital asset or other assets may be utilized or moved for each step of a rail computer operation facilitation.

In some embodiments, computer operations might include the initiation of, processing for, maintenance or, or communication with an enterprise ledger. An enterprise ledger may comprise a digital ledger, a distributed ledger, a host of digital ledgers, a host of distributed ledgers, systems operating in connection with a ledger or host of ledgers, or some combination thereof.

In some embodiments, the enterprise ledger may be owned by, or may be associated with an entity, rather than an individual. The enterprise ledger may alternatively be associated with a host of entities. The enterprise ledger may allow for: transfer of digital assets, transfer of other assets, transfer of digital certificate certifying ownership of a digital asset, transfer of digital certificate certifying ownership of an other asset, transfer of a currency, transfer of PAIDOL information, transfer of computing operation information, transfer of digital facilitator extraction information, processing of digital assets, processing of other assets, processing of digital certificates certifying ownership of a digital asset, processing of digital certificate certifying ownership of an other asset, processing of a currency, processing of PAIDOL information, processing of computer operation information, processing of digital facilitator extraction information, storage of digital assets, storage of other assets, storage of digital certificates certifying ownership of a digital asset, storage of digital certificate certifying ownership of an other asset, storage of a currency, storage of PAIDOL information, storage of computing operation information, or storage of digital facilitator extraction information.

An enterprise ledger may provide a central overview of user accounts, which may list out all origin accounts, digital accounts, and distributed ledger accounts associated with a user. Each user account summary may show related information for origin accounts, digital accounts, or distributed ledger accounts, as well as current listings and summaries of associated assets. The user account may also show recent user activity within the enterprise ledger or on an associated computer system. When digital facilitators are executed on an associated computer system or associated network, every stage of the digital facilitator life cycle may be updated, stored, and viewable on the enterprise ledger. User accounts and information associated with user accounts may be updated based on the execution of the digital facilitators.

In some embodiments, the enterprise ledger may have individual digital wallets or accounts associated with a sending system. A sending system may be able to fund its digital wallet or account with assets. Funding the digital wallet or account with assets may provide the sending system with an equivalent amount of digital assets. Digital assets may be minted by the enterprise ledger or an associated computer system when the sending system funds the digital wallet or account. A sending system may then be able to transfer digital assets to a receiving system. The receiving system may also have individual digital wallets or accounts associated with them. After a receiving system receives a transfer of a digital assets, the digital assets may be deleted and the receiving system's associated digital wallet or account may be funded with an equivalent amount of other assets.

In some embodiments, receiving systems and sending systems may be transferring assets directly.

In some embodiments, the digital asset may not be deleted upon receipt by the receiving system. The receiving system may be able to select to exchange or convert digital assets for other assets at its convenience.

In some embodiments, transfer of digital assets may involve multiple receiving systems or multiple sending systems.

All digital assets in the enterprise ledger or a network associated with the enterprise ledger may correspond to an associated amount of assets in the enterprise ledger, a network associated with the enterprise ledger, or an origin account. Receiving systems or sending systems may be able to connect their individual digital wallet or account with an origin account.

All transactions performed within the enterprise ledger, within a network associated with the enterprise ledger, or within a computer system associated with the enterprise ledger may be verified on a distributed ledger. All transactions performed within the enterprise ledger, within a network associated with the enterprise ledger, or within a computer system associated with the enterprise ledger may be verified by a validator or set of validators. A validator may be an individual, entity, or computer that is verifying computing operations in the enterprise ledger or on a distributed ledger. Verifications may occur from a validator checking digital facilitators or digital contracts, or by creating their own digital facilitators or digital contracts. All transactions that occur within the enterprise within a network associated with the enterprise ledger, or within a computer system associated with the enterprise ledger may be verified on a single, comprehensive, distributed ledger.

In order to engage in transactions within the enterprise ledger or associated within the enterprise ledger, a receiving system or sending system may be need to access a user interface or user account that allows them to execute different actions. These actions may include: funding their account or digital wallet, sending digital assets to other receiving systems or sending systems, checking the status of transactions, checking the status or value of their digital wallets or accounts, communicating with other receiving systems or sending systems or third parties or representatives of the enterprise ledger.

In some embodiments, any assets provided to the enterprise ledger may create a, asset collective, such that different users or entities can benefit from a large volume of assets.

In some embodiments, an enterprise ledger may be associated with a state entity. State entities may include nations, states, counties, governmental organizations, administrative agencies, etc. In some embodiments, state entities may use an enterprise ledger to perform government services or distribute assets through government programs. Assets may include digital assets or other assets. Distributions of assets may be sent to multiple individuals or entities simultaneously.

In some embodiments, a digital facilitator or digital contract may have an associated life cycle. A digital facilitator or digital contact may go through this life cycle as part of an association with an enterprise ledger. The steps of the life cycle may be performed in any order, and not all steps may need to be executed. The life cycle steps for a digital facilitator or digital contract may include: identifying an underlying distributed ledger, onboarding partners, creating ledger accounts, managing private keys, connecting existing applications, establishing contract workflows, building contract templates, maintaining test environments, translating enterprise resource planning software, maintaining ledger notes, compiling contracts, deploying contracts, managing contract amendments, securely signing transactions, tracking execution of contract terms, reconciling anomalies, mediating and resolving disputes, and processing payments. Contracts may include digital facilitators or digital contracts, or may include digital interpretations or scans of physical agreements.

In some embodiments, digital facilitators may include digital contracts, physical contracts, agreements, etc. A sending system may include a sending user, a system sending a digital asset, a system sending a transaction request, a buyer, a purchaser, a payor, etc. A receiving system may include a receiving user, a system receiving a digital asset, a system receiving a transaction request, a seller, a distributor, a supplier, a payee, etc. An asset or other asset may include a digital asset, a physical asset, a fiat currency, a currency equivalent, a file, a computer operation request, etc. A request may include a request for a transaction, an invoice, a request for a contract, etc. A computing operation may include a digital process, processing a transaction, a transaction, execution of a digital facilitator, transfer of a digital asset, etc. If something is placed or sent it may include deposits. If something is tallied or counted it may include debits or allotments. If something is assigned it may include credits or allotments or a quota. A member may include a user, a member of an enterprise ledger or individual or entity associated with an enterprise ledger, a merchant, a seller, a buyer, a payor, a payee, a government associated or state entity, etc. Network transaction value may include a fee or amount necessary to perform a transaction or computer operation. Key value storage system may include a database, a key value database, a NoSQL database, etc. A transaction may include a payment. A digital asset may include a cryptocurrency, a token, a stablecoin, a proprietary coin, a non-fungible token, etc. An origin account may include an account outside of an enterprise ledger, any outside account associated with a user or computing system, a bank account or other financial account, a cryptocurrency wallet, a wallet address, etc. An automated clearing transaction may include an automatic clearing house payment. An origin account transaction may include an interbank transfer. An origin may include a bank.

This application claims the benefit of U.S. Provisional Patent Application No. 62/786,202, titled "Asset-backed network token for use in a hybrid distributed ledger-based network ecosystem," filed Dec. 28, 2018, which is incorporated by reference herein in its entirety for all purposes. This application incorporates by reference PCT Application No. PCT/US19/068705, filed Dec. 27, 2019, in its entirety for all purposes. This application also incorporates by reference U.S. Provisional Application No. 62/888,167, filed Aug. 16, 2019, in its entirety for all purposes. This application also incorporates by reference U.S. patent application Ser. No. 16/414,516, filed May 16, 2019, and issued as U.S. Pat. No. 11,228,584, in its entirety for all purposes. This application also incorporates by reference U.S. patent application Ser. No. 16/414,524, filed May 16, 2019, and issued as U.S. Pat. No. 10,958,637, in its entirety for all purposes. This application also incorporates by reference U.S. patent application Ser. No. 16/414,530, filed May 16, 2019, and issued as U.S. Pat. No. 11,057,369, in its entirety for all purposes. This application also incorporates by reference U.S. patent application Ser. No. 16/414,536, filed May 16, 2019, and issued as U.S. Pat. No. 10,999,270, in its entirety for all purposes. This application also incorporates by reference U.S. patent application Ser. No. 17/187,434, filed Feb. 26, 2021, in its entirety for all purposes. This application also incorporates by reference U.S. patent application Ser. No. 17/208,909, filed Mar. 22, 2021, in its entirety for all purposes. This application also incorporates by reference U.S. patent application Ser. No. 17/365,585, filed Jul. 1, 2021, in its entirety for all purposes. This application also incorporates by reference U.S. patent application Ser. No. 17/576,852, filed Jan. 14, 2022, in its entirety for all purposes.

Implementation of any device or unit or element of any apparatus or device described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Any features or embodiments described herein may be combined or integrated with any other features or embodiments described herein. Any feature associated with or comprised in one or more embodiments may be associated with or comprised in one or more other embodiments. In some embodiments, any features associated with or described as being performed in blockchain ecosystems can additionally or alternatively be performed in non-blockchain networks such as wired, wireless, and/or cloud networks.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for improving processing, in an enterprise system, of information extracted from a document image, the method comprising:

receiving, using one or more computing device processors, a scan of a paper document;

generating, using the one or more computing device processors, a first file, wherein the first file is based on the scan of the paper document;

receiving, from an origination system, via an application programming interface ("API"), first information for performing a computing operation, wherein the first information comprises at least a first instruction comprising a transaction type, the first file, and at least one destination system;

onboarding, using a data hook, second information from at least one of the origination system or the at least one destination system, wherein the data hook comprises at least one of a digital matching operation or an association operation for retrieving the second information;

updating the first information for performing the computing operation based on the second information;

determining, using the one or more computing device processors, a digital facilitator comprising parameters for performing the computing operation;

converting, using the one or more computing device processors, the first instruction into a second instruction, wherein the second instruction is executable by the digital facilitator;

extracting, using the one or more computing device processors, a document image from the first file;

storing, using the one or more computing device processors, the document image in a document storage layer, wherein the document storage layer comprises at least one of an object storage database, a database manager, or an analytics engine;

retrieving, using the one or more computing device processors, the document image from the document storage layer;

sending, using the one or more computing device processors, the document image to a document analyzing system;

analyzing, using the document analyzing system or one or more machine learning operations, the document image;

generating, using the one or more computing device processors, a report based on an analysis of the document image by the document analyzing system;

accessing, using the one or more computing device processors, a distributed ledger;

executing, using the one or more computing device processors and the digital facilitator, based on the transaction type, the computing operation on the distributed ledger;

generating, using the one or more computing device processors and the digital facilitator, a result;

updating, using the one or more computing device processors, the distributed ledger based on the result;

sending, using the one or more computing device processors, the result, the report, and the document image to the at least one destination system; and sending, using the one or more computing device processors, an alert to the origination system indicating that the computing operation has been executed.

2. The method of claim 1, wherein the transaction type is associated with a transfer of a digital asset.

3. The method of claim 1, wherein the at least one destination system is associated with at least two destinations.

4. The method of claim 1, wherein the second instruction is updated based on the analyzing of the document image.

5. The method of claim 1, wherein at least one of the transaction type, the first instruction, or the second instruction are assigned a tracking identifier.

6. The method of claim 5, wherein the tracking identifier is generated and monitored by the digital facilitator.

7. The method of claim 6, wherein the tracking identifier is sent to at least one of the origination system or the at least one destination system.

8. The method of claim 1, wherein the one or more machine learning operations comprises at least one of: a rules engine based operation, an artificial intelligence based operation, and optical character recognition.

9. An apparatus for extracting and processing documents within an enterprise system, the apparatus comprising:
one or more computing device processors;
one or more memory systems comprising code, executable by the one or more computing device processors, and configured to:
receive a scan of a paper document;
generate a first file, wherein the first file is based on the scan of the paper document;
receive, from an origination system, via an application programming interface ("API"), first information for performing a computing operation, wherein the first information comprises at least a first instruction comprising a transaction type, the first file, and at least one destination system;

onboard, using a data hook, second information from at least one of the origination system or the at least one destination system, wherein the data hook comprises at least one of a digital matching operation or an association operation for retrieving the second information;

update the first information for performing the computing operation based on the second information;

provide a digital facilitator comprising parameters for performing the computing operation;

convert the first instruction into a second instruction, wherein the second instruction is executable by the digital facilitator;

extract a document image from the first file;

store the document image in a document storage layer, wherein the document storage layer comprises at least one of an object storage database, a database manager, or an analytics engine;

retrieve, using the one or more computing device processors, the document image from the document storage layer;

send, using the one or more computing device processors, the document image to a document analyzing system;

analyze, using the document analyzing system or one or more machine learning operations, the document image;

generate a report based on an analysis of the document image by the document analyzing system;

access a distributed ledger;

execute, based on the transaction type, the computing operation on the distributed ledger;

generate, using the digital facilitator, a result;

update the distributed ledger based on the result;

send the result, the report, and the document image to the at least one destination system; and send an alert to the origination system that the computing operation has been executed.

10. The apparatus of claim 9, wherein the transaction type is associated with a transfer of a digital asset.

11. The apparatus of claim 9, wherein the at least one destination system is associated with at least two destinations.

12. The apparatus of claim 9, wherein the second instruction is updated based on the analyzing of the document image.

13. The apparatus of claim 9, wherein at least one of the transaction type, the first instruction, or the second instruction are assigned a tracking identifier.

14. The apparatus of claim 13, wherein the tracking identifier is generated and monitored by the digital facilitator.

15. The apparatus of claim 14, wherein the tracking identifier is sent to at least one of the origination system or the at least one destination system.

16. The apparatus of claim 9, wherein the one or more machine learning operations comprises at least one of: a rules engine based operation, an artificial intelligence based operation, and optical character recognition.

* * * * *